US011924536B2

(12) United States Patent
Lee et al.

(10) Patent No.: US 11,924,536 B2
(45) Date of Patent: Mar. 5, 2024

(54) AUGMENTED REALITY DEVICE INCLUDING VARIABLE FOCUS LENSES AND OPERATING METHOD THEREOF

(71) Applicant: SAMSUNG ELECTRONICS CO., LTD., Suwon-si (KR)

(72) Inventors: Kyookeun Lee, Suwon-si (KR); Bonkon Koo, Suwon-si (KR); Doyoun Kim, Suwon-si (KR); Harry Edward Milton, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/846,810

(22) Filed: Jun. 22, 2022

(65) Prior Publication Data
US 2022/0404578 A1 Dec. 22, 2022

Related U.S. Application Data

(63) Continuation of application No. PCT/KR2022/008722, filed on Jun. 20, 2022.

(30) Foreign Application Priority Data

Jun. 22, 2021 (KR) .................. 10-2021-0081172
Feb. 18, 2022 (KR) .................. 10-2022-0021727

(51) Int. Cl.
*G02B 27/01* (2006.01)
*G06F 3/01* (2006.01)
(Continued)

(52) U.S. Cl.
CPC ......... *H04N 23/56* (2023.01); *G02B 27/0172* (2013.01); *G02B 27/0179* (2013.01);
(Continued)

(58) Field of Classification Search
CPC . G06F 3/013; G06F 3/011; G02B 2027/0138; G02B 2027/014;
(Continued)

(56) References Cited

U.S. PATENT DOCUMENTS

| 5,861,936 A | 1/1999 | Sorensen |
| 9,864,191 B2 | 1/2018 | Kato et al. |

(Continued)

FOREIGN PATENT DOCUMENTS

| JP | 2018-63393 A | 4/2018 |
| JP | 2021-81492 A | 5/2021 |

(Continued)

OTHER PUBLICATIONS

International Search Report (PCT/ISA/220 and PCT/ISA/210) and Written Opinion (PCT/ISA/237) dated Sep. 21, 2022 by the International Searching Authority in PCT/KR2022/008722.

*Primary Examiner* — Sanjiv D. Patel
(74) *Attorney, Agent, or Firm* — Sughrue Mion, PLLC

(57) ABSTRACT

Provided is an augmented reality device including a variable focus lens, an eye tracking sensor configured to emit light to eyes of a user, receive the light reflected by the eyes of the user, and detect a plurality of feature points based on the light reflected by the eyes of the user, and at least one processor configured to obtain information with respect to eye relief, which is a distance between the eyes of the user and the variable focus lens, based on position information of the plurality of feature points detected by the eye tracking sensor, obtain information with respect to a gaze point at which gaze directions of the eyes of the user converge, and an interpupillary distance of the eyes of the user, based on the plurality of feature points, and determine a position of a (Continued)

focal region of the variable focus lens based on the information with respect to the eye relief, the gaze point, and the interpupillary distance.

15 Claims, 29 Drawing Sheets

(51) Int. Cl.
*G06T 7/246* (2017.01)
*G06T 7/50* (2017.01)
*G06T 7/73* (2017.01)
*H04N 23/56* (2023.01)

(52) U.S. Cl.
CPC ............ *G06F 3/013* (2013.01); *G06T 7/246* (2017.01); *G06T 7/50* (2017.01); *G06T 7/73* (2017.01); *G02B 2027/0138* (2013.01); *G02B 2027/014* (2013.01); *G02B 2027/0178* (2013.01); *G02B 2027/0187* (2013.01); *G06T 2207/10048* (2013.01); *G06T 2207/30201* (2013.01)

(58) Field of Classification Search
CPC ........ G02B 2027/0178; G02B 27/0093; G02B 2027/0187; G02B 27/017; G02B 27/0172; G06V 40/193; G06V 40/18; G06V 40/19; G06V 20/20; A61B 3/158; A61B 3/111; A61B 3/18

See application file for complete search history.

(56) References Cited

U.S. PATENT DOCUMENTS

| | | | |
|---|---|---|---|
| 10,025,060 B2 | 7/2018 | Lanman et al. | |
| 10,690,991 B1 | 6/2020 | Myhre et al. | |
| 2013/0050642 A1 | 2/2013 | Lewis et al. | |
| 2015/0003819 A1 | 1/2015 | Ackerman et al. | |
| 2016/0116979 A1* | 4/2016 | Border | G06F 3/013 345/156 |
| 2017/0160798 A1 | 6/2017 | Lanman et al. | |
| 2017/0200285 A1* | 7/2017 | Hwang | G06V 40/19 |
| 2019/0310478 A1* | 10/2019 | Marin | A61B 3/02 |
| 2020/0379214 A1* | 12/2020 | Lee | G02B 7/287 |
| 2021/0037232 A1* | 2/2021 | Lin | H04N 13/296 |
| 2021/0278630 A1 | 9/2021 | Lee et al. | |

FOREIGN PATENT DOCUMENTS

| | | |
|---|---|---|
| JP | 2022-144863 A | 10/2022 |
| KR | 10-1958390 B1 | 3/2019 |
| KR | 10-2020-0136297 A | 12/2020 |

* cited by examiner

<IMAGE IN CASE OF ER1>

<IMAGE IN CASE OF ER2>

AUGMENTED REALITY DEVICE INCLUDING VARIABLE FOCUS LENSES AND OPERATING METHOD THEREOF

CROSS-REFERENCE TO RELATED APPLICATION

This application is a bypass continuation application of International Application No. PCT/KR2022/008722, filed on Jun. 20, 2022, which is based on and claims the priority to Korean Patent Application No. 10-2021-0081172, filed on Jun. 22, 2021 and Korean Patent Application No. 10-2022-0021727, filed on Feb. 18, 2022, in the Korean Intellectual Property Office, the disclosure of which is incorporated by reference herein in its entirety.

BACKGROUND

1. Field

The disclosure relates to an augmented reality (AR) device including variable focus lenses, and an operating method thereof. More particularly, the disclosure relates to an AR device configured to automatically determined and adjust the position of a focal region which is on a lens configured to change the focus based on information about the eyes of a user and which corresponds to the position of the focus, and an operating method of the AR device.

2. Description of Related Art

Augmented reality is technology that overlays a virtual image on a physical environment space of the real world or a real-world object, and augmented reality devices (e.g., smart glasses) utilizing augmented reality technology are being used in daily life for, e.g., information retrieval, directions, and camera photography. In particular, smart glasses are also worn as fashion items and may be mainly used for outdoor activities.

A user wearing an augmented reality device generally sees a scene through a see-through display placed close to the eyes of the user. Here, the scene includes one or more real-world objects in the physical environment or space that the user sees directly through his/her eyes. The augmented reality device may project a virtual image onto the eyes of the user through the see-through display, and the user may simultaneously view the real-world objects and the projected virtual image through the see-through display.

Recently, an augmented reality device including a variable focus lens capable of adjusting a focal region on a see-through display according to a gaze direction of the user has been developed. The variable focus lens may be used for vision correction of the user, or may be used for focus adjustment for a real-world object or a virtual image. The focus adjustment function of the variable focus lens depends on the degree of alignment between the position of the focal region and the visual axis of an eye of the user. That is, when the position of the focal region of the variable focus lens is not accurately aligned with the visual axis of the eye of the user, vision correction may not be appropriately performed, and the focus is not normally on a real-world object or a virtual image, causing user fatigue and deterioration in image quality.

In order to align the position of the focal region of the variable focus lens with the visual axis of the eye of the user, a method of determining the position of the focal region by using information about a gaze direction of the user and an interpupillary distance (IPD) may be used. However, in order to improve the accuracy of alignment between the focal region and the visual axis of the eye of the user, not only the gaze direction and the IPD, but also eye relief, which is the distance between the eye of the user and the variable focus lens, should be considered. When the eye relief is longer or shorter than a reference distance, the position of the focal region may be changed, and accordingly, the lens resolution may be reduced, and the user may experience a decrease in vision. Even when the vision of the user is completely corrected by the variable focus lens, a decrease in resolution may occur due to the eye relief, causing the vision of the user to decrease to an extent requiring vision correction.

SUMMARY

One or more embodiments of the disclosure provide an augmented reality device that may improve the accuracy of alignment of a focal region on a variable focus lens and a visual axis of an eye of a user by automatically determining or adjusting the position of the focal region based on information about the eye of the user, and an operating method of the augmented reality device. The augmented reality device according to one or more embodiments of the disclosure may determine the position of the focal region of the variable focus lens by using information about eye relief.

According to an aspect of an embodiment, there is provided an augmented reality device including a variable focus lens, an eye tracking sensor configured to emit light to eye of a user and detect a plurality of feature points based on light reflected by the eye of the user, and at least one processor configured to obtain information with respect to eye relief, which is a distance between the eye of the user and the variable focus lens, based on position information of the plurality of feature points detected by the eye tracking sensor, obtain information with respect to a gaze point at which gaze direction of a left eye of the user and gaze direction of a right eye of the user converge, and an interpupillary distance which is a distance between a pupil of the left eye and a pupil of the right eye, based on the plurality of feature points, and determine a position of a focal region of the variable focus lens based on the information with respect to the eye relief, the gaze point, and the interpupillary distance.

The eye tracking sensor may include an infrared (IR) light source and an IR camera, and the at least one processor may be further configured to control the IR light source to emit IR light to the eye of the user, detect a plurality of glint feature points from an image obtained by photographing the IR light reflected by the eye of the user by the IR camera, and obtain the eye relief based on a size of a region of a glint pattern, which is a combination of the plurality of detected glint feature points.

The IR light source may include a plurality of IR light-emitting diodes (LEDs) provided on a lens frame of the augmented reality device to be spaced apart from each other by a preset distance, and the at least one processor may be further configured to obtain the eye relief based on at least one of the size of the region of the glint pattern, a positional relationship between the plurality of IR LEDs, or coordinates of each pixel of the IR camera.

The eye tracking sensor may include an infrared (IR) scanner and an IR detector, and the at least one processor may be further configured to control the IR scanner to emit IR light to the eye of the user, detect the IR light reflected by the eye of the user by the IR detector, detect a plurality of glint feature points from the reflected light, obtain information with respect to distances between the plurality of detected glint feature points, and obtain the eye relief based on the obtained distances between the plurality of glint feature points.

The IR detector may include a plurality of photodiodes provided on a lens frame of the augmented reality device to be spaced apart from each other by a preset distance, and the at least one processor may be further configured to obtain the eye relief based on the distances between the plurality of glint feature points and a positional relationship between the plurality of photodiodes.

The at least one processor may be further configured to obtain images by photographing an eye of the user moving by a preset rotation angle, by the eye tracking sensor, detect a pupil feature point by analyzing the images, measure a radius of rotation of the detected pupil feature point, and obtain the eye relief based on the measured radius of rotation.

The at least one processor may be further configured to detect the pupil of the left eye from a left-eye image obtained by a first eye tracking sensor, detect the pupil of the right eye from a right-eye image obtained by a second eye tracking sensor, obtain three-dimensional coordinates of the pupil of the left eye and the pupil of the right eye based on a positional relationship between the first eye tracking sensor and the second eye tracking sensor, and camera attribute information, and obtain the interpupillary distance based on the three-dimensional coordinates of the pupil of the left eye and the pupil of the right eye.

The at least one processor may be further configured to determine, as a first focal region, a region having a preset size around a first center focus on a first variable focus lens at which a virtual straight line representing a first gaze direction of the left eye toward the gaze point meets the first variable focus lens, and determine, as a second focal region, a region having a preset size around a second center focus on a second variable focus lens at which a virtual straight line representing a second gaze direction of the right eye toward the gaze point meets the second variable focus lens.

The at least one processor may be further configured to obtain coordinates of a center focus based on the eye relief, a distance between the gaze point and the eye of the user, and the interpupillary distance, and determine, as the focal region, a region of a preset size around the center focus.

The at least one processor may be further configured to adjust refractive power of the focal region by applying a control voltage to the variable focus lens to generate a phase modulation profile for a position corresponding to the focal region.

According to another aspect of an embodiment, there is provided an operating method of an augmented reality device, the operating method including detecting, by an eye tracking sensor, a plurality of feature points by receiving light reflected by eye of a user, obtaining information with respect to eye relief, which is a distance between the eye of the user and a variable focus lens of the augmented reality device, based on position information of the plurality of detected feature points, obtaining information with respect to a gaze point at which gaze direction of a left eye of the user and gaze direction of a right eye of the user converge, and an interpupillary distance which is a distance between a pupil of the left eye and a pupil of the right eye of the user, based on the plurality of feature points, and determining a position of a focal region of the variable focus lens based on the information about the eye relief, the gaze point, and the interpupillary distance.

The eye tracking sensor may include an infrared (IR) light source and an IR camera, the detecting of the plurality of feature points may include controlling the IR light source to emit IR light to the eye of the user, and detecting a plurality of glint feature points from an image obtained by photographing the IR light reflected by the eye of the user by the IR camera, and the obtaining of the information about the eye relief may include obtaining the eye relief based on a size of a region of a glint pattern, which is a combination of the plurality of detected glint feature points.

The IR light source may include a plurality of IR light-emitting diodes (LEDs) provided on a lens frame of the augmented reality device to be spaced apart from each other by a preset distance, and the obtaining of the eye relief may include obtaining the eye relief based on at least one of the size of the region of the glint pattern, a positional relationship between the plurality of IR LEDs, or coordinates of each pixel of the IR camera.

The eye tracking sensor may include an infrared (IR) scanner and an IR detector, the detecting of the plurality of feature points may include controlling the IR scanner to emit IR light to the eye of the user, detecting the IR light reflected by the eye of the user by the IR detector, and detecting a plurality of glint feature points from the reflected light, and obtaining position information of the plurality of detected glint feature points, and the obtaining of the information about eye relief may include obtaining information about distances between the plurality of glint feature points based on the position information of the plurality of detected glint feature points, and obtaining the eye relief based on the obtained distances between the plurality of glint feature points.

The IR detector may include a plurality of photodiodes provided on a lens frame of the augmented reality device to be spaced apart from each other by a preset distance, and the obtaining of the eye relief may include obtaining the eye relief based on the distances between the plurality of glint feature points and a positional relationship between the plurality of photodiodes.

The detecting of the plurality of feature points may include obtaining images by photographing an eye of the user moving by a preset rotation angle, by the eye tracking sensor, and detecting a pupil feature point by analyzing the images, and the obtaining of the information about eye relief may include measuring a radius of rotation of the detected pupil feature point, and obtaining the eye relief based on the measured radius of rotation.

The determining of the position of the focal region of the variable focus lens may include determining, as a first focal region, a region having a preset size around a first center focus on a first variable focus lens at which a virtual straight line representing a first gaze direction of the left eye toward the gaze point meets the first variable focus lens, and determining, as a second focal region, a region having a preset size around a second center focus on a second variable focus lens at which a virtual straight line representing a second gaze direction of the right eye toward the gaze point meets the second variable focus lens.

The determining of the position of the focal region of the variable focus lens may include obtaining coordinates of a center focus based on the eye relief, a distance between the gaze point and the eye of the user, and the interpupillary distance, and determining, as the focal region, a region of a preset size around the center focus.

The operating method may further include adjusting refractive power of the focal region by applying a control voltage to the variable focus lens to generate a phase modulation profile for a position corresponding to the focal region.

According to another aspect of an embodiment, there is provided a computer program product including a computer-readable storage medium, the computer-readable storage medium including instructions readable by an augmented reality device to perform detecting, by an eye tracking sensor, a plurality of feature points by receiving light reflected by eye of a user, obtaining information with respect to eye relief, which is a distance between the eye of the user and a variable focus lens of the augmented reality device, based on position information of the plurality of detected feature points, obtaining information with respect to a gaze point at which gaze direction of a left eye of the user and gaze direction of a right eye of the user converge, and an interpupillary distance which is a distance between a pupil of the left eye and a pupil of the right eye of the user, based on the plurality of feature points, and determining a position of a focal region of the variable focus lens based on the information about the eye relief, the gaze point, and the interpupillary distance.

BRIEF DESCRIPTION OF THE DRAWINGS

The above and/or other aspects will become apparent and more readily appreciated from the following description of embodiments, taken in conjunction with the accompanying drawings in which.

DETAILED DESCRIPTION

Figure 1A:
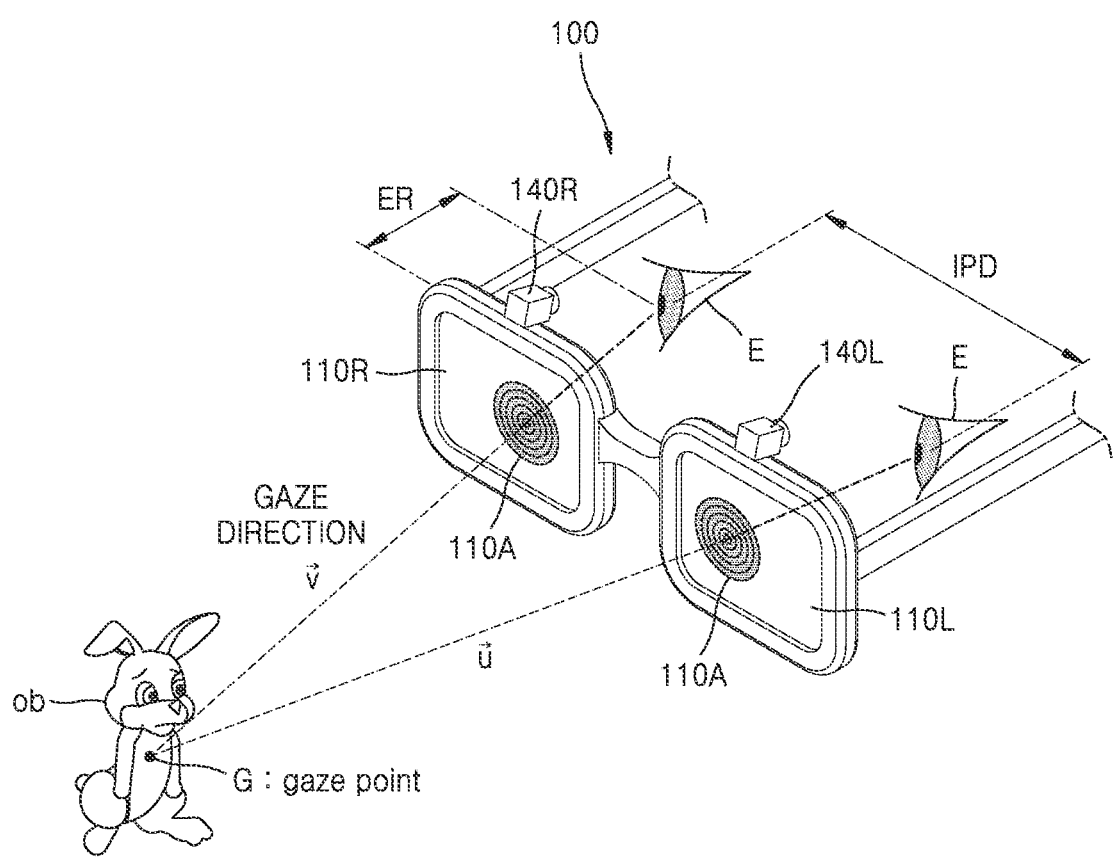
FIG. 1A is a conceptual diagram illustrating an operation, performed by an augmented reality device, of determining focal regions based on eye relief (ER), a gaze point, and an interpupillary distance (IPD), according to an embodiment of the disclosure.

Throughout the disclosure, the expression "at least one of a, b or c" indicates only a, only b, only c, both a and b, both a and c, both b and c, all of a, b, and c, or variations thereof.

Although the terms used in embodiments of the specification are selected from among common terms that are currently widely used in consideration of their function in the disclosure, the terms may be different according to an intention of one of ordinary skill in the art, a precedent, or the advent of new technology. Also, in particular cases, the terms are discretionally selected by the applicant of the disclosure, in which case, the meaning of those terms will be described in detail in the corresponding embodiment. Therefore, the terms used herein are not merely designations of the terms, but the terms are defined based on the meaning of the terms and content throughout the disclosure.

The singular expression may also include the plural meaning as long as it is not inconsistent with the context. All the terms used herein, including technical and scientific terms, may have the same meanings as those generally understood by those of skill in the art to which the disclosure belongs.

Throughout the disclosure, when a part "includes" a component, it means that the part may additionally include other components rather than excluding other components as long as there is no particular opposing recitation. Also, the terms described in the specification, such as " . . . er (or)", " . . . unit", " . . . module", etc., denote a unit that performs at least one function or operation, which may be implemented as hardware or software or a combination thereof.

The expression "configured to", as used herein, may be interchangeably used with, for example, "suitable for", "having the capacity to", "designed to", "adapted to", "made to", or "capable of", according to a situation. The expression "configured to" may not imply only "specially designed to" in a hardware manner. Instead, in a certain situation, an expressed "a system configured to" may imply that the system is "capable of" together with other devices or components. For example, "a processor configured (or set) to perform A, B, and C" may imply a dedicated processor (e.g., an embedded processor) for performing a corresponding operation or a generic-purpose processor (e.g., central processing unit (CPU) or an application processor) capable of performing corresponding operations by executing one or more software programs stored in a memory.

In addition, in the disclosure, it should be understood that when components are "connected" or "coupled" to each other, the components may be directly connected or coupled to each other, but may alternatively be connected or coupled to each other with a component therebetween, unless specified otherwise.

The term 'augmented reality' may be directed to technology that provides viewing of a virtual image in a physical environment space of the real world or viewing of a virtual image together with a real object.

In addition, the term 'augmented reality device' may be a device configured to create 'augmented reality', and includes not only augmented reality glasses resembling eyeglasses that are typically worn on a user's face but also head-mounted display (HMD) apparatuses and augmented reality helmets that are worn on the user's head, or the like. However, embodiments are not limited thereto, and the augmented reality device may be implemented as various electronic devices, such as a mobile device, a smart phone, a laptop computer, a desktop computer, a tablet personal computer (PC), an electronic book terminal, a digital broadcasting terminal, a personal digital assistant (PDA), a portable multimedia player (PMP), a navigation system, an MP3 player, a camcorder, an internet protocol television (IPTV), a digital television (DTV), a wearable device, and the like.

A typical augmented reality device is equipped with an optical engine to generate a virtual image composed of light generated by a light source, and a waveguide (or a light guide panel) formed of a transparent material to guide the virtual image generated by the optical engine to a user's eyes and allow the user to see a scene of the real world together with the virtual image. As described above, the augmented reality device is configured to allow the user to see a scene of the real world together with a virtual image, and thus an optical element configured to redirect the path of light that basically has straightness is required in order to guide the light generated by the optical engine to the user' eyes through the waveguide. Here, the path of the light may be redirected by using reflection by, for example, a mirror, or by using diffraction by a diffractive element, for example, a diffractive optical element (DOE) or a holographic optical element (HOE), but embodiments are not limited thereto.

In the disclosure, the term "eye relief (ER)" may be a distance between a user's eye and a lens of an augmented reality device. The ER may be a distance between an exit pupil and a surface of a variable focus lens of the augmented reality device, which is closest to the user's eye.

In the disclosure, the term 'interpupillary distance (IPD)' may be the length of a virtual line between the centers of the pupils of both eyes of the user.

In the disclosure, the term 'gaze direction' may be a direction in which the user gazes, and the term 'gaze' may be a virtual line starting from a pupil of the user in the gaze direction. Typically, a gaze direction is calculated from information obtained by an eye tracking sensor so as to estimate a gaze.

In the disclosure, the term 'gaze point' may be a point at which the user gazes, and may be calculated as a point at which the gazes of both eyes of the user intersect each other.

In the disclosure, the term 'refractive index' may be a rate at which the speed of light is reduced in a medium as compared to in a vacuum.

In the disclosure, the term 'refractive power' may be a force that changes the direction of a ray of light or an optical path by a curved surface of a lens. The refractive power is the reciprocal of a focal length, and the unit for refractive power is $m^{-1}$ or diopter (D). The sign of the refractive power is positive (+) for a convex lens and negative (−) for a concave lens.

In the disclosure, the term 'vergence' may be an index indicating a degree to which light converges or diverges. The vergence may be adjusted according to the refractive power of a lens. In an embodiment of the disclosure, an augmented reality device may adjust the refractive power of a focal region of a variable focus lens to change a direction of light or the optical path, thereby adjusting the vergence.

Hereinafter, embodiments of the disclosure will be described in detail with reference to the accompanying drawings to allow those of skill in the art to easily carry out the embodiments of the disclosure. The disclosure may, however, be embodied in many different forms and should not be construed as being limited to the embodiments of the disclosure set forth herein.

Hereinafter, embodiments of the disclosure will be described in detail with reference to the accompanying drawings.

FIG. 1A is a conceptual diagram illustrating an operation, performed by an augmented reality device 100, of determining focal regions 110A based on ER, a gaze point G, and an IPD, according to an embodiment of the disclosure.

Referring to FIG. 1A, a user wearing the augmented reality device 100 may see a real-world object ob. The augmented reality device 100 may include variable focus lenses 110L and 110R (hereinafter, also referred to as the left-eye variable focus lens 110L and the right-eye variable focus lens 110R) and eye tracking sensors 140L and 140R. However, FIG. 1A illustrates only essential components for describing an operation of the augmented reality device 100, and components included in the augmented reality device 100 are not limited those illustrated in FIG. 1A.

The variable focus lenses 110L and 110R are lenses each configured to determine its partial region as the focal region 110A and change the position of the focal region 110A. In an embodiment of the disclosure, each of the variable focus lenses 110L and 110R may be configured as an electrically tunable liquid crystal lens including liquid crystal molecules and configured to adjust a focus according to an electrical driving signal. Each of the variable focus lenses 110L and 110R is configured to locally adjust the focus of the focal region 110A by changing the arrangement angle of liquid crystal molecules in a particular region according to a control voltage applied thereto.

The augmented reality device 100 may obtain information about the ER, which is the distance between the eyes E of the user and the variable focus lenses 110L and 110R, by using the eye tracking sensors 140L and 140R. In an embodiment of the disclosure, the augmented reality device 100 may receive light reflected by the eyes E of the user by using the eye tracking sensors 140L and 140R to detect glitter patterns, and calculate (obtain) the ER based on the size of the glitter patterns. In another embodiment of the disclosure, the augmented reality device 100 may detect the pupils of the eyes E of the user by using the eye tracking sensors 140L and 140R, measure the radius of rotation of each of the detected pupils, and calculate (obtain) the ER based on the measured radii of rotation.

The augmented reality device 100 may obtain a first gaze vector U indicating a gaze direction of the left eye of the user by using a left-eye eye tracking sensor 140L (hereinafter, also referred to as the first eye tracking sensor 140L), and obtain a second gaze vector $\vec{v}$ indicating a gaze direction of the right eye of the user by using a right-eye eye tracking sensor 140R (hereinafter, also referred to as the second eye tracking sensor 140R). The augmented reality device 100 may detect a gaze point G at which the first gaze vector $\vec{u}$ and the second gaze vector $\vec{v}$ converge according to binocular disparity. The augmented reality device 100 may obtain position information (e.g., three-dimensional coordinates) of the gaze point G by using the left-eye eye tracking sensor 140L and the right-eye eye tracking sensor 140R.

The augmented reality device 100 may detect the pupils in both eyes of the user by using the eye tracking sensors 140L and 140R, and obtain information about the IPD based on a positional relationship between the pupil of the left eye and the pupil of the right eye.

The augmented reality device 100 may determine the positions of the focal regions 110A in the entire regions of the variable focus lenses 110L and 110R based on information about the ER, the gaze point G, and the IPD. In an embodiment of the disclosure, the augmented reality device 100 may determine, as the focal region 110A, a region having a preset size around a point of the left-eye variable focus lens 110L to be placed adjacent to the left eye of the user, at which a virtual line representing the first gaze vector $\vec{u}$ of the left eye toward the gaze point G meets the left-eye variable focus lens 110L. Similarly, the augmented reality device 100 may determine, as the focal region 110A, a region having a preset size around a point of the right-eye variable focus lens 110R to be placed adjacent to the right eye of the user, at which a virtual line representing the second gaze vector $\vec{v}$ of the right eye toward the gaze point G meets the right-eye variable focus lens 110R.

Figure 1B:
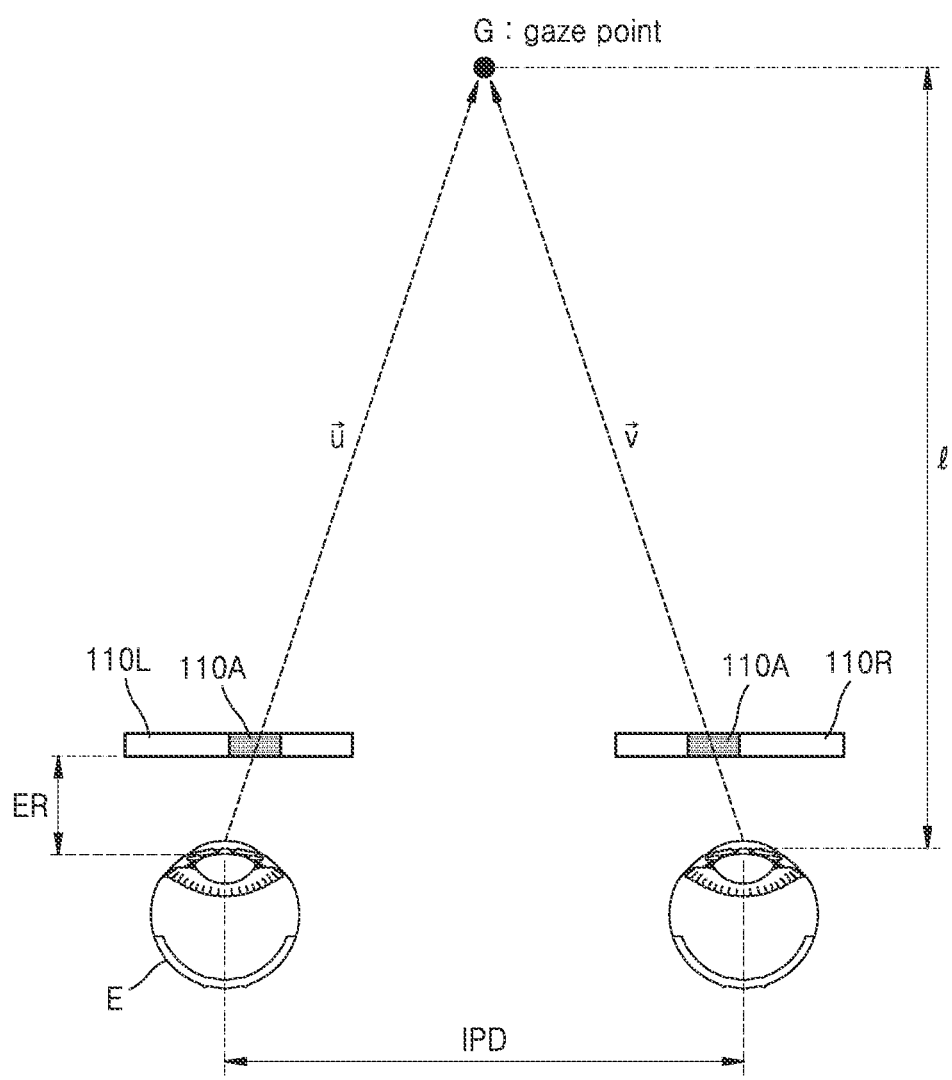
FIG. 1B is a top view illustrating an operation, performed by an augmented reality device, of determining focal regions based on ER, a gaze point, and an IPD, according to an embodiment of the disclosure.

FIG. 1B is a plan view illustrating an operation, performed by the augmented reality device 100, of determining the focal regions 110A based on the ER, the gaze point G, and the IPD, according to an embodiment of the disclosure.

Referring to FIG. 1B together with FIG. 1A, the augmented reality device 100 may detect center focuses on the variable focus lenses 110L and 110R based on the ER, a vergence distance I that is the distance between the gaze point G and crystalline lenses, the gaze vectors $\vec{u}$ and $\vec{v}$ of both eyes of the user toward the gaze point G, and the IPD, and identify the positions of the center focuses. In an embodiment of the disclosure, the augmented reality device 100 may obtain two-dimensional coordinates of the center focus on the left-eye variable focus lens 110L based on the ER, the vergence distance I, the first gaze vector $\vec{u}$), and the IPD. The augmented reality device 100 may detect the center focus based on the two-dimensional coordinates of the center focus, and determine, as the focal region 110A, a region within a radius of a preset size around the center focus on the left-eye variable focus lens 110L. Similarly, the augmented reality device 100 may obtain two-dimensional coordinates of the center focus on the right-eye variable focus lens 110R based on the ER, the vergence distance I, the second gaze vector $\vec{v}$, and the IPD. The augmented reality device 100 may detect the center focus based on the two-dimensional coordinates of the center focus, and determine, as the focal region 110A, a region within a radius of a preset size around the center focus on the right-eye variable focus lens 110R.

The augmented reality device 100 may adjust the refractive power of each of the focal regions 110A. In an embodiment of the disclosure, the augmented reality device 100 may adjust the refractive power of each of the focal regions 110A by changing the arrangement angle of liquid crystal molecules in the focal region 110A according to a control voltage, so as to adjust the vergence. The vergence is an index indicating a degree to which light converges or diverges. The vergence may be adjusted according to the refractive power of a lens.

In general, the left-eye and right-eye variable focus lenses 110L and 110R may be used to correct the user's vision or adjusting a focus with respect to a real-world object or a virtual image, by changing the positions of the focal regions 110A and adjusting the refractive power of the focal regions 110A. The focus adjustment function of the variable focus lenses 110L and 110R may be improved in proportion to the accuracy of alignment between the positions of the focal regions 110A and the visual axes of the eyes E of the user. For example, when the positions of the focal regions 110A of the variable focus lenses 110L and 110R are not accurately aligned with the visual axes of the eyes of the user, vision correction may not be appropriately performed, and the focus may not be correctly on a real-world object or a virtual image, causing user fatigue and deterioration in image quality. In order to align the positions of the focal regions 110A of the variable focus lenses 110L and 110R with the visual axes of the eyes E of the user, a method of determining the positions of the focal regions 110A by using information about the gaze direction of the user and the IPD may be used. However, in order to improve the accuracy of alignment between the focal regions and the visual axes of the eyes of the user, not only the gaze direction and the IPD, but also the ER should be considered. When the ER is longer or shorter than a reference distance, the positions of the focal regions 110A may be changed, and accordingly, the lens resolution may be reduced, and the user may experience a decrease in vision.

The augmented reality device 100 according to the embodiment of the disclosure illustrated in FIGS. 1A and 1B determines the positions of the focal regions 110A on the variable focus lenses 110L and 110R considering the ER, which is the distance between the variable focus lenses 110L and 110R and the eyes E of the user in addition to the gaze point G and the IPD, and thus, the alignment accuracy between the vision axes of the eyes of the user and the focal regions 110A may be improved. Accordingly, the augmented reality device 100 according to an embodiment of the disclosure may improve a vision correction function, improve the image quality of a real-world object or a virtual image, and reduce visual fatigue of the user.

Figure 2:
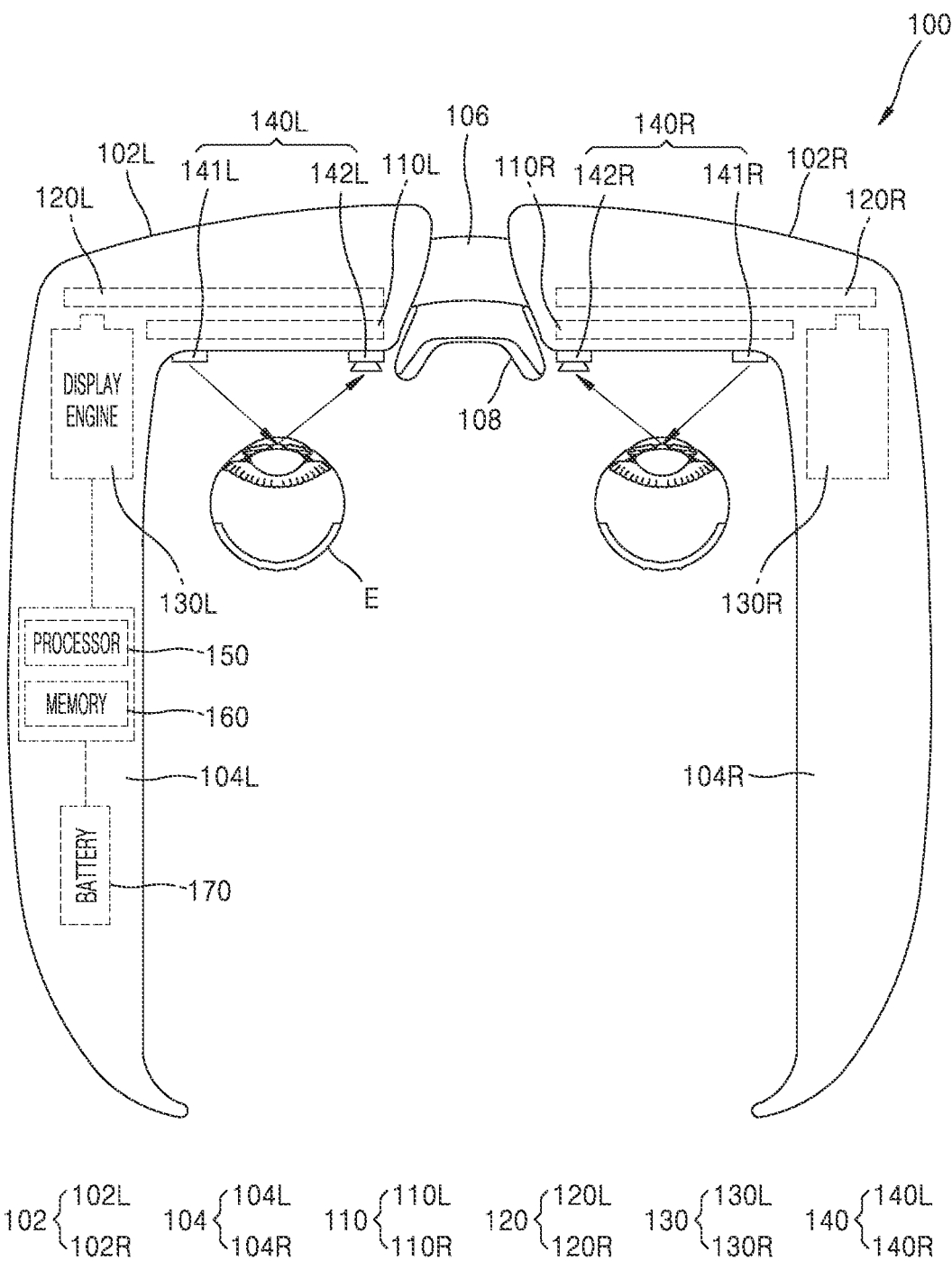
FIG. 2 is a plan view illustrating a structure of an augmented reality device according to an embodiment of the disclosure.

FIG. 2 is a plan view illustrating a structure of the augmented reality device 100 according to an embodiment of the disclosure.

Referring to FIG. 2, the augmented reality device 100 may include frames 102, temples 104, a nose bridge 106, a nose support 108, variable focus lenses 110, waveguides 120, display engines 130, the eye tracking sensors 140, a processor 150, a memory 160, and a battery 170. FIG. 2 illustrates only components for describing the structure of the augmented reality device 100, and components included in the augmented reality device 100 are not limited to those illustrated in FIG. 2.

Optical components are configured to deliver light of a virtual image output by the display engines 130 and light of a real-world scene to the user's eyes, and may include the variable focus lenses 110 and the waveguides 120. Referring to FIG. 2, the optical components may be disposed in each of the frames 102. The frames 102 may correspond to rims surrounding the left- and right-eye variable focus lenses 110L and 110R, as in a typical eyeglasses structure. Left-eye optical components including the left-eye variable focus lens 110L and a left-eye waveguide 120L may be disposed in or attached to a left frame 102L, and right-eye optical components including the right-eye variable focus lens 110R and a right-eye waveguide 120R may be disposed in or attached to a right frame 102R. However, embodiments are not limited thereto. In another embodiment of the disclosure, the left-eye optical components and the right-eye optical components may be integrally formed and mounted on the frames 102, respectively. In another embodiment of the disclosure, the optical components may be disposed only in the left frame 102L or the right frame 102R.

The display engines 130, the processor 150, the memory 160, and the battery 170 may be mounted on the temples 104. Electrical wires for electrical connection between the display engines 130, the processor 150, the memory 160, and the battery 170 may be embedded in the temples 104. In the embodiment illustrated in FIG. 2, the processor 150, the memory 160, and the battery 170 are embedded only in the left temple 104L among the temples 104, but embodiments are not limited thereto.

The nose bridge 106 is a support connecting the left frame 102L and the right frame 102R to each other. The nose bridge 106 may be connected to the nose support 108.

The nose support 108 supports the nose part of the user wearing the augmented reality device 100. The nose support 108 may include leg parts and a nose pad. In addition, the leg parts and the nose pad may be integrally formed, but are not limited thereto.

When the user wears the augmented reality device 100, the variable focus lenses 110 may be placed closest to the eyes E of the user among the optical components in the frames 102. The variable focus lenses 110 may include the left-eye variable focus lens 110L to be placed adjacent to the left eye of the user, and the right-eye variable focus lens 110R to be placed adjacent to the right eye of the user. In an embodiment of the disclosure, each of the variable focus lenses 110 may be configured as an electrically tunable liquid crystal lens including liquid crystal molecules and configured to adjust a focus according to an electrical driving signal.

When the user wears the augmented reality device 100, the waveguides 120 may be placed farther away from the eyes of the user than are the variable focus lenses 110. The waveguides 120 may be placed more adjacent to a real-world object than the eyes of the user. Each of the waveguides 120 may be formed of a transparent material such that the user may see a partial region of its rear surface. The rear surface of each of the waveguides 120 refers to the surface facing the eyes of the user, and the front surface of each of the waveguides 120 refers to the surface opposite to the rear surface (i.e., the surface farther from the eyes of the user), when the user wears the augmented reality device 100. Each of the waveguides 120 may be a flat plate having a single-layer or multi-layer structure of a transparent material in which light may propagate while reflecting. The waveguides 120 may include the left-eye waveguide 120L coupled to the left frame 102L and disposed adjacent to the left-eye variable focus lens 110L, and the right-eye waveguide 120R coupled to the right frame 102R and disposed adjacent to the right-eye variable focus lens 110R.

The material characteristics and functions of the waveguides 120 will be described in detail with reference to FIG. 3.

Each of the display engines 130 may be configured to generate light of a virtual image, and may be an optical engine of a projector including an image panel, an illumination optical system, a projection optical system, etc. The display engines 130 may include, but are not limited to, a first display engine 130L disposed in the left temple 104L and a second display engine 130R disposed in a right temple 104R. In another embodiment of the disclosure, the augmented reality device 100 may include only one display engine 130 embedded in the left temple 104L or the right temple 104R.

The configuration, operation, and functions of the display engines 130 will be described in detail with reference to FIG. 3.

Each of the eye tracking sensors 140 is a device configured to track a gaze direction of the eyes of the user. The eye tracking sensors 140 may detect a gaze direction of the user by detecting an image of a human eye or pupil or detecting the direction or amount of light, e.g., near infrared rays, reflected by a cornea. The eye tracking sensors 140 may include the left-eye eye tracking sensor 140L and the right-eye eye tracking sensor 140R, which may detect a gaze direction of the left eye of the user and a gaze direction of the right eye of the user, respectively. Detecting a gaze direction of the user may include obtaining gaze information related to a gaze of the user.

The left-eye eye tracking sensor 140L may be disposed in the left frame 102L, and the right-eye eye tracking sensor 140R may be disposed in the right frame 102R. The left-eye eye tracking sensor 140L may include a light emitter 141L and a light detector 142L and the right-eye eye tracking sensor 140R may include a light emitter 141R and a light detector 142R. In an embodiment of the disclosure, each of the light emitters 141L and 141R may include an infrared (IR) light-emitting diode (LED) configured to emit IR light to the eyes E of the user, and each of the light detectors 142L and 142R may include an IR camera configured to detect light reflected by the eyes E. However, embodiments are not limited thereto, and in another embodiment of the disclosure, each of the light emitters 141L and 141R may include an IR scanner (e.g., a microelectromechanical systems (MEMS) scanner) configured to emit linear IR light, and each of the light detector 142L and 142R may include an IR detector (e.g., a photodiode) configured to detect light reflected by the eyes E.

In the embodiment illustrated in FIG. 2, the eye tracking sensors 140L and 140R are disposed in the left frame 102L and the right frame 102R, respectively, but embodiments are not limited to thereto. In another embodiment of the disclosure, the eye tracking sensors 140L and 140R may be disposed on the temples 104L and 104R or the nose support 108.

The processor 150, the memory 160, and the battery 170 may be disposed in any one of the temples 104 or may be distributed at a plurality of positions, and may be mounted on a printed circuit board (PCB), a flexible PCB (FPCB), or the like.

Detailed configurations, operations, and functions of the processor 150 and the memory 160 will be described in detail with reference to FIG. 3.

The battery 170 is electrically and/or physically connected to the variable focus lenses 110, the display engines 130, the eye tracking sensors 140, the processor 150, and the memory 160 through cables, and supplies driving power to the variable focus lenses 110, the display engines 130, and the eye tracking sensors 140 under the control by the processor 150. In an embodiment of the disclosure, the battery 170 may include at least one battery module including a rechargeable secondary battery. The battery 170 may include, for example, a lithium-ion (Li-ion) battery, a Li-ion polymer battery (LIPB), a nickel-cadmium (Ni—Cd) battery, or a nickel-hydrogen (Ni-MH) battery, but is not limited thereto.

Figure 3:
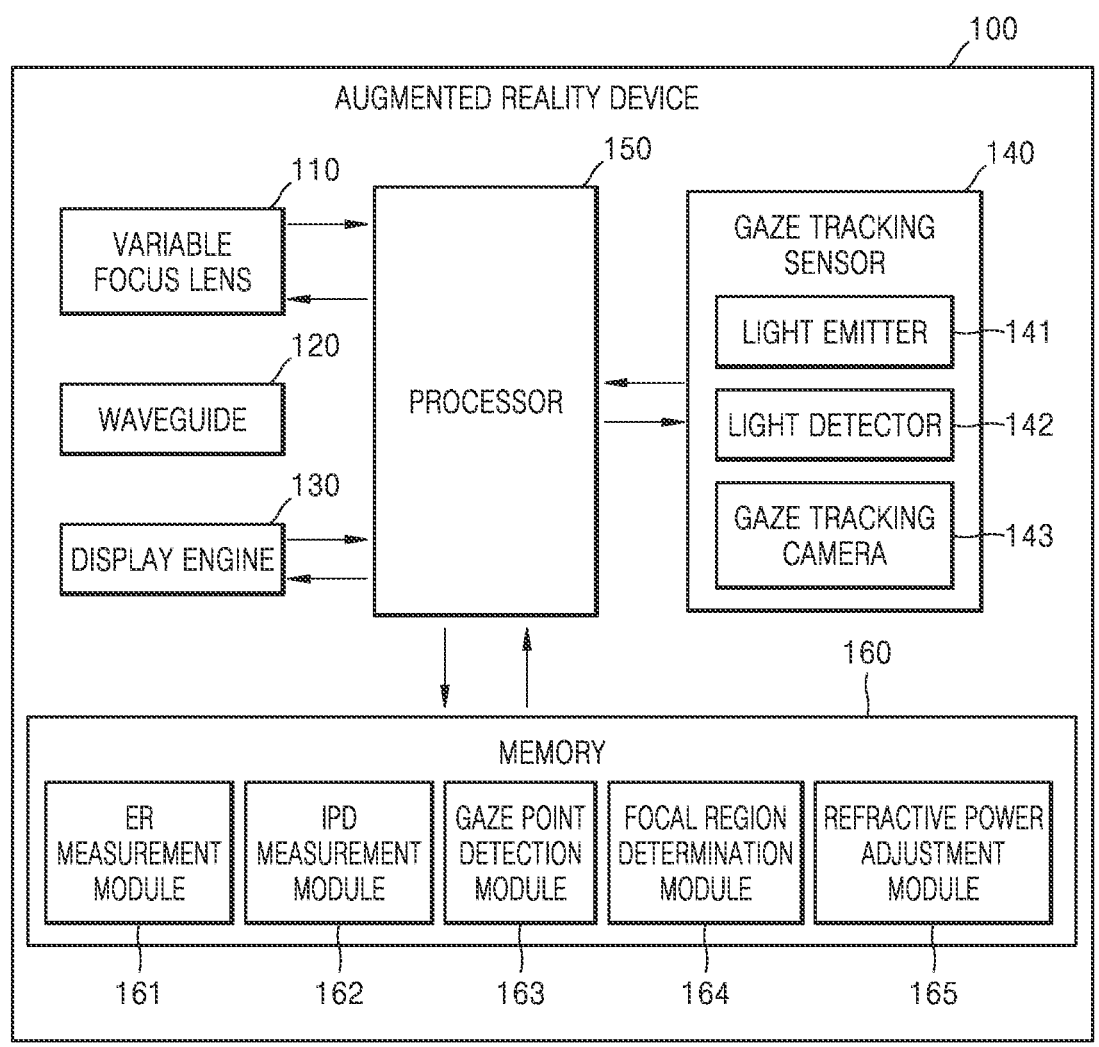
FIG. 3 is a block diagram illustrating components of an augmented reality device according to an embodiment of the disclosure.

FIG. 3 is a block diagram illustrating components of the augmented reality device 100 according to an embodiment of the disclosure.

Referring to FIG. 3, the augmented reality device 100 may include the variable focus lenses 110, the waveguides 120, the display engines 130, the eye tracking sensors 140, the processor 150, and the memory 160. The variable focus lenses 110, the display engines 130, the eye tracking sensors 140, the processor 150, and the memory 160 may be electrically and/or physically connected to each other.

The components illustrated in FIG. 3 are only components according to an embodiment of the disclosure, and the components included in the augmented reality device 100 are not limited to those illustrated in FIG. 3. The augmented reality device 100 may not include some of the components illustrated in FIG. 3, and may further include components not illustrated in FIG. 3. For example, the augmented reality device 100 may further include the battery 170 (see FIG. 2) that supplies driving power to the variable focus lenses 110, the display engines 130, the eye tracking sensors 140, the processor 150, and the memory 160. As another example, the augmented reality device 100 may further include a communication interface configured to perform data communication with an external device or server.

The variable focus lenses 110 are lenses configured to change a focus according to an electrical driving signal. Each of the variable focus lenses 110 may include a focal region configured to change or adjust the focus. In an embodiment of the disclosure, each of the variable focus lenses 110 may be configured as an electrically tunable liquid crystal lens including liquid crystal molecules and configured to adjust a focus according to an electrical driving signal. In this case, each of the variable focus lenses 110 may locally adjust the refractive power by changing the arrangement angle of liquid crystal molecules in a particular region (e.g., the focal region) according to a control voltage applied from the battery 170 (see FIG. 2). The region in which the focus is changed, i.e., the focal region may be moved on each of the variable focus lenses 110. The control voltage may be controlled by the processor 150, and may be applied to the variable focus lenses 110 by a voltage control circuit. An embodiment of the disclosure in which the refractive power of the focal region is adjusted by applying a control voltage will be described in detail with reference to FIGS. 17A and 17B.

The variable focus lenses 110 may include the left-eye variable focus lens 110L (see FIG. 2) placed in a region corresponding to the left eye of the user and the right-eye variable focus lens 110R (see FIG. 2) placed in a region corresponding to the right eye of the user, when the user wears the augmented reality device 100. Each of the left-eye right-eye variable focus lens 110L and the right-eye variable focus lens 110R may be configured as a single lens, but is not limited thereto. In an embodiment of the disclosure, a plurality of left-eye variable focus lenses 110L and a plurality of right-eye variable focus lenses 110R may be provided.

The waveguides 120 are optical elements formed of a transparent material. Each of the waveguides 120 may be formed of a transparent material such that the user wearing the augmented reality device 100 may see a partial region of its rear surface. Each of the waveguides 120 may be a flat plate having a single-layer or multi-layer structure of a transparent material in which light may propagate while being reflected. The waveguides 120 may face emission surfaces of the display engines 130, respectively, and receive light of a virtual image projected by the display engines 130. The light of the virtual image projected to the waveguides 120 may propagate in the waveguides 120 according to the principle of total reflection. The waveguides 120 may include a plurality of regions through which the path of the light is changed and finally the light is output to the eyes of the user. A diffraction grating may be formed in the plurality of regions. The waveguides 120 may have the same function as that of a light guide plate.

A plurality of waveguides 120 may be provided. In an embodiment of the disclosure, the waveguides 120 may include the left-eye waveguide 120L (see FIG. 2) coupled to the left frame 102L (see FIG. 2) and disposed adjacent to the left-eye variable focus lens 110L, and the right-eye waveguide 120R (see FIG. 2) coupled to the right frame 102R (see FIG. 2) and disposed adjacent to the right-eye variable focus lens 110R.

The display engines 130 are configured to project a virtual image to the waveguides 120, respectively. The display engine 130 may perform the same function as that of a projector. Each of the display engines 130 may further include an illumination optical system, a light path converter, an image panel, a beam splitter, and a projection optical system.

The illumination optical system is an optical component for illumination, and may include a light source and lenses. The light source is a component configured to generate light by adjusting red, green, and blue (RGB) colors, and may include, for example, LEDs.

The image panel may be a reflective image panel configured to modulate light emitted by a light source into light containing a two-dimensional image and reflecting the modulated light. The reflective image panel may be, for example, a digital micromirror device (DMD) panel, a liquid crystal on silicon (LCoS) panel, or any other known reflective image panel. The DMD panel may operate in a digital light processing (DLP) scheme, i.e., to illuminate RGB colors of light output from a light source by using a plurality of mirrors each having a pixel size, switch each of the plurality of mirrors on/off, and thus project a virtual image by mixing the RGB colors of the light. The LCoS panel may operate in a liquid crystal display (LCD) scheme, i.e., to separate light output from a light source into RGB colors by using mirrors, each of which transmits only light of a particular wavelength, input the light of the RGB colors to an image panel, and project a virtual image generated by mixing the RGB colors.

The beam splitter may be disposed between the image panel and the projection optical system. The beam splitter may be configured to transmit light emitted by the light source and then reflected by the image panel.

The projection optical system is a component configured to project, to the waveguides 120, light containing an image and reflected by the image panel, and may include one or more projection lenses.

The display engines 130 may obtain, from the processor 150, image data constituting a virtual image, generate a virtual image based on the obtained image data, and project the virtual image together with light output from the light source, to the waveguides 120 through the emission surfaces, respectively. In an embodiment of the disclosure, the processor 150 may provide the display engines 130 with image data including RGB colors and luminance values of a plurality of pixels constituting the virtual image. The display engines 130 may perform image processing by using the RGB color values and luminance values of the plurality of pixels, and project the virtual image to the waveguides 120 by controlling the light sources, respectively.

The display engines 130 may project the same virtual image to the left-eye waveguide 120L and the right-eye waveguide 120R, or project different virtual images to the left-eye waveguide 120L and the right-eye waveguide 120R, respectively.

The eye tracking sensors 140 are configured to obtain data related to the eyes of the user. The eye tracking sensors 140 may track the gaze of the eyes of the user to obtain information about a gaze direction. The eye tracking sensors 140 may detect a gaze direction of the user by emitting light such as near-infrared rays to the eyes of the user by using a light source, and receiving light reflected by the corneas of the eyes. In an embodiment of the disclosure, the eye tracking sensors 140 may obtain images of the pupils by photographing the eyes of the user. The eye tracking sensors 140 may include the left-eye eye tracking sensor 140L and the right-eye eye tracking sensor 140R, which may detect a gaze direction of the left eye of the user and a gaze direction of the right eye of the user, respectively. Detecting a gaze direction of the user may include obtaining gaze information related to a gaze of the user.

In an embodiment of the disclosure, each of the eye tracking sensors 140 may include one or more light emitters 141, one or more light detectors 142, and a gaze tracking camera 143. However, embodiments are not limited thereto, and each of the eye tracking sensors 140 according to another embodiment of the disclosure may include the light emitter 141 and the light detector 142, or may include the light emitter 141 and the gaze tracking camera 143.

The light emitter 141 is configured to emit IR light toward the eyes of the user. In an embodiment of the disclosure, each of the eye tracking sensors 140 may further include a light reflector, and the light emitter 141 may emit IR light toward the light reflector. Light reflected by the light reflector may be directed toward the eyes of the user. The light emitters 141 may be disposed on the frames 102 (see FIG. 2) (or a rim) of the augmented reality device 100. However, embodiments are not limited thereto, and the light emitters 141 may be disposed on the temples 104 (see FIG. 2) or the nose support 108 (see FIG. 2).

The light detector 142 is configured to receive light emitted by the light emitter 141 and then reflected by the eyes of the user. The light detector 142 may receive IR light reflected by the eyes of the user. The light detectors 142 may be disposed on the frames 102 (or the rim) of the augmented reality device 100 to be adjacent to the light emitters 141. However, embodiments are not limited thereto, and the light detectors 142 may be disposed on the temples 104 or the nose support 108.

In an embodiment of the disclosure, the light emitter 141 may be an IR LED that emits IR light, and the light detector 142 may be an IR camera that photographs IR light. In this case, the IR camera may photograph the eyes of the user by using the IR light reflected by the eyes of the user. When the light emitter 141 is an IR LED and the light detector 142 is an IR camera, the light emitter 141 may emit planar IR light toward the eyes of the user through the light reflector, and the light detector 142 may receive the planar IR light reflected by the eyes of the user. In an embodiment of the disclosure, a plurality of IR LEDs and a single IR camera may be provided. An embodiment of the disclosure in which the light emitter 141 includes a plurality of IR LEDs and the light detector 142 includes a single IR camera will be described in detail with reference to FIG. 5A.

In another embodiment of the disclosure, the light emitter 141 may be an IR scanner that emits IR light, and the light detector 142 may be an IR detector that detects IR light. In this case, the IR scanner may emit, toward the eyes of the user, IR light to scan the eyes of the user, and the IR detector may detect the IR light reflected by the eyes of the user. When the light emitter 141 is an IR scanner and the light detector 142 is an IR detector, the light emitter 141 may emit IR light in the form of point light or line light toward the light reflector, and the light detector 142 may receive the IR light directed to the eyes of the user by the light reflector and then reflected by the eyes of the user. In this case, the light emitter 141 may sequentially emit IR light in the form of point light or line light while moving in the direction of light emission such that the emitted IR light is incident on the entire regions in which the eyes of the user are located. In an embodiment of the disclosure, the IR scanner may include an IR LED and a MEMS scanner configured to control the direction of IR light emitted from the IR LED so as to reflect the IR light, and the IR detector may include a plurality of photodiodes. An embodiment of the disclosure in which the light emitter 141 includes a MEMS scanner and the light detector 142 includes a plurality of photodiodes will be described in detail with reference to FIG. 7A.

The gaze tracking camera 143 may include at least one camera. The gaze tracking camera 143 may include, for example, an IR camera. The augmented reality device 100 may obtain eye images by photographing the eyes of the user by using the gaze tracking camera 143, and obtain gaze information of the user from the eye images. An embodiment of the disclosure in which the processor 150 obtains gaze information of the eyes of the user by using the gaze tracking camera 143 will be described in detail with reference to FIG. 13B.

The eye tracking sensors 140 may provide the processor 150 with data related to the gaze of the eyes of the user, and the processor 150 may obtain gaze information of the user based on the data related to the gaze of the eyes of the user. The data related to the gaze of the eyes of the user is data obtained by the eye tracking sensors 140, and may include, for example, information about at least one of the positions of the pupils of the user, the position of a feature point of the pupil, the position of a glint feature point of the eyes of the user, a gaze point of the user, or a gaze direction of the user, but is not limited thereto. The gaze direction of the user may be, for example, the direction of a gaze from the center of an eye of the user toward a gaze point at which the user gazes. The gaze direction of the user may be obtained based on a gaze vector representing the direction from the center of the left eye of the user toward the gaze point, and a gaze vector representing the direction from the center of the right eye of the user toward the gaze point, but is not limited thereto.

The eye tracking sensors 140 may provide the processor 150 with information about a feature point obtained from the eyes of the user. In an embodiment of the disclosure, the eye tracking sensors 140 may emit IR light to the eyes of the user by using the respective light emitters 141, and detect the light reflected by the eyes of the user by using the respective light detectors 142. The eye tracking sensors 140 may provide the processor 150 with position information of the detected reflected light.

The processor 150 may execute one or more instructions or program code stored in the memory 160 to perform a function and/or an operation corresponding to the instructions or the program code. The processor 150 may include a hardware component that performs arithmetic operations, logic operations, input/output operations, and signal processing. For example, the processor 150 may include at least one of a CPU, a microprocessor, a graphics processing unit (GPU), an application processor (AP), an application-specific integrated circuit (ASIC), a digital signal processor (DSP), a digital signal processing device (DSPD), a programmable logic device (PLD), or a field-programmable gate array (FPGA), but is not limited thereto.

The processor 150 is illustrated as one element in FIG. 3, but is not limited thereto. In an embodiment of the disclosure, one or more processors 150 may be provided.

In an embodiment of the disclosure, the processor 150 may be configured as a dedicated hardware chip that performs artificial intelligence (AI) learning.

The memory 160 may store instructions and program code that are readable by the processor 150. The memory 160 may include, for example, at least one of flash-type memory, hard disk-type memory, multimedia card micro-type memory, card-type memory (e.g., SD or XD memory), random-access memory (RAM), static RAM (SRAM), read-only memory (ROM), electrically erasable programmable ROM (EEPROM), programmable ROM (PROM), mask ROM, flash ROM, a hard disk drive (HDD), or a solid-state drive (SSD).

The memory 160 may store instructions or program code for performing a function or operation of the augmented reality device 100. In an embodiment of the disclosure, the memory 160 may store at least one of instructions, an algorithm, a data structure, program code, or an application program, which is readable by the processor 150. The instructions, the algorithm, the data structure, and the program code stored in the memory 160 may be implemented in a programming or scripting language, for example, C, C++, Java, or an assembler.

The memory 160 may store instructions, algorithms, data structures, or program code related to an ER measurement module 161, an IPD measurement module 162, a gaze point detection module 163, a focal region determination module 164, and a refractive power adjustment module 165. The 'module' included in the memory 160 may be a unit for processing a function or operation performed by the processor 150, and may be implemented as software, such as instructions, an algorithm, a data structure, or program code.

In the following embodiments of the disclosure, the processor 150 may be implemented by executing the instructions or program code stored in the memory 160.

The ER measurement module 161 includes instructions or program code related to an operation and/or function of measuring ER, which is the distance between the eyes of the user and the variable focus lenses 110, based on position information of a plurality of feature points detected by the eye tracking sensors 140. The processor 150 may obtain information about the distance between the eyes of the user and the variable focus lenses 110 by executing the instructions or program code related to the ER measurement module 161.

In an embodiment of the disclosure, in the eye tracking sensors 140, the light emitter 141 may be an IR LED configured to emit IR light to the eyes of the user, and the light detector 142 may be an IR camera configured to detect the IR light emitted to the eyes of the user by the light emitter 141 and then reflected by the eyes. In an embodiment of the disclosure, a plurality of IR LEDs and a single IR camera may be provided. The processor 150 may control the plurality of IR LEDs to emit IR light to the eyes of the user. The processor 150 may obtain an image including the reflected IR light by photographing the eyes of the user by using the IR camera. The processor 150 may detect glint feature points of the eyes from the image obtained by using the IR camera. In an embodiment of the disclosure, the processor 150 may identify the position of a glint feature point of the eyes by identifying the brightness of the IR light received through an image sensor of the IR camera and identifying at least one pixel corresponding to IR light having a brightness greater than or equal to a reference value among pixels of the image obtained by using the IR camera. For example, the processor 150 may identify the position of the glint feature point of the eyes by identifying a pixel corresponding to the brightest IR light among the pixels of the image obtained by using the IR camera. For example, the positions of the pixels in the image obtained by using the IR camera may be identified by using a coordinate system of the IR camera, and the position of the glint feature point of the eyes may be represented by coordinates in the coordinate system of the IR camera, to indicate the position of the pixel corresponding to the glint feature point of the eyes.

The processor 150 may identify a glint pattern that is a combination of a plurality of identified glint feature points, and measure the size of the region of the glint pattern. The processor 150 may calculate (obtain) the ER based on the size of the region of the glint pattern. In an embodiment of the disclosure, the processor 150 may calculate the ER based on at least one of the size of the region of the glint pattern, a positional relationship in the arrangement of the plurality of IR LEDs, or coordinates of each pixel of the IR camera. However, embodiments are not limited thereto, and in another embodiment of the disclosure, the processor 150 may calculate the ER based on at least one of the distance between glint feature points, a positional relationship in the arrangement of the plurality of IR LEDs, or the coordinates of each pixel of the IR camera. An embodiment of the disclosure in which the processor 150 calculates the ER by using the eye tracking sensors 140 each including a plurality of IR LEDs and an IR camera will be described in detail with reference to FIGS. 5A, 5B, and 6.

In an embodiment of the disclosure, in each of the eye tracking sensors 140, the light emitter 141 may be an IR scanner configured to emit IR light to the eyes of the user, and the light detector 142 may be an IR detector configured to detect the IR light emitted to the eyes of the user by the light emitter 141 and then reflected by the eyes. In an embodiment of the disclosure, the IR scanner may include a MEMS scanner, and the IR detector may include a plurality of photodiodes. In order to scan the regions in which the eyes of the user are located, the processor 150 may sequentially emit, by using a point light source or a line light source, light to be incident on the entire regions in which the eyes of the user are located, by controlling the MEMS scanner, and sequentially receive the light reflected by the eyes of the user through the plurality of photodiodes. The processor 150 may detect glint feature points of the eyes by analyzing an array of rays of light sequentially received through the plurality of photodiodes. In an embodiment of the disclosure, the processor 150 may identify, from the array of rays of light received through a plurality of photodiodes, rays of light having a brightness greater than or equal to a reference value, and thus obtain coordinates of each of a plurality of glint feature points, which are coordinates in a coordinate system of each photodiode corresponding to each identified ray of light.

The processor 150 may obtain information about the distances between the plurality of glint feature points based on the obtained coordinates of the plurality of glint feature points, and calculate the ER based on the obtained distances between the plurality of glint feature points. In an embodiment of the disclosure, the processor 150 may calculate the ER based on the distances between the plurality of glint feature points and a positional relationship between the plurality of photodiodes. An embodiment of the disclosure in which the processor 150 calculates the ER by using the eye tracking sensors 140 each including a MEMS scanner and a plurality of photodiodes will be described in detail with reference to FIGS. 7A, 7B, and 8.

In an embodiment of the disclosure, the processor 150 may obtain an image by photographing the eyes of the user moving by a preset rotation angle, by using the eye tracking sensors 140, and detect a pupil feature point from the image. The pupil feature point may be, for example, the center point of the pupil. In an embodiment of the disclosure, the position of a pupil feature point may be identified based on coordinates representing a position in a coordinate system of the light detector 142. For example, the coordinate system of the light detector 142 may be a coordinate system of an IR camera or a coordinate system of an IR detector (e.g., a photodiode), and coordinates in the coordinate system of the light detector 142 may be two-dimensional coordinates.

The processor 150 may detect a pupil feature point by analyzing IR light detected by the light detector 142. For example, when the light detector 142 is an IR camera, the processor 150 may identify the position of the pupil feature point by analyzing an image captured by the IR camera. As another example, when the light detector 142 is an IR detector (e.g., a photodiode), the processor 150 may identify the position of the pupil feature point by analyzing IR light detected by the IR detector.

The processor 150 may measure the radius of rotation of the detected pupil feature point and calculate the ER based on the measured radius of rotation. An embodiment of the disclosure in which the processor 150 calculates the ER based on the radius of rotation of a pupil feature point will be described in detail with reference to FIGS. 9A, 9B, and 10.

The IPD measurement module 162 includes instructions or program code related to an operation and/or function of measuring the distance between the pupil of the left eye and the pupil of the right eye of the user. The processor 150 may measure the IPD of both eyes of the user by executing the instructions or program code related to the IPD measurement module 162. The processor 150 may obtain a left-eye image by photographing the left eye of the user by using a first eye tracking sensor corresponding to the left eye, and detect the left-eye pupil from the left-eye image. Similarly, the processor 150 may obtain a right-eye image of the user by using a second eye tracking sensor corresponding to the right eye, and detect the right-eye pupil from the right-eye image. The description provided above regarding a method, performed by the processor 150, of detecting a pupil feature point and detecting the position of a pupil by using the eye tracking sensors 140 will be omitted.

The processor 150 may obtain three-dimensional coordinate information of the left-eye pupil and the right-eye pupil based on a positional relationship between the first eye tracking sensor and the second eye tracking sensor, and camera attribute information. The camera attribute information may include, for example, information about at least one of a pixel coordinate system, a resolution, or a field of view (FoV). The processor 150 may calculate the IPD based on the three-dimensional coordinates of each of the left-eye pupil and the right-eye pupil. An embodiment of the disclosure in which the processor 150 calculates an IPD will be described in detail with reference to FIGS. 11 and 12.

The gaze point detection module 163 includes instructions or program code related to an operation and/or function of detecting a gaze point, which is a point at which gaze directions of both eyes of the user converge. The processor 150 may detect a gaze point by executing the instructions or program code related to the gaze point detection module 163. The processor 150 may detect pupil feature points by using the eye tracking sensors 140, and obtain information about gaze directions of both eyes of the user based on the positions of the detected pupil feature points.

The processor 150 may obtain position information of the pupils based on the positions of the pupil feature points, and obtain information about the gaze directions based on the position information of the pupils. The processor 150 may obtain gaze direction information of the left eye of the user and gaze direction information of the right eye by using the eye tracking sensors 140, and estimate coordinates of the gaze point by using binocular disparity, and gaze information about the gaze direction of the left eye, and the gaze direction of the right eye. An embodiment of the disclosure in which the processor 150 detects a gaze point and obtains coordinate information about the gaze point will be described in detail with reference to FIGS. 13A to 13D, 14, and 15.

The focal region determination module 164 includes instructions or program code related to an operation and/or function of determining the positions of focal regions in the variable focus lenses 110, respectively, based on information about ER, a gaze point, and an IPD. The processor 150 may determine the positions of the focal regions in the variable focus lenses 110, respectively, by executing the instructions or program code related to the focal region determination module 164. The processor 150 may obtain coordinates of a center focus based on the ER, the distance between the gaze point and the eyes of the user, and the IPD. In an embodiment of the disclosure, the coordinates of the center focus may be two-dimensional coordinates of a particular point in the variable focus lens. The processor 150 may determine, as a focal region, a region having a preset size around the obtained position of the center focus. According to an embodiment of the disclosure, the processor 150 may determine, as a focal region, a circle having a preset radius around the two-dimensional coordinates of the center focus.

In an embodiment of the disclosure, the processor 150 may determine, as a center focus, a point on the left-eye variable focus lens 110L (see FIG. 2) at which a virtual straight line representing the gaze direction of the left eye toward the gaze point meets the left-eye variable focus lens 110L, and determine, as the focal region of the left-eye variable focus lens 110L, a region having a preset size around the center focus. Similarly, the processor 150 may determine, as a center focus, a point on the right-eye variable focus lens 110R (see FIG. 2) at which a virtual straight line representing the gaze direction of the right eye toward the gaze point meets the right-eye variable focus lens 110R, and determine, as the focal region of the right-eye variable focus lens 110R, a region having a preset size around the center focus. An embodiment of the disclosure in which the processor 150 determines the position of a focal region will be described in detail with reference to FIG. 16.

The refractive power adjustment module 165 may include instructions or program code related to an operation and/or function of changing the arrangement angle of liquid crystal molecules in focal regions by applying a control voltage to the variable focus lenses 110, so as to adjust the refractive power of the focal regions. The processor 150 may adjust the refractive power of a focal region and adjust the refractive index for light being transmitted through the focal region, by executing the instructions or program code related to the refractive power adjustment module 165. The processor 150 may adjust the vergence of each of the variable focus lenses 110 by adjusting the refractive power of the focal region. The vergence is an index indicating a degree to which light converges or diverges, and may be adjusted according to the refractive power of a lens. In an embodiment of the disclosure, the processor 150 may adjust the vergence of each of the variable focus lenses 110 by adjusting the refractive power of the focal region in a first direction, and adjust the focal length for a real-world object or a virtual image. When the vergence of the focal region is adjusted in the direction of divergence, the path of light transmitted through the focal region is lengthened, and thus, the focal length for a real-world object or a virtual image formed on the retina of the eye of the user may be lengthened. In another embodiment of the disclosure, the focal length may be adjusted to be equal to the vergence distance of both eyes as the processor 150 adjusts the vergence of the focal regions.

The processor 150 may adjust the refractive power of the focal regions and adjusting the focal length so that the vision of the user may be corrected. In this case, the variable focus lenses 110 may be used as vision correction lenses.

An embodiment of the disclosure in which the processor 150 adjusts the refractive power of a focal region and changes the vergence of the focal region will be described in detail with reference to FIGS. 17A, 17B, 18, and 19.

Figure 4:
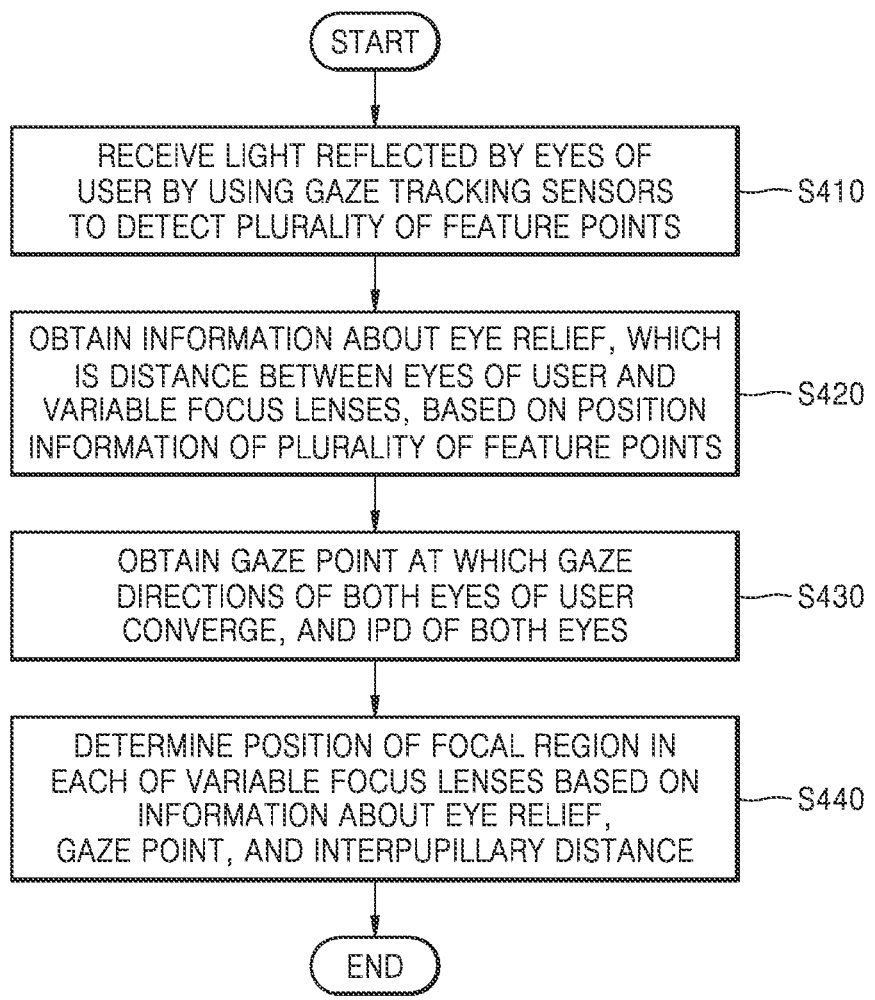
FIG. 4 is a flowchart of an operating method of an augmented reality device according to an embodiment of the disclosure.

FIG. 4 is a flowchart of an operating method of the augmented reality device 100 according to an embodiment of the disclosure.

In operation S410, the augmented reality device 100 receives light reflected by the eyes of the user by using the eye tracking sensors 140 (see FIGS. 2 and 3) to detect a plurality of feature points. In an embodiment of the disclosure, each of the eye tracking sensors 140 may include an IR light source configured to emit IR light to the eyes of the user and an IR camera configured to obtain an image by photographing the IR light reflected by the eyes of the user. The IR light source may include, for example, a plurality of IR LEDs. The augmented reality device 100 may control the IR light source to emit IR light to the eyes of the user, and detect a plurality of glint feature points from an image obtained by photographing the light reflected by the eyes of the user by using the IR camera. In an embodiment of the disclosure, the augmented reality device 100 may identify the position of a glint feature point of the eyes by identifying the brightness of the IR light received through an image sensor of the IR camera and detecting at least one pixel corresponding to IR light having a brightness greater than or equal to a reference value among pixels of the image obtained by using the IR camera.

In an embodiment of the disclosure, each of the eye tracking sensors 140 may include an IR scanner configured to emit IR light to the eyes of the user and an IR detector configured to detect the IR light reflected by the eyes of the user. The IR scanner may include, for example, a MEMS scanner, and the IR detector may include, for example, a plurality of photodiodes. The augmented reality device 100 may sequentially emit, by using a point light source or a line light source, light to be incident on the entire regions in which the eyes of the user are located, by controlling the IR scanner, and sequentially receive the light reflected by the eyes of the user through the IR detector. The augmented reality device 100 may detect glint feature points of the eyes by analyzing an array of rays of light sequentially received through the IR detector. In an embodiment of the disclosure, the augmented reality device 100 may detect, from the array of rays of light received through the plurality of photodiodes, rays of light having a brightness greater than or equal to a reference value, and thus obtain coordinates of each of a plurality of glint feature points, which are coordinates in a coordinate system of each photodiode corresponding to each detected ray of light.

In an embodiment of the disclosure, the augmented reality device 100 may obtain an image by photographing the eyes of the user moving by a preset rotation angle, by using the eye tracking sensors 140, and detect a pupil feature point from the image. The pupil feature point may be, for example, the center point of the pupil. In an embodiment of the disclosure, the position of a pupil feature point may be identified based on coordinates representing a position in a coordinate system of the light detector 142 (see FIG. 3) of each of the eye tracking sensors 140. For example, when the light detector 142 is an IR camera, the augmented reality device 100 may identify the position of the pupil feature point by analyzing an image captured by the IR camera. As another example, when the light detector 142 is an IR detector (e.g., a photodiode), the augmented reality device 100 may identify the position of the pupil feature point by analyzing IR light detected by the IR detector.

In operation S420, the augmented reality device 100 obtains information about the ER, which is the distance between the eyes of the user and the variable focus lenses, based on position information of the plurality of feature points. The augmented reality device 100 may calculate the ER based on the size of a region of a glint pattern, which is a combination of a plurality of glint feature points. In an embodiment of the disclosure, the augmented reality device 100 may calculate the ER based on at least one of a positional relationship between the plurality of IR LEDs or coordinates of each pixel of the IR camera. In an embodiment of the disclosure, the augmented reality device 100 may obtain information about the distances between the plurality of glint feature points based on the position information of the plurality of glint feature points, and calculate the ER based on the obtained distances between the plurality of glint feature points. In an embodiment of the disclosure, the augmented reality device 100 may measure the radius of rotation of a pupil feature point and calculate the ER based on the measured radius of rotation.

In operation S430, the augmented reality device 100 obtains a gaze point at which the gaze directions of both eyes of the user converge, and the IPD of both eyes. In an embodiment of the disclosure, the augmented reality device 100 may detect the left-eye pupil from a left-eye image obtained by using a first eye tracking sensor, and detect the right-eye pupil from a right-eye image obtained by using a second eye tracking sensor. The augmented reality device 100 may obtain three-dimensional coordinates of the left-eye pupil and the right-eye pupil based on a positional relationship between the first eye tracking sensor and the second eye tracking sensor, and camera attribute information, and calculate (obtain) the IPD based on the three-dimensional coordinates of the left-eye pupil and the right-eye pupil.

In an embodiment of the disclosure, the augmented reality device 100 may detect the pupil from the left eye of the user by using the first eye tracking sensor, and detect the pupil from the right eye of the user by using the second eye tracking sensor. The augmented reality device 100 may obtain gaze direction information of the left eye based on the position of the pupil detected from the left eye, and obtain gaze direction information of the right eye based on the position of the pupil detected from the right eye. The augmented reality device 100 may estimate coordinates of the gaze point by using binocular disparity and gaze information about the gaze direction of the left eye, and the gaze direction of the right eye.

In operation S440, the augmented reality device 100 determines the position of a focal region in each of the variable focus lenses based on the information about the ER, the gaze point, and the IPD. In an embodiment of the disclosure, the augmented reality device 100 may obtain coordinates of a center focus based on the ER, the vergence distance, which is the distance between the gaze point and the eyes of the user, and the IPD. In an embodiment of the disclosure, the coordinates of the center focus may be two-dimensional coordinates of a particular point in the variable focus lens. The augmented reality device 100 may determine, as a focal region, a region having a preset size around the obtained position of the center focus.

In an embodiment of the disclosure, the augmented reality device 100 may determine, as a center focus, a point on the left-eye variable focus lens 110L (see FIG. 2) at which a virtual straight line representing the gaze direction of the left eye toward the gaze point meets the left-eye variable focus lens 110L, and determine, as the focal region of the left-eye variable focus lens 110L, a region having a preset size around the center focus. Similarly, the augmented reality device 100 may determine, as a center focus, a point on the right-eye variable focus lens 110R (see FIG. 2) at which a virtual straight line representing the gaze direction of the right eye toward the gaze point meets the right-eye variable focus lens 110R, and determine, as the focal region of the right-eye variable focus lens 110R, a region having a preset size around the center focus.

Figure 5A:
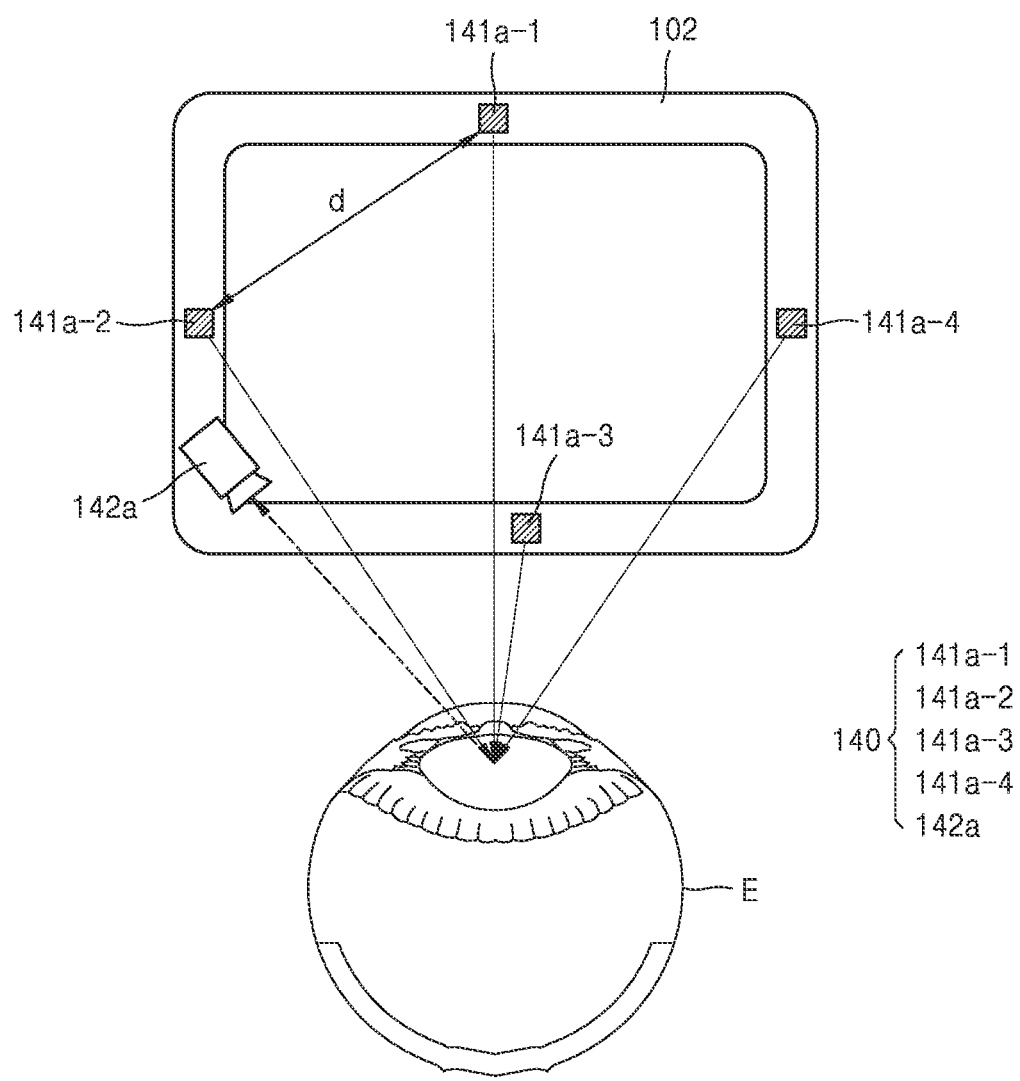
FIG. 5A is a diagram illustrating an operation, performed by an augmented reality device, of detecting a glint pattern of an eye by using an eye tracking sensor, according to an embodiment of the disclosure.

FIG. 5A is a diagram illustrating an operation, performed by the augmented reality device 100, of detecting a glint pattern of an eye by using the eye tracking sensor 140, according to an embodiment of the disclosure.

Figure 5B:
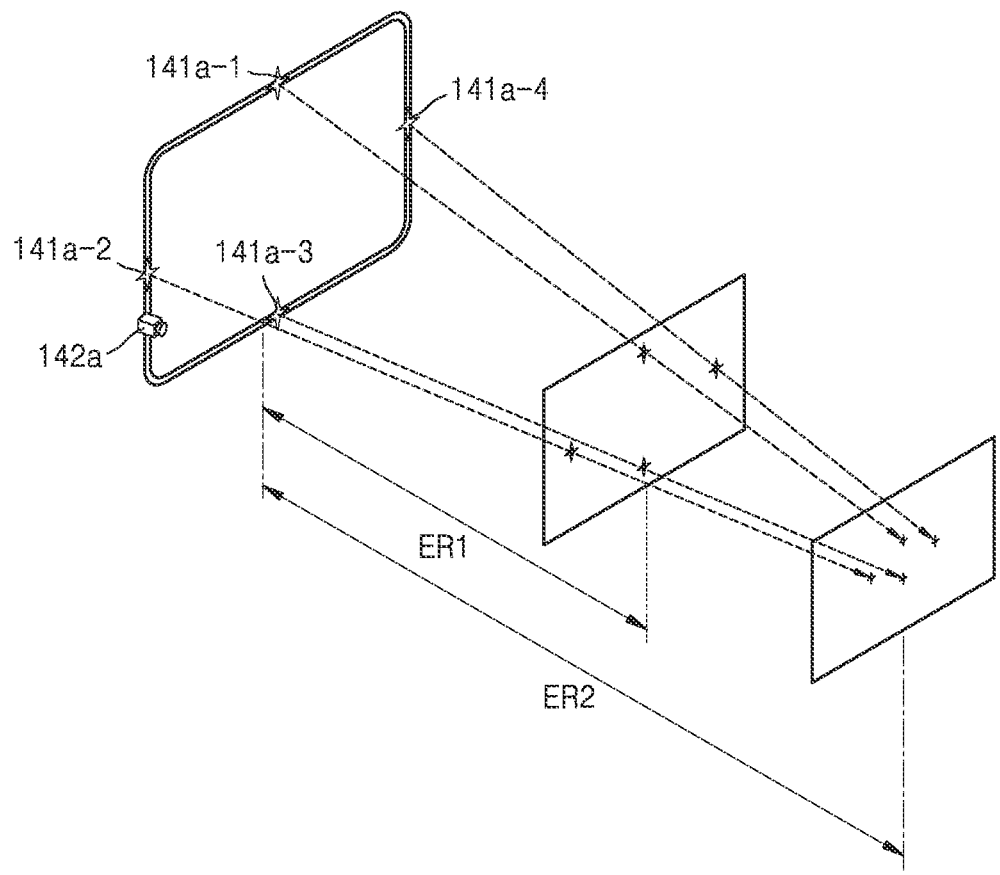
FIG. 5B is a diagram illustrating an operation, performed by an augmented reality device, of detecting glint patterns from images obtained by using an eye tracking sensor, according to an embodiment of the disclosure.
Figure 5B:
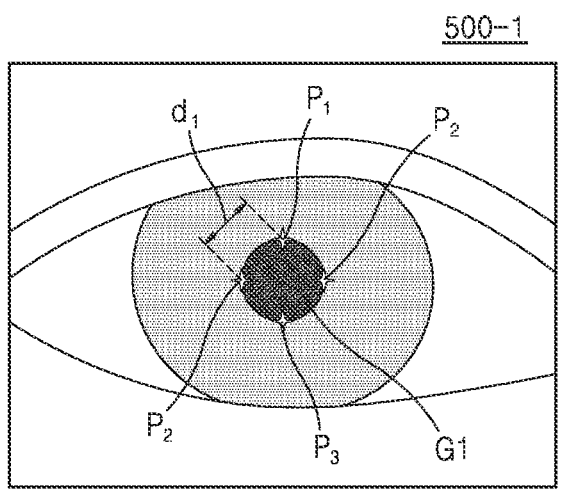
Figure 5B:
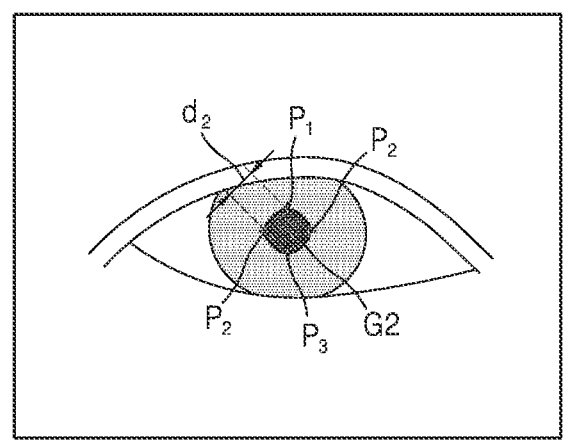

FIG. 5B is a diagram illustrating an operation, performed by the augmented reality device 100, of detecting glint patterns G1 and G2 from images 500-1 and 500-2 obtained by using the eye tracking sensor 140 (see FIG. 5A), according to an embodiment of the disclosure.

Figure 6:
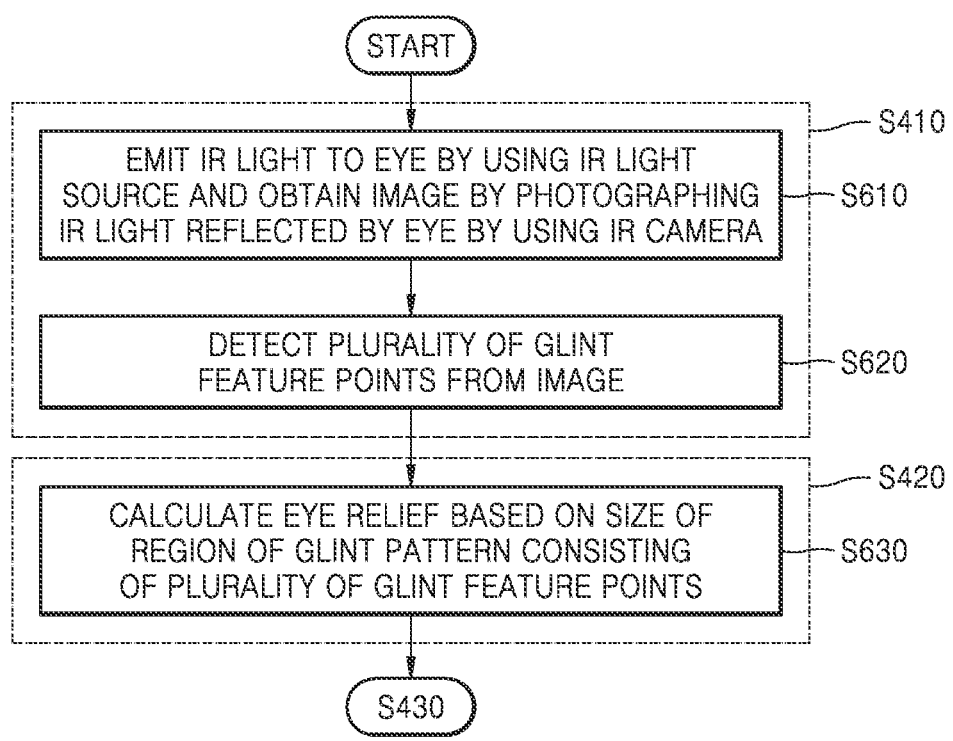
FIG. 6 is a flowchart of a method, performed by an augmented reality device, of obtaining information about ER by using a glint pattern detected by using an eye tracking sensor, according to an embodiment of the disclosure.

FIG. 6 is a flowchart of a method, performed by the augmented reality device 100, of obtaining information about ER by using a glint pattern detected by using the eye tracking sensor 140 (see FIG. 5A), according to an embodiment of the disclosure. In FIG. 6, operations S610 and S620 are detailed operations corresponding to operation S410 in FIG. 4. In FIG. 6, operations S630 is a detailed operation corresponding to operation S420 in FIG. 4. After operation S630 of FIG. 6 is performed, operation S430 of FIG. 4 may be performed.

Hereinafter, an operation, performed by the augmented reality device 100, of obtaining information about ER will be described with reference to FIGS. 5A, 5B, and 6.

Referring to FIG. 5A, the eye tracking sensor 140 may include a plurality of light emitters 141a-1, 141a-2, 141a-3, and 141a-4 and a light detector 142a. According to an embodiment of the disclosure, the plurality of light emitters 141a-1 to 141a-4 may be configured as IR LEDs configured to emit IR light to an eye E of the user, and the light detector 142a may be configured as an IR camera configured to obtain an image by photographing the IR light reflected by the eye E of the user. FIG. 5A illustrates four light emitters 141a-1 to 141a-4, but embodiments are not limited thereto. In another embodiment of the disclosure, the eye tracking sensor 140 may include two or more light emitters or a single light emitter.

The plurality of light emitters 141a-1 to 141a-4 may be disposed on the lens frame 102 (or a rim) of the augmented reality device 100 to be spaced apart from each other by a preset distance d. The distance d between the plurality of light emitters 141a-1 to 141a-4 and their position information may be stored in a storage space in the memory 160 (see FIG. 3) of the augmented reality device 100.

Referring to FIG. 6, in operation S610, the augmented reality device 100 emits IR light to the eye by using an IR light source, and obtains an image by photographing the IR light reflected by the eye by using the IR camera. Referring to FIG. 5A together, the processor 150 (see FIG. 3) of the augmented reality device 100 may apply power to the plurality of light emitters 141a-1 to 141a-4, which are IR light sources, and control the plurality of light emitters 141a-1 to 141a-4 to emit IR light to a particular region of the eye E of the user. The processor 150 may control the light detector 142a including an IR camera to receive and photograph the IR light reflected by the eye E of the user, and thus obtain an image 500-1 or 500-2 (see FIG. 5B) (hereinafter, also referred to as the first image 500-1 and the second image 500-2).

In an embodiment of the disclosure, the plurality of light emitters 141a-1 to 141a-4 may be IR LEDs configured to emit flickering IR light, and in this case, the light detector 142a may be an IR event camera. The IR event camera may be an IR camera configured to be activated when a particular event occurs and then automatically photograph an object. The IR event camera may be activated, for example, when the pattern of the flickering light changes, to automatically photograph the eye E of the user.

In operation S620, the augmented reality device 100 detects a plurality of glint feature points from the image. Referring to FIG. 5B together, the processor 150 of the augmented reality device 100 may detect a plurality of glint feature points $P_1$, $P_2$, $P_3$, and $P_4$ (hereinafter, also referred to as the first to fourth glint feature points $P_1$ to $P_4$) by analyzing the image 500-1 or 500-2 obtained by photographing the eye E of the user by using the light detector 142a (see FIG. 5A). In an embodiment of the disclosure, the light detector 142a may be an IR camera, and the processor 150 may identify the brightness of IR light received through an image sensor of the IR camera. The processor 150 may detect a pixel corresponding to IR light having a brightness greater than or equal to a preset reference value among the pixels of the image 500-1 or 500-2 captured by the IR camera, and thus identify the positions of the plurality of glint feature points $P_1$ to $P_4$. For example, the processor 150 may detect a pixel corresponding to the brightest IR light among the pixels of the image 500-1 or 500-2 captured by the IR camera, and thus identify the positions of the plurality of glint feature points $P_1$ to $P_4$. For example, the positions of the pixels in the image 500-1 or 500-2 captured by the IR camera may be identified based on the coordinate system of the IR camera, and the positions of the plurality of glint feature points $P_1$ to $P_4$ may be represented by coordinates in the coordinate system of the IR camera, i.e., coordinates of corresponding pixels.

The plurality of glint feature points $P_1$ to $P_4$ may correspond to the plurality of light emitters 141a-1 to 141a-4, respectively. For example, the first glint feature point $P_1$ may be a feature point detected by photographing light emitted by the first light emitter 141a-1 and then reflected by the eye E, the second glint feature point $P_2$ may be a feature point detected by photographing light emitted by the second light emitter 141a-2 and then reflected by the eye E, the third glint feature point $P_3$ may be a feature point detected by photographing light emitted by the third light emitter 141a-3 and then reflected by the eye E, and the fourth glint feature point $P_4$ may be a feature point detected by photographing light emitted by the fourth light emitter 141a-4 and then reflected by the eye E.

In operation S630, the augmented reality device 100 calculates (obtains) the ER based on the size of a region of a glint pattern G1 or G2 consisting of the plurality of glint feature points $P_1$ to $P_4$. Referring to FIG. 5B together, the first image 500-1 is an image obtained by photographing the eye E by using the light detector 142a when the distance between the plurality of light emitters 141a-1 to 141a-4 and the eye E of the user is ER1, and the second image 500-2 is an image obtained by photographing the eye E by using the light detector 142a when the distance between the plurality of light emitters 141a-1 to 141a-4 and the eye E of the user is ER2. The distance between the plurality of light emitters 141a-1 to 141a-4 and the eye E of the user is inversely proportional to the size of the region of the glint pattern G1 or G2 consisting of the plurality of glint feature points $P_1$ to $P_4$. For example, as the distance between the plurality of light emitters 141a-1 to 141a-4 and the eye E of the user decreases, the size of the region of the glint pattern G1 or G2 may increase. In the embodiment illustrated in FIG. 5B, the size of the glint pattern G1 of the first image 500-1 corresponds to the case in which the distance between the plurality of light emitters 141a-1 to 141a-4 and the eye E of the user is ER1, and the size of the glint pattern G1 may be greater than the size of the glint pattern G2 detected from the second image 500-2, which corresponds to the case in which the distance between the plurality of light emitters 141a-1 to 141a-4 and the eye E of the user is ER2.

The processor 150 may calculate the ER based on at least one of the size of the region of the glint pattern G1 or G2, the positional relationship between the plurality of light emitters 141a-1 to 141a-4, or the coordinates of each pixel of the light detector 142a. Referring to FIG. 5A together, the distance d between the plurality of IR LEDs and the positional relationship therebetween on the lens frame 102 may be stored in the memory 160. In an embodiment of the disclosure, the processor 150 may load, from the memory 160, information about the distance d between the plurality of IR LEDs and the positional relationship, and calculate the ER ER1 based on the position information of the plurality of IR LEDs, the pixel coordinate system of the IR camera, which are loaded from the memory 160, and the size of the glint pattern G1 detected from the first image 500-1. In the same manner, the processor 150 may load, from the memory 160, the information about the distance d between the plurality of IR LEDs and the positional relationship, and calculate the ER ER2 based on the position information of the plurality of IR LEDs, the pixel coordinate system of the IR camera, which are loaded from the memory 160, and the size of the glint pattern G2 detected from the second image 500-2.

However, embodiments are not limited thereto, and the processor 150 may calculate the ER based on a distance $d_1$ or $d_2$ between the plurality of glint feature points $P_1$ to $P_4$. In another embodiment of the disclosure, the processor 150 may calculate the ER ER1 based on the distance $d_1$ between the plurality of glint feature points $P_1$ to $P_4$ detected from the first image 500-1, the distance d between the plurality of light emitters 141a-1 to 141a-4 (e.g., IR LEDs) on the lens frame 102 (see FIG. 5A), and the pixel coordinate system of the light detector 142a (e.g., an IR camera). In the same manner, the processor 150 may calculate the ER ER2 based on the distance $d_2$ between the plurality of glint feature points $P_1$ to $P_4$ detected from the second image 500-2, the distance d between the plurality of light emitters 141a-1 to 141a-4 (e.g., IR LEDs) on the lens frame 102 (see FIG. 5A), and the pixel coordinate system of the light detector 142a (e.g., an IR camera).

Figure 7A:
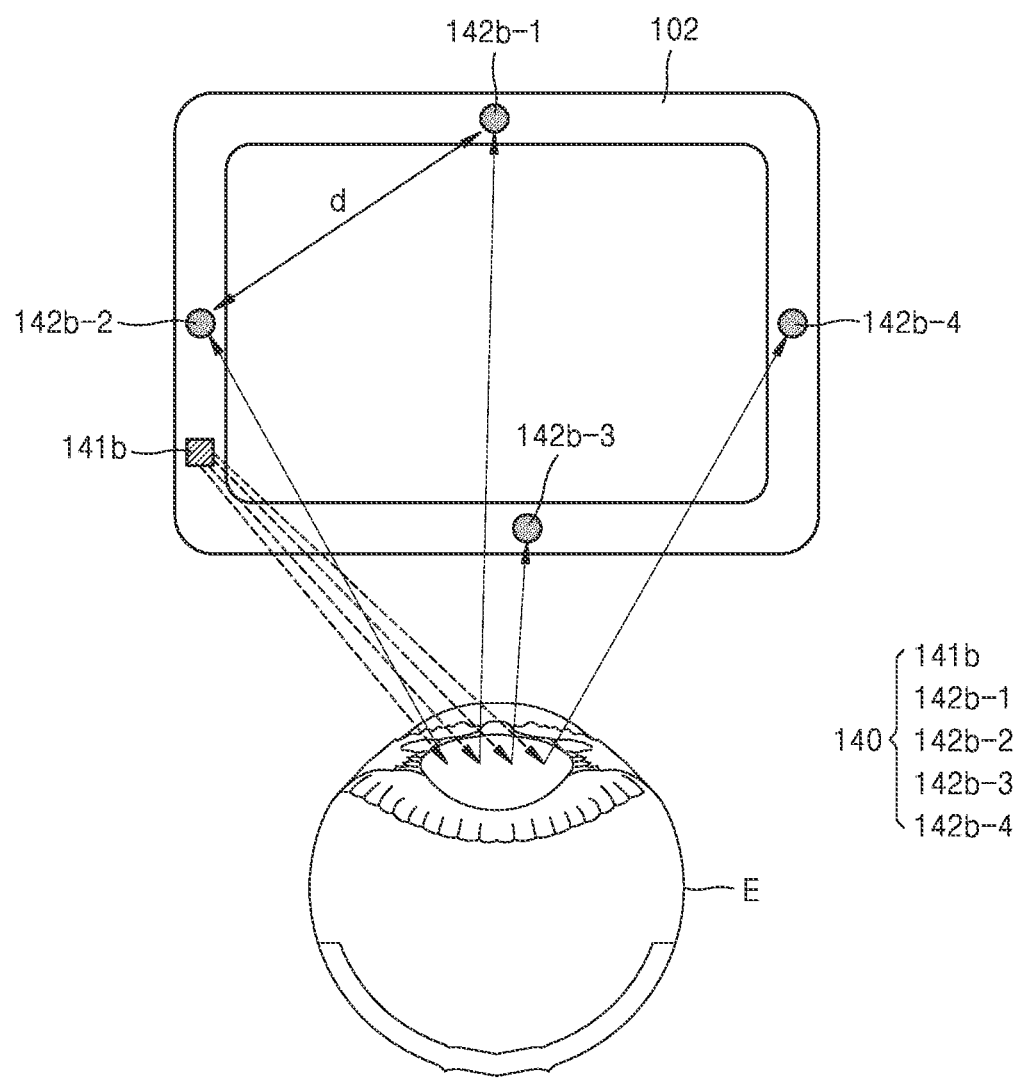
FIG. 7A is a diagram illustrating an operation, performed by an augmented reality device, of detecting a glint feature point of an eye by using an eye tracking sensor, according to an embodiment of the disclosure.

FIG. 7A is a diagram illustrating an operation, performed by the augmented reality device 100, of detecting a glint feature point of an eye by using the eye tracking sensor 140, according to an embodiment of the disclosure.

Figure 7B:
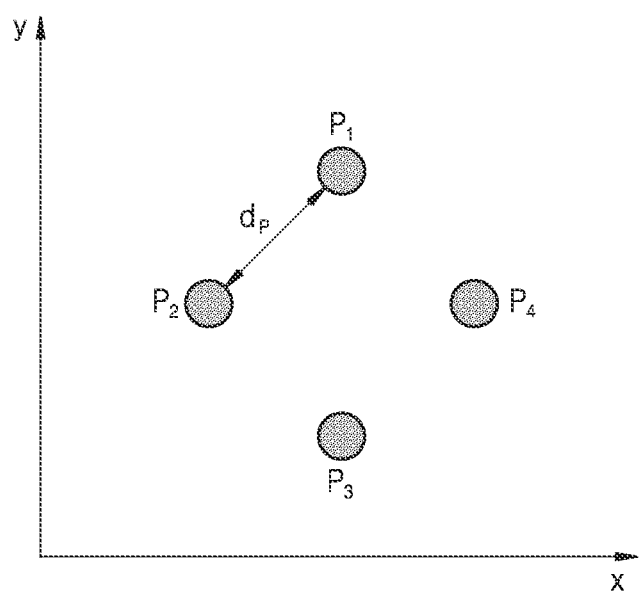
FIG. 7B is a diagram for describing an operation, performed by an augmented reality device, of detecting glint feature points by using an eye tracking sensor, according to an embodiment of the disclosure.

FIG. 7B is a diagram for describing an operation, performed by the augmented reality device 100, of detecting the glint feature points $P_1$ to $P_4$ by using the eye tracking sensor 140 (see FIG. 7A), according to an embodiment of the disclosure.

Figure 8:
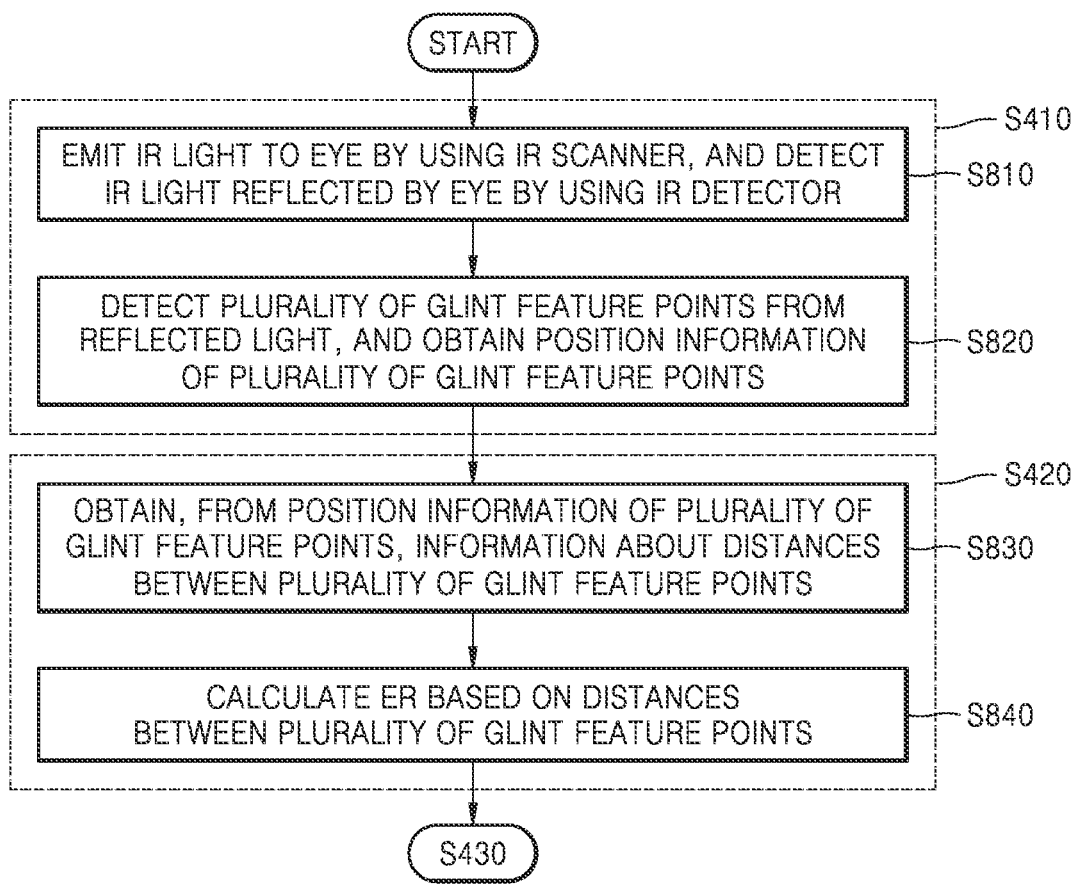
FIG. 8 is a flowchart of a method, performed by an augmented reality device, of obtaining information about ER by using glint feature points detected by using an eye tracking sensor, according to an embodiment of the disclosure.

FIG. 8 is a flowchart of a method, performed by the augmented reality device 100, of obtaining information about ER by using the glint feature points $P_1$ to $P_4$ (see FIG. 7B) detected by using the eye tracking sensor 140 (see FIG. 7A), according to an embodiment of the disclosure. In FIG. 8, operations S810 and S820 are detailed operations corresponding to operation S410 in FIG. 4. In FIG. 8, operations S830 and S840 are detailed operations corresponding to operation S420 in FIG. 4. After operation S840 of FIG. 8 is performed, operation S430 of FIG. 4 may be performed.

Hereinafter, an operation, performed by the augmented reality device 100, of obtaining information about ER will be described with reference to FIGS. 7A, 7B, and 8.

Referring to FIG. 7A, the eye tracking sensor 140 may include a light emitter 141*b* and a plurality of light detectors 142*b*-1, 142*b*-2, 142*b*-3, and 141*b*-4. In an embodiment of the disclosure, the light emitter 141*b* may include an IR scanner configured to emit IR light to the eye E of the user. For example, the light emitter 141*b* may include a MEMS scanner configured to emit IR light in the form of point light or line light toward a light reflector, such that the emitted IR light is reflected by the light reflector to be directed to the eye of the user. The plurality of light detectors 142*b*-1 to 142*b*-4 may be two-dimensional IR detectors configured to detect IR light reflected by the eye E of the user. For example, the plurality of light detectors 142*b*-1 to 142*b*-4 may be photodiodes. FIG. 7A illustrates four light detectors 142*b*-1 to 142*b*-4, but embodiments are not limited thereto. In another embodiment of the disclosure, the eye tracking sensor 140 may include two or more light detectors or a single photodiode.

Referring to FIG. 8, in operation S810, the augmented reality device 100 emits IR light to an eye by using an IR scanner, and detects the IR light reflected by the eye by using an IR detector. Referring to FIG. 7A together, the processor 150 (see FIG. 3) of the augmented reality device 100 may control the light emitter 141*b* including an IR scanner to sequentially emit, by using a point light source or a line light source, light to be incident on the entire region in which the eye E of the user is located. The processor 150 may sequentially receive the IR light reflected by the eye E of the user, by using the plurality of light detectors 142*b*-1 to 142*b*-4, which are IR detectors.

In operation S820, the augmented reality device 100 detects a plurality of glint feature points from the reflected light, and obtains position information of the plurality of glint feature points. Referring to FIG. 7B together, the processor 150 of the augmented reality device 100 may detect the glint feature points of the eye by analyzing an array of rays of light sequentially received through the plurality of light detectors 142*b*-1 to 142*b*-4 (see FIG. 7A). When the plurality of light detectors 142*b*-1 to 142*b*-4 are IR detectors, the processor 150 may identify coordinates corresponding to each of the glint feature points $P_1$ to $P_4$ based on characteristics (e.g., brightness) of the rays of IR light in the array sequentially received through the plurality of IR detectors. According to an embodiment of the disclosure, the processor 150 may detect the plurality of glint feature points $P_1$ to $P_4$ including rays of IR light having a brightness greater than or equal to a preset reference, among the array of rays of IR light received through the plurality of IR detectors, and obtain coordinates corresponding to each of the plurality of glint feature points $P_1$ to $P_4$.

The plurality of glint feature points $P_1$ to $P_4$ may correspond to the plurality of light detectors 142*b*-1 to 142*b*-4, respectively. For example, the first glint feature point $P_1$ may be a feature point obtained by detecting IR light emitted to the eye E by the light emitter 141*b* (see FIG. 7A) and then reflected by the eye E by using the first light detector 142*b*-1, the second glint feature point $P_2$ may be a feature point obtained by detecting the IR light reflected by the eye E by using the second light detector 142*b*-2, the third glint feature point $P_3$ may be a feature point obtained by detecting the IR light reflected by the eye E by using the third light detector 142*b*-3, and the fourth glint feature point $P_4$ may be a feature point obtained by detecting the IR light reflected by the eye E by using the fourth light detector 142*b*-4.

In operation S830, the augmented reality device 100 obtains, from position information of the plurality of glint feature points, information about distances between the plurality of glint feature points. Referring to FIG. 7B, the processor 150 of the augmented reality device 100 may obtain information about a distance $d_P$ between the plurality of glint feature points $P_1$ to $P_4$ by using information about coordinates of the plurality of glint feature points $P_1$ to $P_4$ detected by using the plurality of IR detectors.

In operation S840, the augmented reality device 100 calculates the ER based on the distances between the plurality of glint feature points. Referring to FIG. 7B together, the processor 150 of the augmented reality device 100 may calculate the ER based on the distance $d_P$ between the plurality of glint feature points $P_1$ to $P_4$ and the positional relationship between the plurality of light detectors 142*b*-1 to 142*b*-4 (e.g., a plurality of photodiodes).

Figure 9A:
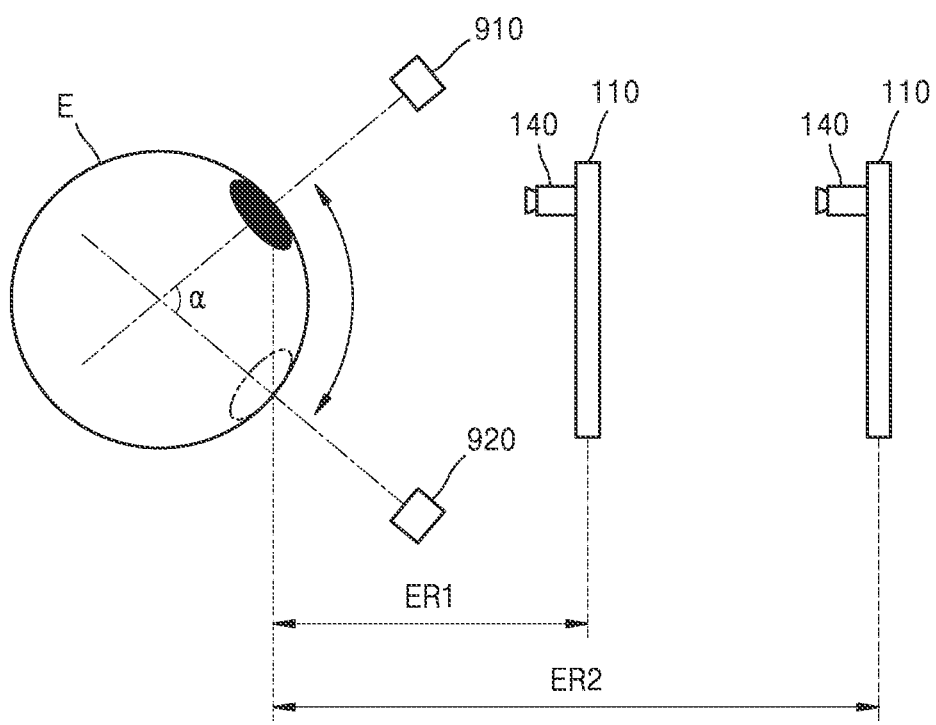
FIG. 9A is a diagram illustrating an operation, performed by an augmented reality device, obtaining information about ER by using a radius of rotation of an eye of a user, according to an embodiment of the disclosure.

FIG. 9A is a diagram illustrating an operation, performed by the augmented reality device 100, obtaining information about ER by using a radius of rotation of an eye of a user, according to an embodiment of the disclosure.

Figure 9B:
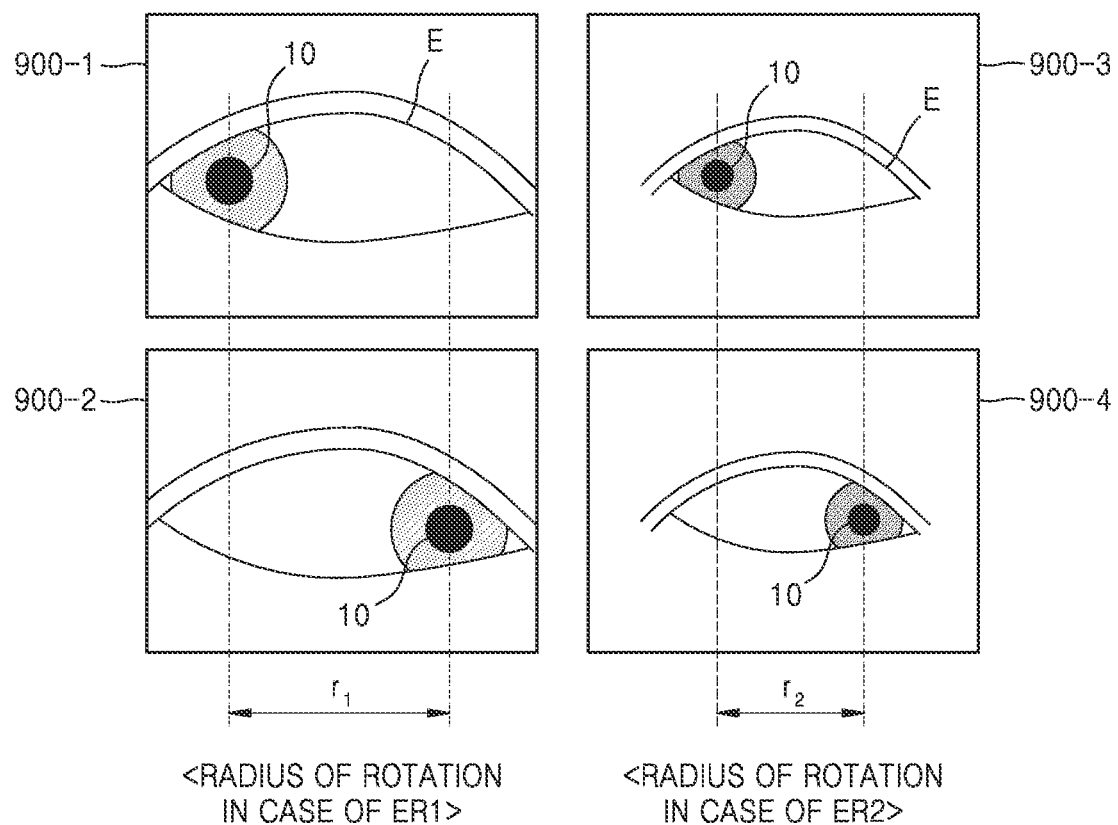
FIG. 9B is a diagram for describing an operation, performed by which an augmented reality device, of measuring the radius of rotation of an eye of a user, according to an embodiment of the disclosure.

FIG. 9B is a diagram for describing an operation, performed by which the augmented reality device 100, of measuring the radius of rotation of an eye of a user, according to an embodiment of the disclosure.

Figure 10:
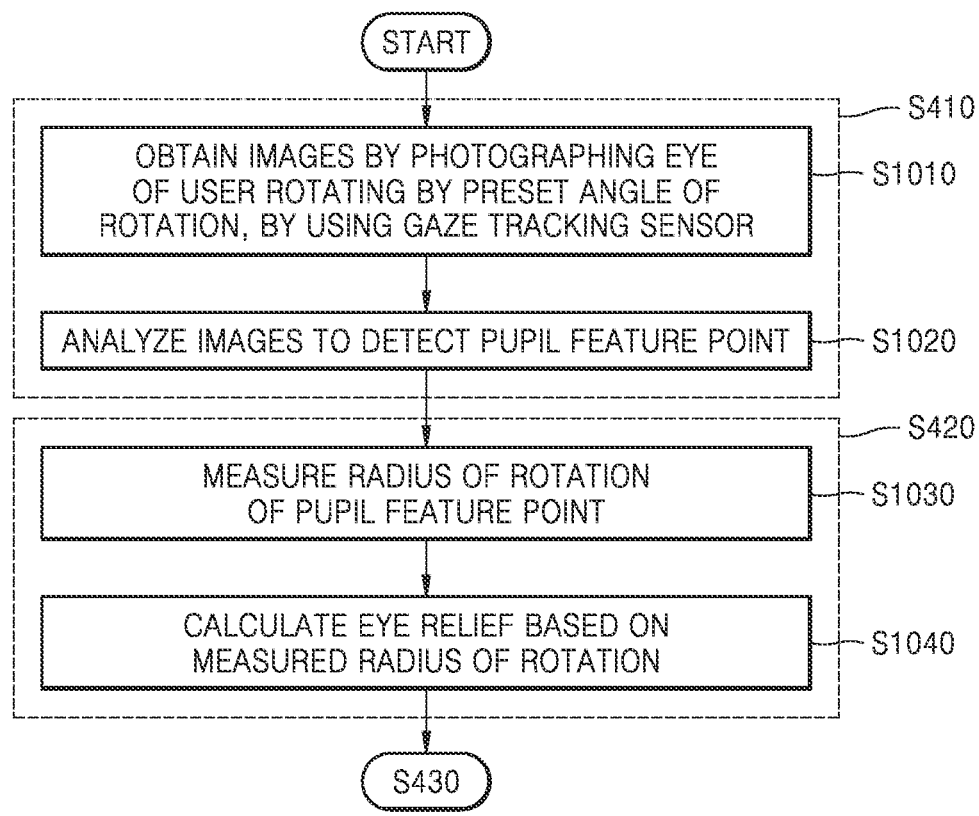
FIG. 10 is a flowchart of a method, performed by an augmented reality device, of obtaining information about ER by using the radius of rotation of an eye of a user, according to an embodiment of the disclosure.

FIG. 10 is a flowchart of a method, performed by the augmented reality device 100, of obtaining information about ER by using the radius of rotation of an eye of a user, according to an embodiment of the disclosure. In FIG. 10, operations S1010 and S1020 are detailed operations corresponding to operation S410 in FIG. 4. In FIG. 10, operations S1030 and S1040 are detailed operations corresponding to operation S420 in FIG. 4. After operation S1040 of FIG. 10 is performed, operation S430 of FIG. 4 may be performed.

Hereinafter, an operation, performed by the augmented reality device 100, of obtaining information about ER will be described with reference to FIGS. 9A, 9B, and 10.

Referring to FIG. 9A, the eye tracking sensor 140 may be disposed adjacent to the variable focus lens 110. In an embodiment of the disclosure, the eye tracking sensor 140 may be disposed on the lens frame 102 (see FIG. 2) to which the variable focus lens 110 is coupled. When the user wears the augmented reality device 100, the variable focus lens 110 may be spaced apart from the eye E of the user by ER1 or ER2.

Referring to FIG. 10, in operation S1010, the augmented reality device 100 obtains images by photographing an eye of the user moving by a preset rotation angle, by using the eye tracking sensor. Referring to FIG. 9A together, the augmented reality device 100 may provide a guide for leading the user to see an object 910 or 920. In an embodiment of the disclosure, the objects 910 and 920 are virtual images, may be projected to the waveguide 120 (see FIGS. 2 and 3) by the display engine 130 (see FIGS. 2 and 3), and thus delivered to the eye E of the user through the waveguide 120. However, embodiments are not limited thereto, and the objects 910 and 920 may be real-world objects in a real-world space. The augmented reality device 100 may lead the user to rotate his/her eye E by a preset angle α to see the object 910 or 920, by using the guide. The preset angle α may be, for example, 15° in the left direction and the right direction with respect to the center of the eye E, but is not limited thereto. The processor 150 (see FIG. 5) of the augmented reality device 100 may photograph the eye E of the user that rotates, by using the eye tracking sensor 140, and thus obtain images 900-1 and 900-2, or 900-3 and 900-4 (hereinafter, also referred to as the first image 900-1, second image 900-2, third image 900-3, and fourth image 900-4) (see FIG. 9B).

In operation S1020, the augmented reality device 100 analyzes the images to detect a pupil feature point. Referring to FIG. 9B, the eye tracking sensor 140 (see FIG. 9A) may include an IR light source configured to emit IR light to the eye E of the user, and an IR camera configured to photograph the IR light reflected by the eye E of the user to obtain the images 900-1 and 900-2, or 900-3 and 900-4. The processor 150 of the augmented reality device 100 may identify the brightness of the IR light received through an image sensor of the IR camera, identify at least one pixel that has received the IR light representing the pupil among the pixels of each of the images 900-1 and 900-2, or 900-3 and 900-4 captured by the IR camera, and thus detect a pupil feature point 10. In this case, the pupil feature point 10 may correspond to at least one pixel having a brightness less than a preset reference value among the pixels of each of the images 900-1 and 900-2, or 900-3 and 900-4, but is not limited thereto.

Referring to FIG. 9B, the first image 900-1 and the second image 900-2 are images obtained by the IR camera of the eye tracking sensor 140 when the distance between the variable focus lens 110 (see FIG. 9A) and the eye E of the user is ER1, and the third image 900-3 and the fourth image 900-4 are images obtained when the distance between the variable focus lens 110 and the eye E of the user is ER2. The first image 900-1 and the third image 900-3 are images obtained when the pupil of the eye E of the user rotates by the preset rotation angle α in the left direction, and the second image 900-2 and the fourth image 900-4 are images obtained when the pupil rotates by the preset rotation angle α in the right direction. When the distance between the variable focus lens 110 and the eye E of the user is ER1, the processor 150 of the augmented reality device 100 may detect the pupil feature point 10 from each of the first image 900-1 and the second image 900-2. Similarly, when the distance between the variable focus lens 110 and the eye E of the user is ER2, the processor 150 of the augmented reality device 100 may detect the pupil feature point 10 from each of the third image 900-3 and the fourth image 900-4.

In operation S1030, the augmented reality device 100 measures the radius of rotation of the pupil feature point. The processor 150 of the augmented reality device 100 may obtain coordinate information of at least one pixel from which the pupil feature point 10 is detected among the pixels of each of the images 900-1 and 900-2, or 900-3 and 900-4 obtained by using the IR camera, and measure the radius of rotation of the pupil feature point 10 based on the coordinate information of the pixel corresponding to the pupil feature point 10. Referring to FIG. 9B together, when the distance between the variable focus lens 110 and the eye E of the user is ER1, the processor 150 may measure the distance between the pupil feature point 10 detected from the first image 900-1 and the pupil feature point 10 detected from the second image 900-2. In the embodiment illustrated in FIG. 9B, the distance between the pupil feature point 10 detected from the first image 900-1 and the pupil feature point 10 detected from the second image 900-2 may be $r_1$. When the distance between the variable focus lens 110 and the eye E of the user is ER2, the processor 150 may measure the distance between the pupil feature point 10 detected from the third image 900-3 and the pupil feature point 10 detected from the fourth image 900-4. In the embodiment illustrated in FIG. 9B, the distance between the pupil feature point 10 detected from the third image 900-3 and the pupil feature point 10 detected from the fourth image 900-4 may be $r_2$.

In operation S1040, the augmented reality device 100 calculates (obtains) the ER based on the measured radius of rotation. The distance between the variable focus lens 110 and the eye E of the user is inversely proportional to the radius of rotation of the pupil feature point 10. For example, as the distance between the variable focus lens 110 and the eye E of the user decreases, the radius of rotation of the pupil feature point 10 may increase. In the embodiment illustrated in FIG. 9B, when the distance between the variable focus lens 110 and the eye E of the user is ER1, the measured radius of rotation of the pupil feature point 10 may be $r_1$, which may be greater than $r_2$, which is the measured radius of rotation of the pupil feature point 10 when the distance between the variable focus lens 110 and the eye E of the user is ER2. The processor 150 of the augmented reality device 100 may calculate the ER based on the radius of rotation of the pupil feature point 10 and pixel coordinate system information of the IR camera of the eye tracking sensor 140.

Figure 11:
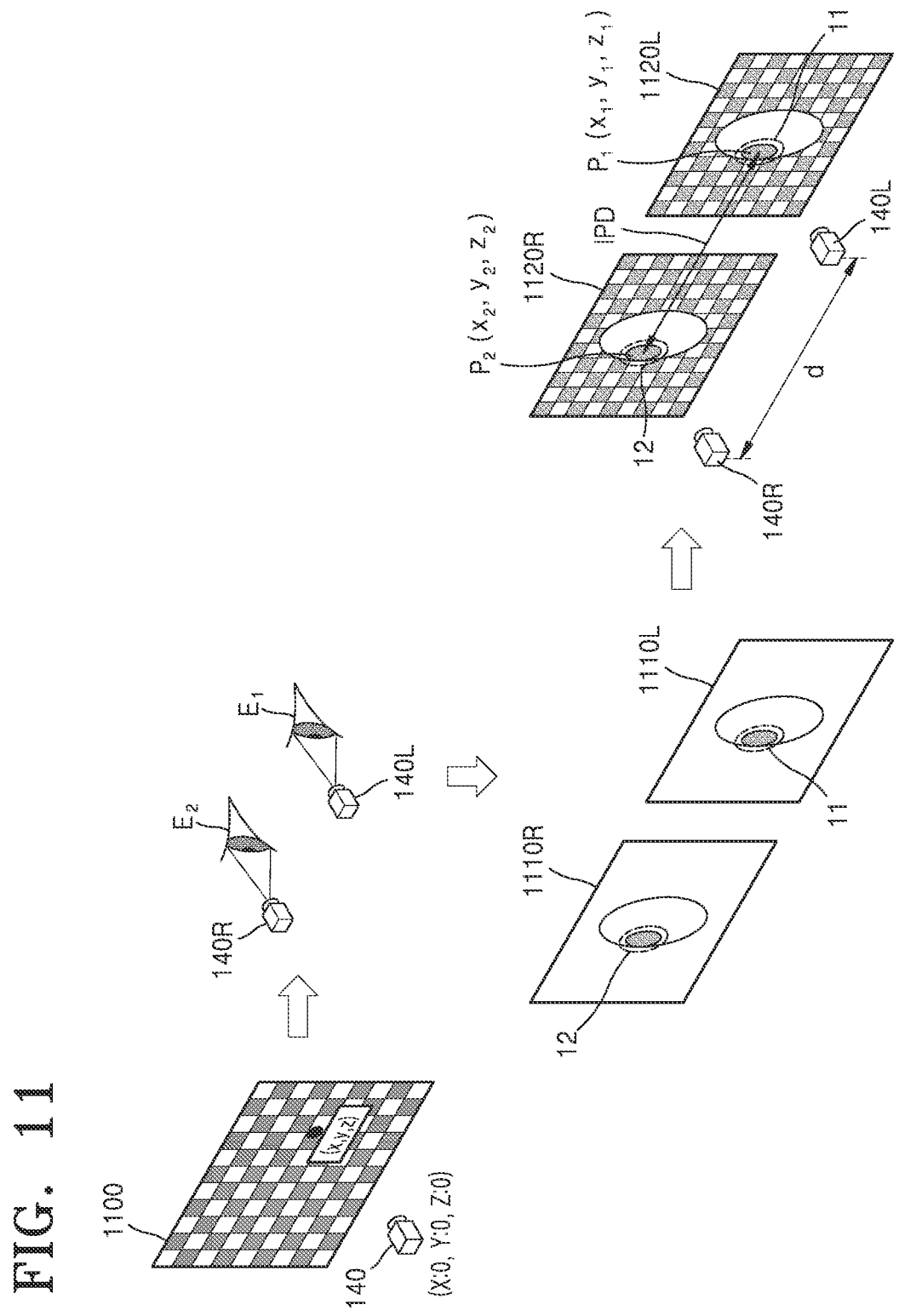
FIG. 11 is a diagram illustrating an operation, performed by an augmented reality device, obtaining information about an IPD of both eyes of a user, according to an embodiment of the disclosure.

FIG. 11 is a diagram illustrating an operation, performed by the augmented reality device 100, obtaining information about the IPD of both eyes of the user, according to an embodiment of the disclosure.

Figure 12:
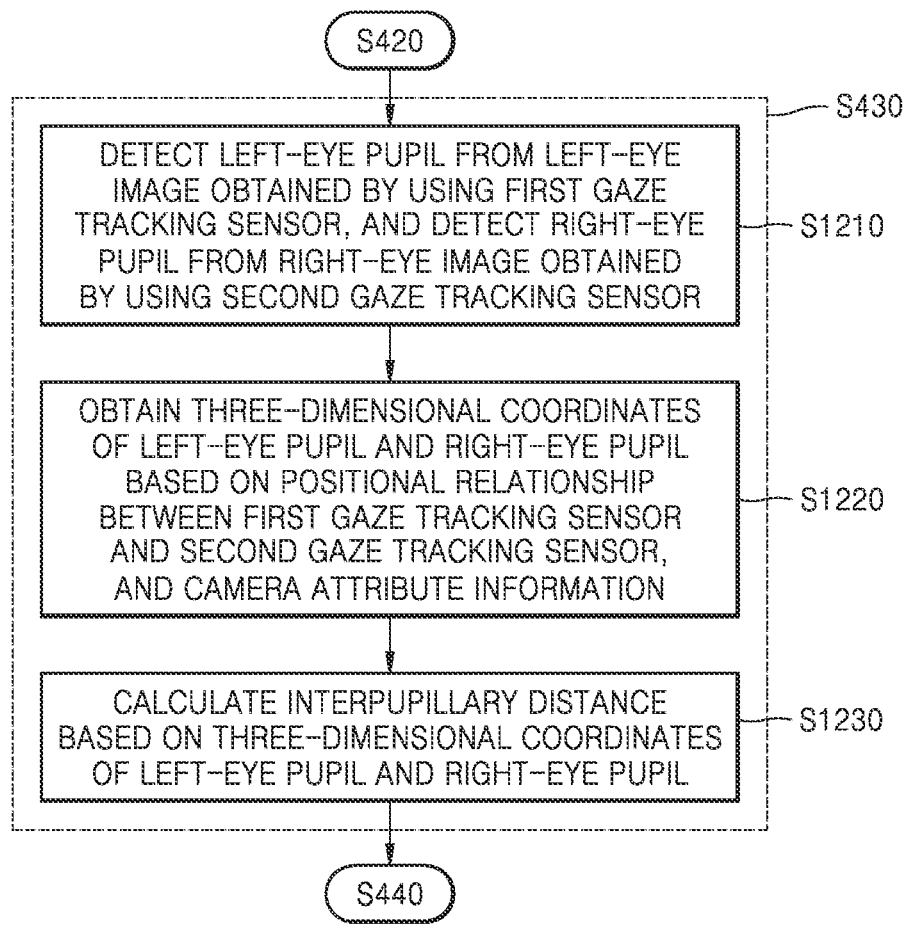
FIG. 12 is a flowchart of a method, performed by an augmented reality device, of obtaining information about an IPD of both eyes of a user, according to an embodiment of the disclosure.

FIG. 12 is a flowchart of a method, performed by the augmented reality device 100, of obtaining information about the IPD of both eyes of the user, according to an embodiment of the disclosure. In FIG. 12, operations S1210 to S1230 are detailed operations corresponding to operation S430 in FIG. 4. After operation S1230 of FIG. 10 is performed, operation S440 of FIG. 4 may be performed.

Hereinafter, an operation, performed by the augmented reality device 100, of obtaining information about an IPD will be described with reference to FIGS. 11 and 12.

Referring to FIG. 11, the augmented reality device 100 may perform calibration of the IR camera included in the eye tracking sensor 140. In the disclosure, the term 'calibration' of an IR camera may be a correction operation for obtaining a transformation relationship between three-dimensional coordinates of a real-world object located in a three-dimensional space and coordinates of each pixel of a two-dimensional image captured by a camera, or a parameter of a matrix representing the transformation relationship. In an embodiment of the disclosure, the augmented reality device 100 may obtain coordinates of each pixel on a plane 1100 by photographing the plane 1100 configured in a pattern corresponding to the pixels, by using the IR camera of the eye tracking sensor 140. The augmented reality device 100 may perform calibration of the IR camera by using the obtained coordinates of each pixel.

The augmented reality device 100 may obtain a left-eye image 1110L by photographing the left eye $E_1$ of the user by using an IR camera of the first eye tracking sensor 140L, and obtain a right-eye image 1110R by photographing the right eye $E_2$ of the user by using the IR camera of the second eye tracking sensor 140R. In the disclosure, each of the first eye tracking sensor 140L and the second eye tracking sensor 140R may include, but is not limited to, an IR camera. In another embodiment of the disclosure, the first eye tracking sensor 140L and the second eye tracking sensor 140R may include IR detectors (e.g., photodiodes) configured to detect IR light reflected by the left eye $E_1$ and the right eye $E_2$ of the user, respectively.

Referring to FIG. 12, in operation S1210, the augmented reality device 100 detects the left-eye pupil from the left-eye image obtained by using the first eye tracking sensor, and detects the right-eye pupil from the right-eye image obtained by using the second eye tracking sensor. Referring to FIG. 11 together, the processor 150 of the augmented reality device 100 may detect at least one pixel corresponding to a left-eye pupil 11 among the pixels of the left-eye image 1110L, and detect at least one pixel corresponding to a right-eye pupil 12 among the pixels of the right-eye image 1110R. The description provided above regarding a method, performed by the processor 150, of detecting a pupil feature point from an image will be omitted.

In operation S1220, the augmented reality device 100 obtains three-dimensional coordinates of the left-eye pupil and the right-eye pupil based on the positional relationship between the first eye tracking sensor and the second eye tracking sensor, and camera attribute information. Referring to FIG. 11, the first eye tracking sensor 140L configured to photograph the left eye $E_1$ of the user and the second eye tracking sensor 140R configured to photograph the right eye $E_2$ may be spaced apart from each other by a preset distance d. Information about the distance d between the first eye tracking sensor 140L and the second eye tracking sensor 140R may be stored in a storage space in the memory 160 (see FIG. 3). The processor 150 of the augmented reality device 100 may load the information about the distance d between the first eye tracking sensor 140L and the second eye tracking sensor 140R from the memory 160, and thus obtain the three-dimensional coordinates of a left-eye pupil feature point $P_1$ and a right-eye pupil feature point $P_2$ based on attribute information of the IR cameras. The attribute information of the IR cameras may include, for example, information about at least one of a pixel coordinate system, a resolution, or an FoV.

In an embodiment of the disclosure, the processor 150 may obtain three-dimensional coordinates $(x_1, y_1, z_1)$ of the left-eye pupil feature point $P_1$ from a left-eye coordinate plane image 1120L obtained by combining the left-eye image 1110L with a pixel pattern for calibration. In addition, the processor 150 may obtain three-dimensional coordinates $(x_2, y_2, z_2)$ of the right-eye pupil feature point $P_1$ from a right-eye coordinate plane image 1120R obtained by combining the right-eye image 1110R with a pixel pattern for calibration.

In operation S1230, the augmented reality device 100 calculates (obtains) the IPD based on the three-dimensional coordinates of the left-eye pupil and the right-eye pupil. Referring to FIG. 11 together, the processor 150 of the augmented reality device 100 may calculate the distance between the left-eye pupil feature point $P_1$ and the right-eye pupil feature point $P_2$ by using the three-dimensional coordinates $(x_1, y_1, z_1)$ of the left-eye pupil feature point $P_1$ and a three-dimensional coordinates $(x_2, y_2, z_2)$ of the right-eye pupil feature point $P_2$. The processor 150 may obtain the distance between the left-eye pupil feature point $P_1$ and the right-eye pupil feature point $P_2$, as the IPD.

Figure 13A:
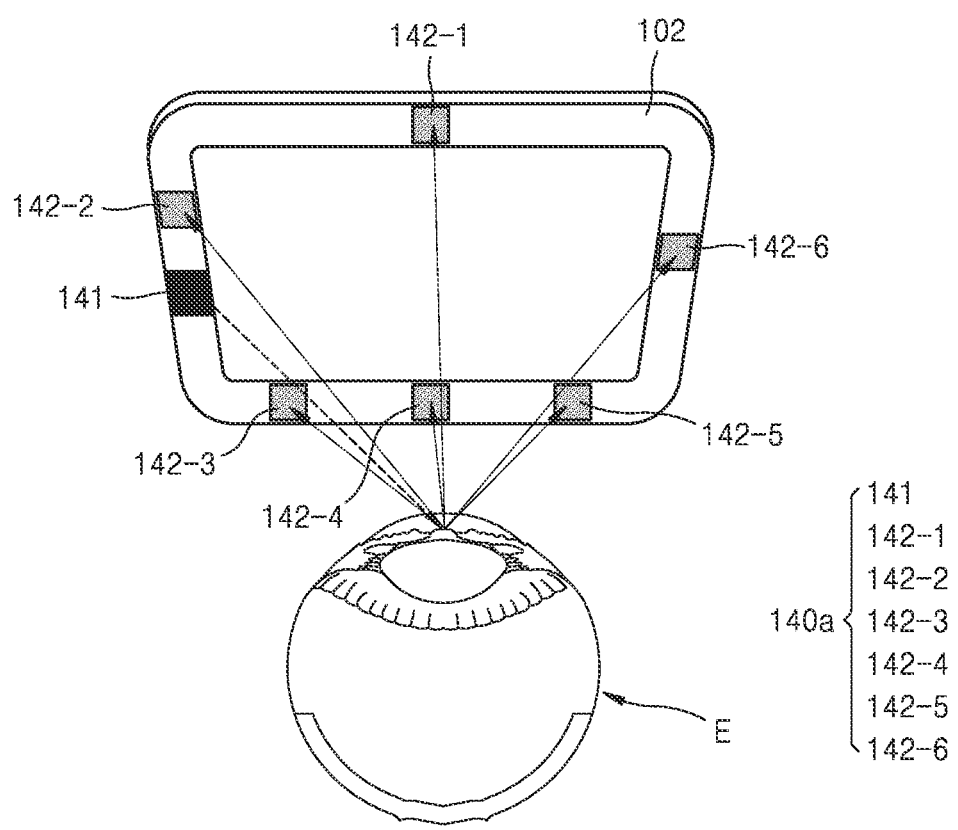
FIG. 13A is a diagram illustrating an operation, performed by an augmented reality device, obtaining gaze direction information of an eye of a user by using an eye tracking sensor, according to an embodiment of the disclosure.

FIG. 13A is a diagram illustrating an operation, performed by the augmented reality device 100, obtaining gaze direction information of an eye of the user by using an eye tracking sensor 140a, according to an embodiment of the disclosure.

Referring to FIG. 13A, the eye tracking sensor 140a may include the light emitter 141 and a plurality of light detectors 142-1, 142-2, 142-3, 142-4, 142-5, and 142-6. The eye tracking sensor 140a illustrated in FIG. 13A may have the same configuration as that of the eye tracking sensor 140 of FIG. 3. FIG. 13A illustrates six light detectors 142-1 to 142-6 are illustrated, but this is merely exemplary, and the number of light detectors is not limited thereto.

The light emitter 141 may emit IR light to the cornea in which the crystalline lens of the eye E is located, and the plurality of light detectors 142-1 to 142-6 may detect the IR light reflected by the cornea. In an embodiment of the disclosure, the light emitter 141 may include a reflector that changes the path of the IR light to be directed to the eye E. For example, the light emitter 141 may be an IR LED, and the plurality of light detectors 142-1 to 142-6 may be a plurality of IR cameras.

The eye tracking sensor 140a may obtain information about the amount of IR light detected by each of the plurality of light detectors 142-1 to 142-6, determine a gaze direction in which the eye E of the user looks, based on the obtained amount of IR light, and obtain a gaze vector representing the gaze direction. The eye tracking sensor 140a may provide the processor 150 (see FIG. 3) with data about the values and direction of the obtained gaze vector.

Figure 13B:
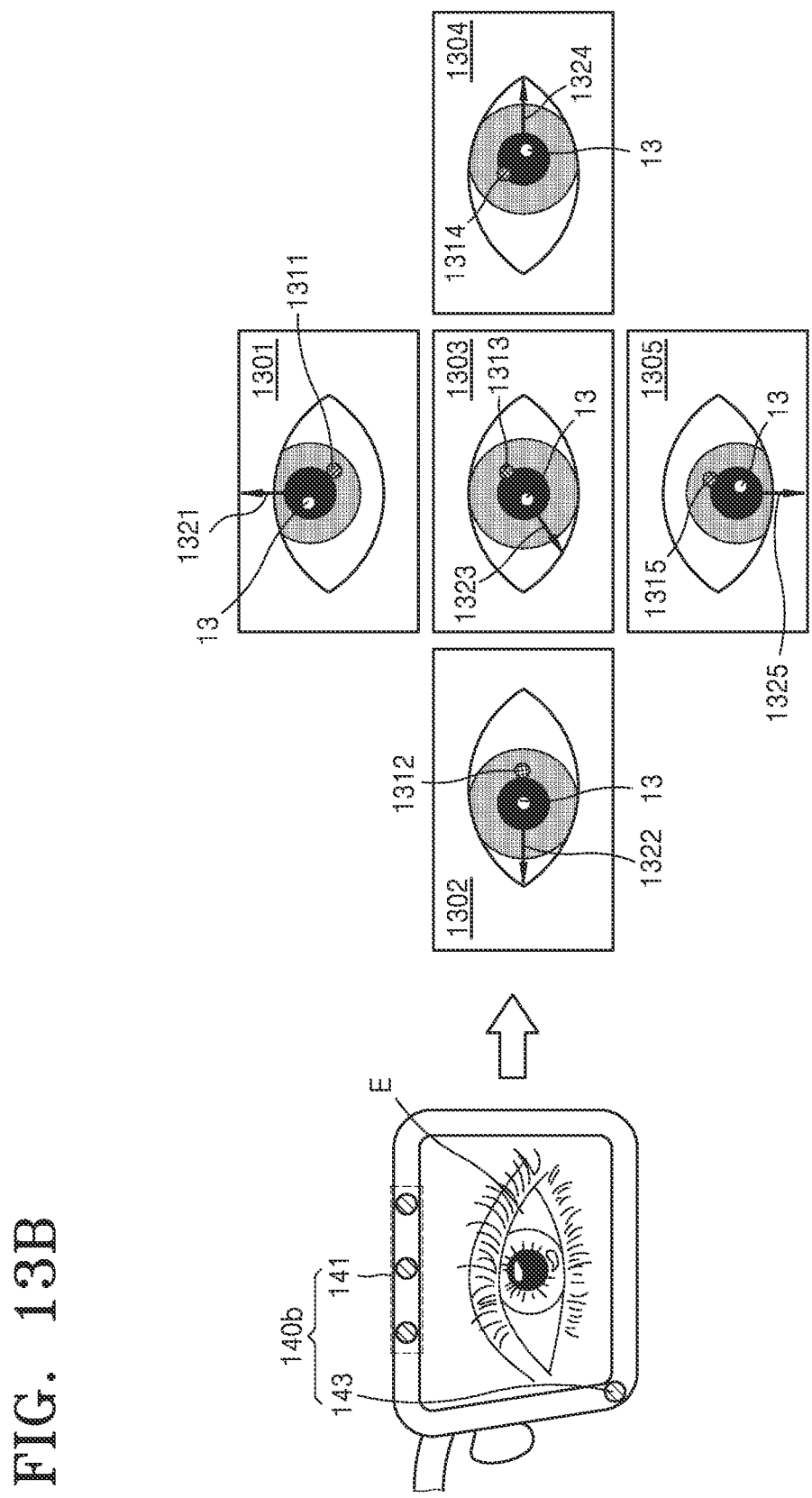
FIG. 13B is a diagram illustrating an operation, performed by an augmented reality device, obtaining gaze direction information of an eye of a user by using an eye tracking sensor, according to an embodiment of the disclosure.

FIG. 13B is a diagram illustrating an operation, performed by the augmented reality device 100, obtaining gaze direction information of an eye E of the user by using an eye tracking sensor 140b, according to an embodiment of the disclosure.

Referring to FIG. 13B, the eye tracking sensor 140b may track the gaze of the user based on the positions of rays of light 1311, 1312, 1313, 1314, and 1315 reflected by the eye E of the user, and obtain a gaze vector based on the tracked gaze. The eye tracking sensor 140b may include the light emitter 141 and the gaze tracking camera 143. The eye tracking sensor 140b illustrated in FIG. 13B may have the same configuration as that of the eye tracking sensor 140 of FIG. 3.

The light emitter 141 may include an IR LED. In the embodiment illustrated in FIG. 13B, the light emitter 141 may include a plurality of IR LEDs disposed at different positions. The light emitter 141 may provide light (e.g., IR light) to the eye E of the user when photographing the eye E. As the IR light is provided to the eye E of the user, the light may be reflected by the eye E of the user.

The gaze tracking camera 143 may include at least one camera. In an embodiment of the disclosure, the gaze tracking camera 143 may be implemented as an IR camera. The augmented reality device may track the gaze of the eye E of the user by using images 1301 to 1305 (hereinafter, also referred to as the first to fifth eye images 1301 to 1305) of the eye E of the user which are captured by the gaze tracking camera 143. For example, the gaze tracking camera 143 may track the gaze of the user by detecting a pupil 13 and rays of reflected light 1311 to 1315 from the images 1301 to 1305 of the eye of the user, and thus obtain a gaze vector. The eye tracking sensor 140b may detect the positions of the pupil 13 and the rays of reflected light 1311 to 1315 from each of the images 1301 to 1305 of the eye E of the user, and determine the gaze direction of the eye E of the user based on the relationship between the position of the pupil 13 and the positions of the rays of reflected light 1311 to 1315.

For example, the eye tracking sensor 140b may detect the pupil 13 and the ray of reflected light 1311 from the captured first eye image 1301, and determine a gaze direction 1321 of the eye of the user based on the relationship between the position of the pupil 13 and the position of the ray of reflected light 1311. In the same manner, the eye tracking sensor 140*b* may detect the pupil 13 and the rays of reflected light 1312, 1313, 1314, and 1315 from each of the second to fifth eye images 1302, 1303, 1304, and 1305, and determine gaze directions 1322, 1323, 1324, and 1325 of the eye of the user based on the relationship between the position of the pupil 13 and the positions of the rays of reflected light 1312, 1313, 1314, and 1315, respectively.

In an embodiment of the disclosure, the eye tracking sensor 140*b* may obtain a gaze vector based on information about the determined gaze directions. The eye tracking sensor 140*b* may provide the processor 150 (see FIG. 3) with data about the values and direction of the obtained gaze vector.

In another embodiment of the disclosure, the eye tracking sensor 140*b* may provide the processor 150 (see FIG. 3) with only coordinates of the pupil 13 and the rays of reflected light 1311 to 1315 detected from the plurality of eye images 1301 to 1305, respectively, and the processor 150 may calculate the gaze vector of the eye E of the user based on coordinates obtained from the eye tracking sensor 140*b*.

Figure 13C:
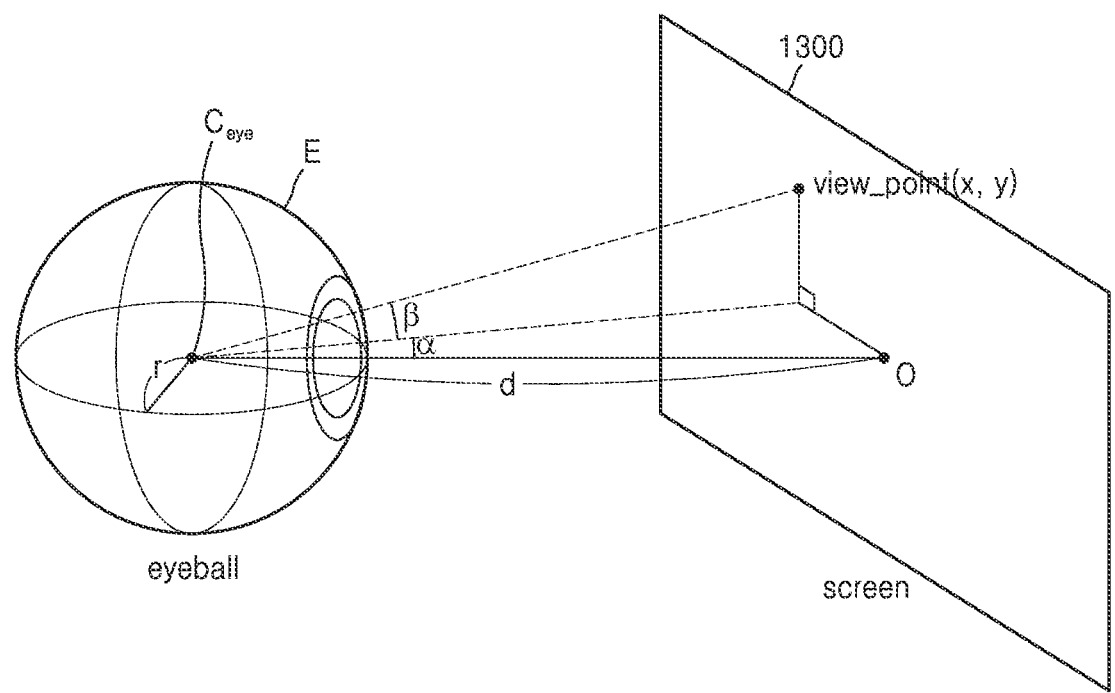
FIG. 13C is a diagram illustrating a three-dimensional eyeball model for a gaze of a user.

FIG. 13C is a diagram illustrating a three-dimensional eyeball model for a gaze of the user.

Referring to FIG. 13C, the augmented reality device 100 may determine a gaze direction of the eye E of the user by using the eye tracking sensor 140*a* or 140*b*. For example, the augmented reality device 100 may determine the gaze direction based on an average human eyeball model. The eyeball model may be modeled by assuming that the human eye E has a spherical shape and ideally rotates according to a gaze direction. In addition, the eyeball model may be mathematically represented by Equations 1 and 2.

$$x = d \cdot \tan \alpha,$$
$$y = d \cdot \tan \beta, \quad \text{[Equation 1]}$$

$$\alpha = \sin^{-1}(\text{diff}\_x/r),$$
$$\beta = \sin^{-1}(\text{diff}\_y/r). \quad \text{[Equation 2]}$$

In Equation 1, d denotes the distance between the center $C_{eye}$ of the eye of the user and a virtual screen 1300, $\alpha$ denotes the angle by which the eye of the user rotates in the x-axis direction when the eye of the user gazes at the virtual screen 1300 in the front, and $\beta$ denotes the angle by which the eye of the user rotates in the y-axis direction when the eye of the user gazes at the virtual screen 1300 in the front. In addition, in Equation 2, r denotes, assuming that the eye of the user is a sphere, the radius of the sphere.

The eye tracking sensor 140*a* or 140*b* according to an embodiment of the disclosure may measure the degree of rotation (e.g., $\alpha$ and $\beta$) of the eye E of the user by using the method described with reference to FIGS. 13A and 13B, and the augmented reality device 100 may calculate (obtain) two-dimensional coordinates of the eye E of the user in the gaze direction on the virtual screen 1300 by using the degrees of rotation $\alpha$ and $\beta$ of the eye E of the user.

Figure 13D:
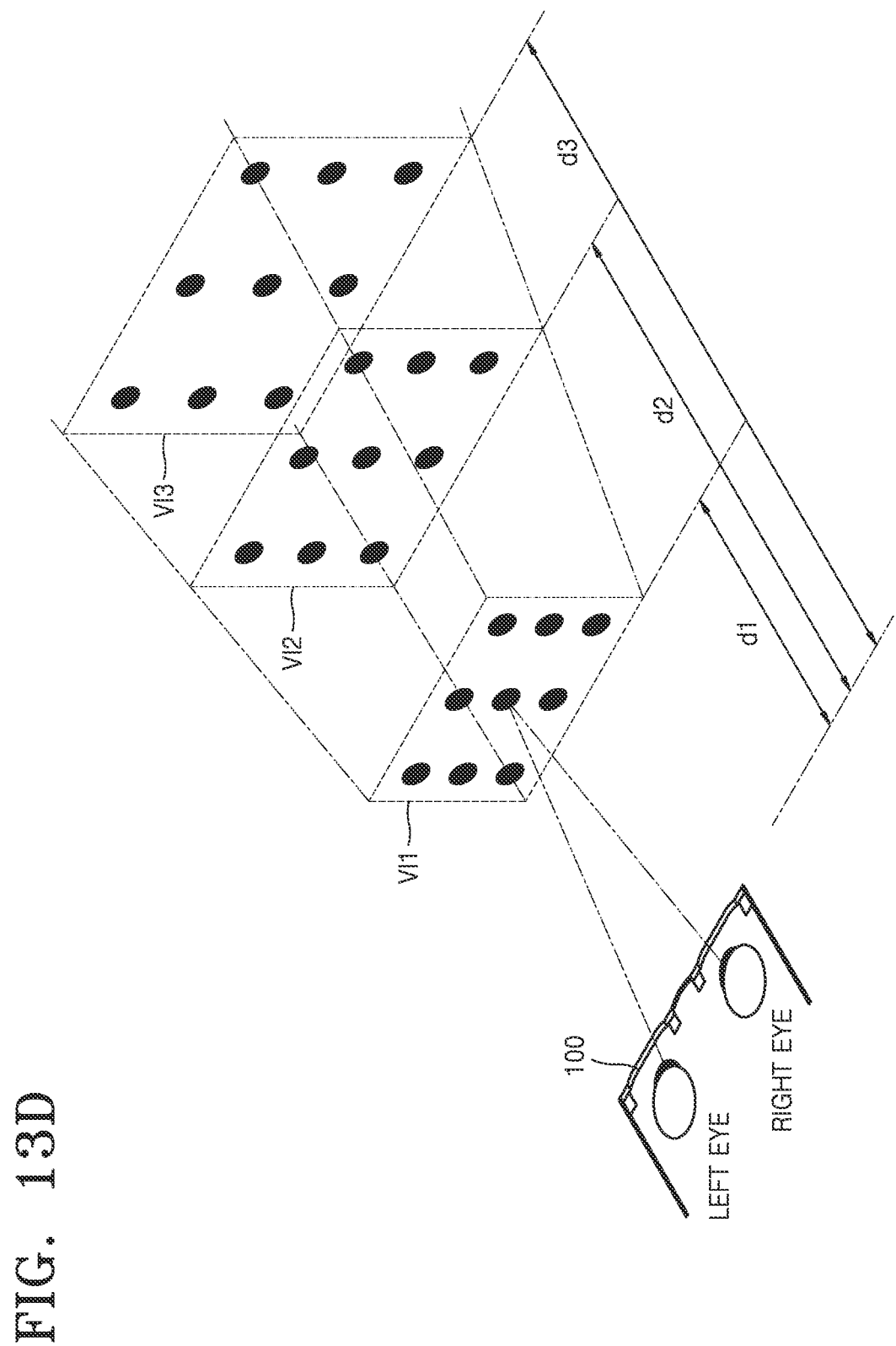
FIG. 13D is a diagram for describing a method of performing calibration of an eye tracking sensor, according to an embodiment of the disclosure.

FIG. 13D is a diagram for describing a method of performing calibration of the eye tracking sensor 140*a* or 140*b* (see FIGS. 13A and 13B), according to an embodiment of the disclosure.

Referring to FIG. 13D, when the user initially uses the augmented reality device 100, a process of calibrating the eye tracking sensor 140*a* or 140*b* may be performed in order to more accurately measure gaze directions of the left eye and the right eye. The augmented reality device 100 may output virtual images VI1, VI2, and VI3 having different depths (e.g., $d_1$, $d_2$, and $d_3$) in which a plurality of points for guiding the gaze of the user are indicated, and induce the user to gaze at each of the plurality of points. FIG. 13D illustrates nine points in each of the virtual images VI1, VI2, and VI3, but this is merely exemplary and the number of points is not limited to nine.

When the user gazes at each point in the virtual images VI1, VI2, and VI3, the processor 150 (see FIG. 3) of the augmented reality device 100 may store data (e.g., a gaze vector) output from the eye tracking sensor 140*a* or 140*b* in a table form in a storage space of the memory 160 (see FIG. 3).

In the method of tracking a gaze by using the amount of IR light reflected by a cornea as in the embodiment illustrated in FIG. 13A, information about an angle of reflection and the amount of light at each point may be pre-stored in the memory 160 in a table form as gaze information. In the method of photographing the eyes of the user by using IR light as in the embodiment illustrated in FIG. 13B, images including the eyes of the user and reflected light, which are captured at each point, may be pre-stored in the memory 160 as gaze information.

The augmented reality device 100 may determine the gaze direction of an eye of the user by comparing the pre-stored gaze information with gaze information output from the eye tracking sensor 140*a* or 140*b*. The processor 150 (refer to FIG. 3) of the augmented reality device 100 may determine the gaze directions of the left eye and the right eye by using gaze information output from the eye tracking sensor 140*a* or 140*b*. In an embodiment of the disclosure, the processor 150 may calculate (obtain) a first gaze vector representing the gaze direction of the left eye and a second gaze vector representing the gaze direction of the right eye by using the gaze information output from the eye tracking sensor 140*a* or 140*b*.

The augmented reality device 100 may estimate coordinates of the gaze point G (see FIGS. 1A and 1B) by using binocular disparity and gaze information about the gaze direction of the left eye, and the gaze direction of the right eye. In an embodiment of the disclosure, the processor 150 (see FIG. 3) of the augmented reality device 100 may be preset to map a point (i.e., the gaze point G) at which the user gazes in a real-world space to three-dimensional coordinates (e.g., an x coordinate, a y coordinate, and a z coordinate) by using coordinate mapping or the like, or may store three-dimensional coordinates of the gaze point G, in the memory 160 in a table form.

Figure 14:
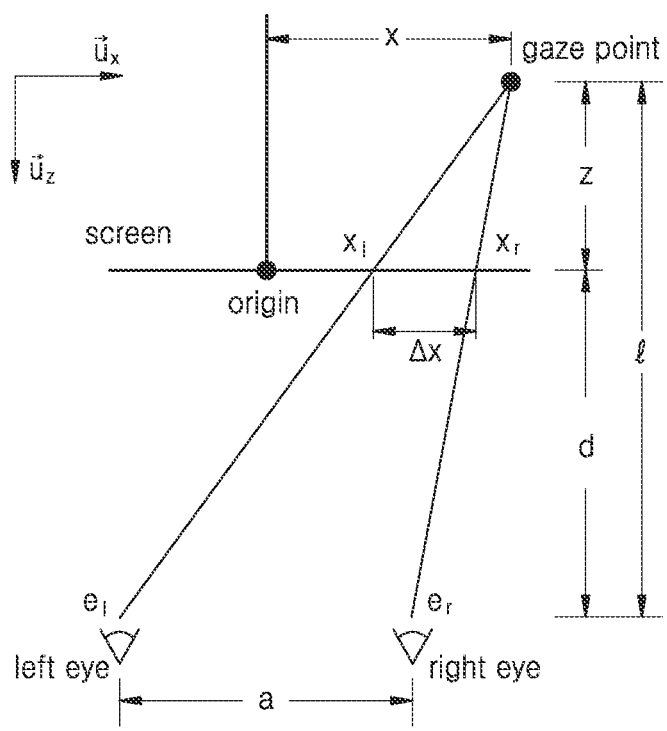
FIG. 14 is a diagram for describing a method, performed by an augmented reality device, of calculating a gaze point based on information about a gaze direction measured by an eye tracking sensor, according to an embodiment of the disclosure.

FIG. 14 is a diagram for describing a method, performed by the augmented reality device 100, of calculating a gaze point based on information about a gaze direction measured by an eye tracking sensor, according to an embodiment of the disclosure.

Figure 15:
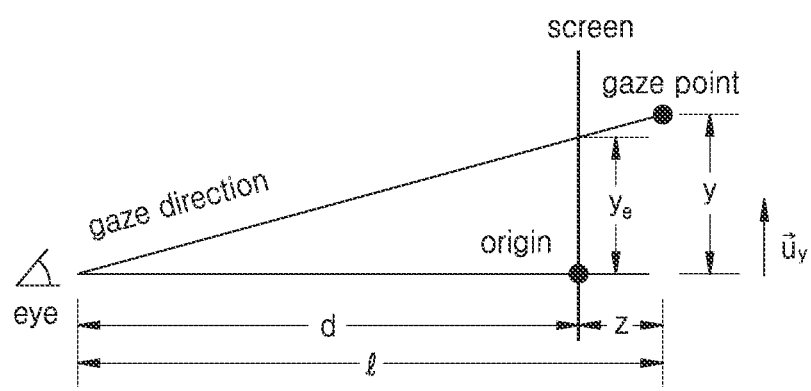
FIG. 15 is a diagram for describing a method, performed by an augmented reality device, of calculating a gaze point based on information about a gaze direction measured by an eye tracking sensor, according to an embodiment of the disclosure.

FIG. 15 is a diagram illustrating a relationship between a gaze angle and a gaze point in an upward gaze direction.

Referring to FIGS. 14 and 15, the focal length may be estimated based on a difference between gaze directions (or gaze coordinates) of both eyes obtained by the eye tracking sensor 140*a* or 140*b* (see FIGS. 13A and 13B). When calculating (obtaining) the focal length to a gaze point, assuming that the gaze axes of both eyes may not intersect each other, and in this case, both eyes are at the same height, the coordinates on the vertical axis (y-axis) may be calculated as the average of the coordinates of both eyes on the vertical axis (y-axis). For example, it may be assumed that a distance a between both eyes is 7 cm. The following Equation 3 may be obtained by using a proportional expression based on the above geometric assumption.

$$\frac{-z}{\Delta x} = \frac{d-z}{a} \qquad \text{[Equation 3]}$$

In Equation 3, the distance d between both eyes of the user and the virtual screen and the distance a between both eyes are required, and the distance d may be obtained by measuring the rotation angle of the eyeball by using a gaze image in which the user gazes at the front. As a result, a vergence distance I, which is the distance to the gaze point, is defined by Equation 4.

$$1 = d + z = d + \frac{\Delta x d}{\Delta x - a} = \left(1 + \frac{\Delta x}{\Delta x - a}\right) \cdot d \qquad \text{[Equation 4]}$$

In Equation 4, z denotes the distance between the virtual screen and the gaze point, Δx denotes the interval between the gaze coordinates of both eyes on the virtual screen S in the horizontal direction, and may be obtained based on the gaze angle of each of the left eye and the right eye of the user as shown in Equations 1 and 2.

Figure 16:
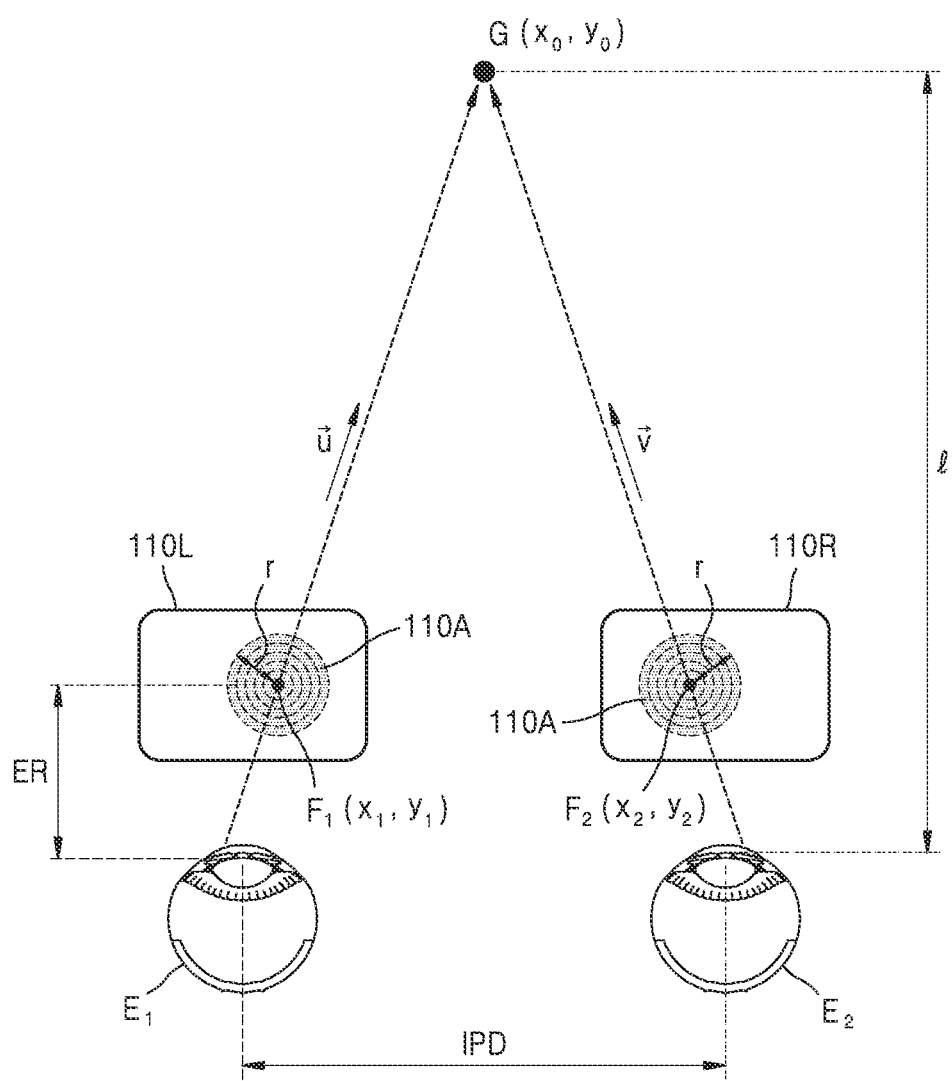
FIG. 16 is a diagram illustrating an operation, performed by an augmented reality device, of determining the positions of focal regions based on ER, a gaze point, and an IPD, according to an embodiment of the disclosure.

FIG. 16 is a diagram illustrating an operation, performed by the augmented reality device 100, of determining the positions of the focal regions 110A based on the ER, the gaze point G, and the IPD, according to an embodiment of the disclosure.

Referring to FIG. 16, the augmented reality device 100 may determine the positions of the focal regions 110A in the left-eye variable focus lens 110L and the right-eye variable focus lens 110R, respectively, based on information about the ER, the gaze point G, and the IPD. In an embodiment of the disclosure, the processor 150 (refer to FIG. 3) of the augmented reality device 100 may obtain a first gaze vector $\vec{u}$ representing a gaze direction of the left eye $E_1$ of the user toward the gaze point G and a second gaze vector $\vec{v}$ representing a gaze direction of the right eye $E_2$ toward the gaze point G, by using the eye tracking sensors. The processor 150 may determine, as a center focus $F_1$, a point on the left-eye variable focus lens 110L at which a virtual straight line representing the first gaze vector $\vec{u}$ intersects the left-eye variable focus lens 110L, and determine, as the focal region 110A of the left-eye variable focus lens 110L, a region having a preset size around the center focus $F_1$. Similarly, the processor 150 may determine, as a center focus $F_2$, a point on the right-eye variable focus lens 110R at which a virtual straight line representing the second gaze vector $\vec{v}$ intersects the right-eye variable focus lens 110R, and determine, as the focal region 110A of the right-eye variable focus lens 110R, a region having a preset size around the center focus $F_2$.

In an embodiment of the disclosure, the processor 150 may obtain coordinates of the center focuses $F_1$ and $F_2$ based on the ER, the vergence distance I, and the IPD. The coordinates of the center focuses $F_1$ and $F_2$ may be two-dimensional coordinates $(x_1, y_1)$ and $(x_2, y_2)$ of particular points on the left-eye variable focus lens 110L and the right-eye variable focus lens 110R, respectively. For example, the two-dimensional coordinates $(x_1, y_1)$ of the center focus $F_1$ on the left-eye variable focus lens 110L may be calculated according to Equation 5.

$$x_1 = \left(x_0 + \frac{IPD}{2}\right)\frac{ER}{l} - \frac{IPD}{2} \qquad \text{[Equation 5]}$$
$$y_1 = y_0 \frac{ER}{l}$$

For example, the two-dimensional coordinates $(x_2, y_2)$ of the center focus $F_2$ on the right-eye variable focus lens 110R may be calculated according to Equation 6.

$$x_2 = \left(x_0 - \frac{IPD}{2}\right)\frac{ER}{l} + \frac{IPD}{2} \qquad \text{[Equation 6]}$$
$$y_2 = y_0 \frac{ER}{l}$$

In Equations 5 and 6, the coordinates $(x_0, y_0)$ may be coordinates of the gaze point G.

The processor 150 may determine, as the focal regions 110A, regions having a preset size around the center focuses $F_1$ and $F_2$, respectively. In an embodiment of the disclosure, the processor 150 may determine, as the focal regions 110A, circles having a preset radius r around the two-dimensional coordinates $(x_1, y_1)$ and $(x_2, y_2)$ of the center focuses $F_1$ and $F_2$, respectively. However, the shape of the focal regions 110A is not limited to a circular shape, and the processor 150 may determine the focal regions 110A in various shapes such as a quadrangle, a square, a rectangle, or a triangle, around the center focuses $F_1$ and $F_2$, respectively.

Figure 17A:
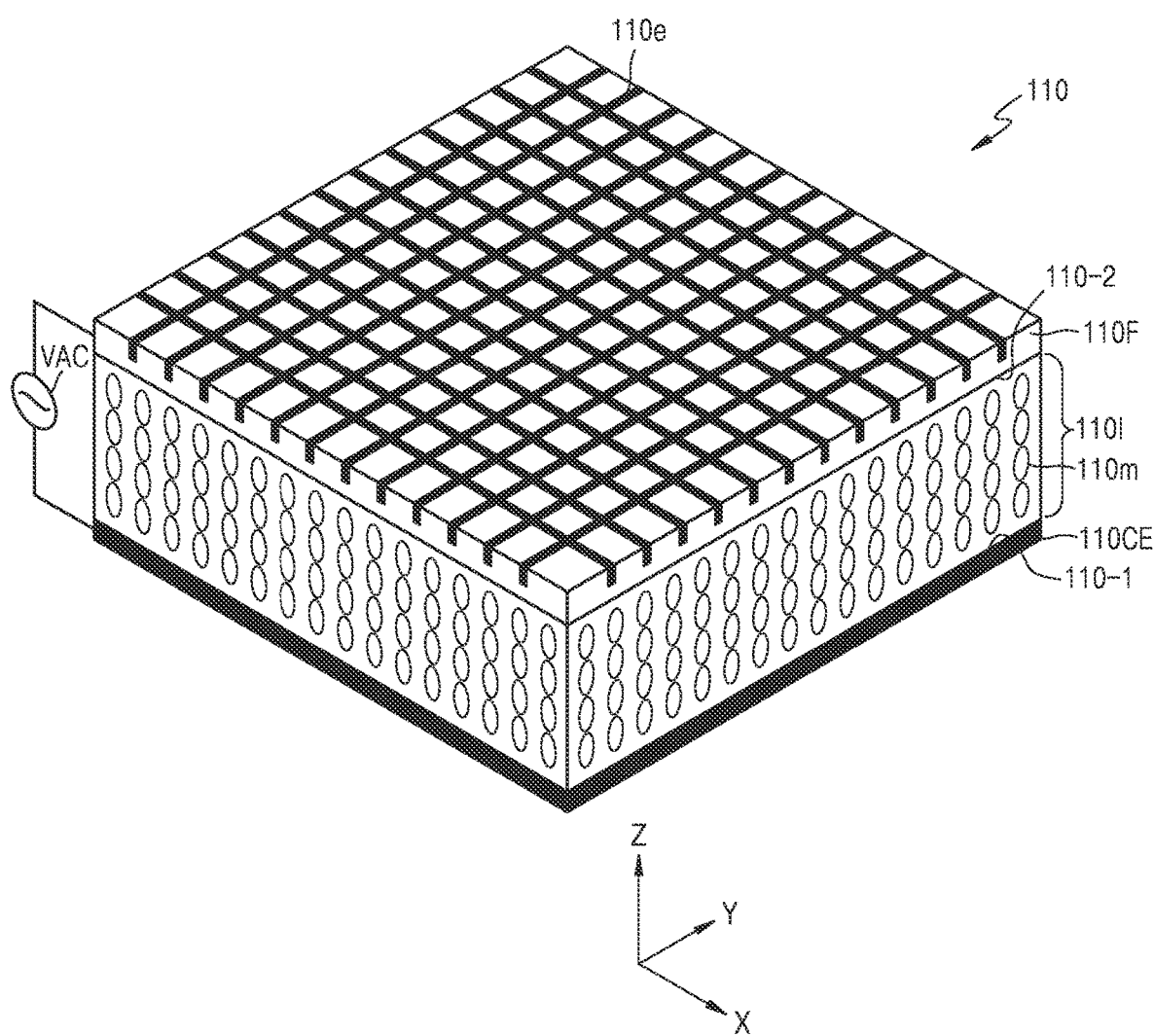
FIG. 17A is a perspective view of a variable focus lens that is a component of an augmented reality device according to an embodiment of the disclosure.

FIG. 17A is a perspective view of the variable focus lens 110 that is a component of the augmented reality device 100 according to an embodiment of the disclosure.

Referring to FIG. 17A, the variable focus lens 110 may include a liquid crystal layer 110*l*, a common electrode 110CE, a transparent film 110F, and an excitation electrode 110*e*. The variable focus lens 110 may further include a transparent layer formed to be in contact with the bottom surface of the common electrode 110CE.

The variable focus lens 110 may be an electrically tunable liquid crystal lens configured to adjust the refractive index for light by changing the arrangement angle of liquid crystal molecules 110*m* based on a control voltage applied from a power supply VAC through the excitation electrode 110*e*. In an embodiment of the disclosure, the variable focus lens 110 may include an electro-optical material having a pixel grid. The pixels may be arranged in a matrix of N rows and M columns. Each of the (N×M) pixels may accommodate a set of gray levels independent of all other pixels.

The liquid crystal layer 110*l* may be an electro-optical layer including a plurality of liquid crystal molecules 110*m*. The liquid crystal layer 110*l* may be an electro-optical layer in which physical properties of liquid crystals are changed by a control voltage applied thereto. In an embodiment of the disclosure, the liquid crystal layer 110*l* may include a polarization-independent liquid crystal layer (e.g., cholesteric liquid crystal). In the liquid crystal layer 110*l*, as the arrangement angle of the liquid crystal molecules 110*m* in a particular region in an active region is changed by a control voltage applied through the excitation electrode 110*e*, the refractive index of the region may be locally adjusted.

The common electrode 110CE and the excitation electrode 110*e* may receive a control voltage supplied from the power supply VAC, and apply the control voltage to the liquid crystal layer 110*l*. The common electrode 110CE may be disposed in contact with a first surface 110-1 of the liquid crystal layer 110*l*.

The excitation electrode 110e may be disposed on a second surface 110-2 opposite to the first surface 610-1 of the liquid crystal layer 110l to be in contact with the top surface of the transparent film 110F. The excitation electrode 110e may include a first array excitation electrode and a second array excitation electrode that are aligned on the top surface of the transparent film 110F, in directions perpendicular to each other in the X-axis and Y-axis directions. Each of the first array excitation electrode and the second array excitation electrode may include a parallel strip formed of a conductive material and extending over the active region. In an embodiment of the disclosure, the excitation electrode 110e may be formed of a transparent conductive material such as indium tin oxide (ITO).

A pixel may be defined by a region in which the strip of the first array excitation electrode overlaps the strip of the second array excitation electrode. The center-to-center distance between the strip of the first array excitation electrode and the strap of the second array excitation electrode defines the pitch of a pixel array, and the width of the strip may define the size of a pixel.

The processor 150 (see FIG. 3) of the augmented reality device 100 may apply a control voltage waveform having a phase modulation profile to the excitation electrode 110e through the power supply VAC, and modulate the control voltage applied to the excitation electrode 110e. As the control voltage having a modulated waveform is applied by the processor 150, the refractive power of a particular region in the active region of the variable focus lens 110 may be locally adjusted by the phase modulation profile of the applied control voltage. In the variable focus lens 110, vergence may function as a lens according to the adjusted refractive power. Here, the vergence is an index indicating a degree to which light converges or diverges, and may be adjusted according to the refractive power of the variable focus lens 110. In an embodiment of the disclosure, the variable focus lens 110 may adjust the vergence by adjusting the refractive power of the lens to change a ray of light or an optical path.

The processor 150 may change the focal length by adjusting the vergence of a particular region, i.e., the focal region, of the variable focus lens 110. A method, performed by the processor 150, of determining the position of the focal region 110A (see FIG. 17B) of the variable focus lens 110 and adjusting the refractive power of the focal region 110A will be described in detail with reference to FIG. 17B.

Figure 17B:
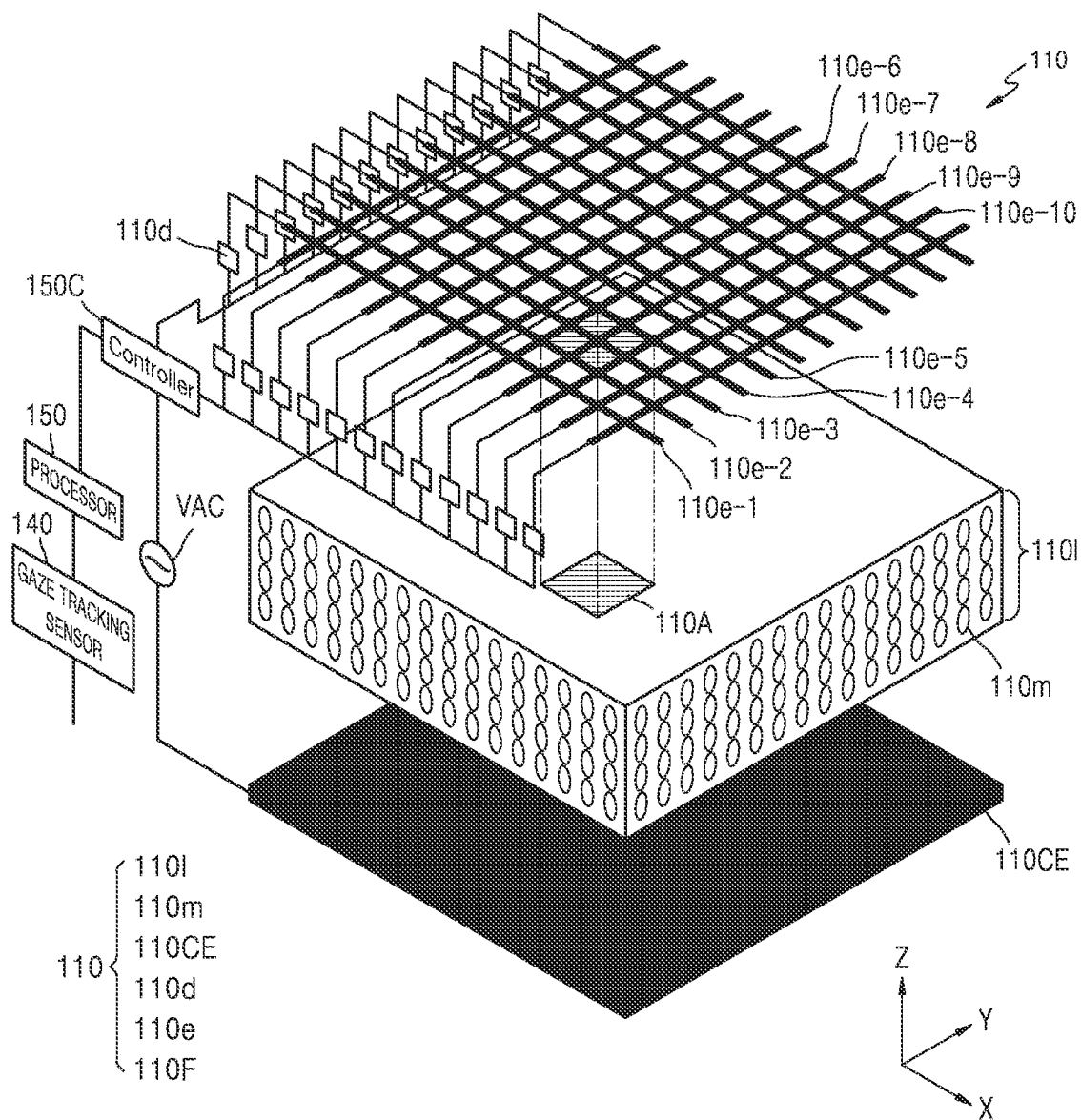
FIG. 17B is a diagram for describing an operation, performed by an augmented reality device, of adjusting the refractive power of a focal region of a variable focus lens, according to an embodiment of the disclosure.

FIG. 17B is a diagram for describing an operation, performed by the augmented reality device 100, of adjusting the refractive power of the focal region 110A of the variable focus lens 110, according to an embodiment of the disclosure.

Referring to FIG. 17B, the variable focus lens 110 may include the liquid crystal layer 110l, the liquid crystal molecules 110m, the common electrode 110CE, a plurality of driver terminals 110d, a plurality of first array excitation electrodes 110e-1, 110e-2, 110e-3, 110e-4, and 110e-5 (hereinafter, also referred to as the first to fifth excitation electrodes 110e-1 to 110e-5), a plurality of second array excitation electrodes 110e-6, 110e-7, 110e-8, 110e-9, and 110e-10 (hereinafter, also referred to as the sixth to tenth excitation electrodes 110e-6 to 110e-10), and the transparent film 110F. In FIG. 17B, the transparent film 110F is not illustrated unlike FIG. 17A for convenience of description.

The plurality of first array excitation electrodes 110e-1 to 110e-5 may be arranged in the X-axis direction, and the plurality of second array excitation electrodes 110e-6 to 110e-10 may be arranged in the Y-axis direction. The plurality of first array excitation electrodes 110e-1 to 110e-5 and the plurality of second array excitation electrodes 110e-6 to 110e-10 may be arranged to be at right angles to each other.

The plurality of first array excitation electrodes 110e-1 to 110e-5 may be connected to the plurality of driver terminals 110d, respectively, to control a control voltage applied from the power supply VAC to the plurality of first array excitation electrodes 110e-1 to 110e-5. The plurality of second array excitation electrodes 110e-6 to 110e-10 may be connected to the plurality of driver terminals 110d, respectively, to control a control voltage applied from the power supply VAC to the plurality of second array excitation electrodes 110e-6 to 110e-10.

A controller 150C may be electrically and/or physically connected to the plurality of driver terminals 110d and the power supply VAC. In FIG. 17B, the controller 150C is illustrated as a component separate from the processor 150, but is not limited thereto. In an embodiment of the disclosure, the controller 150C and the processor 150 may be integrated into one component.

The controller 150C may control the plurality of driver terminals 110d to control the control voltage applied to the plurality of first array excitation electrodes 110e-1 to 110e-5 and the plurality of second array excitation electrodes 110e-6 to 110e-10, and thus adjust the arrangement angle of the liquid crystal molecules in a particular region. In another embodiment of the disclosure, the variable focus lens 110 may not include the plurality of driver terminals 110d, and the controller 150C may be directly connected to the plurality of first array excitation electrodes 110e-1 to 110e-5 and the plurality of second array excitation electrodes 110e-6 to 110e-10.

The eye tracking sensor 140 may obtain a gaze vector by tracking a gaze direction of an eye of the user, and provide the obtained gaze vector to the processor 150. The processor 150 may calculate (obtain) coordinates of a region on the variable focus lens 110, which the gaze reaches, based on the direction of the gaze vector, and provide information about the calculated coordinates to the controller 150C. The controller 150C may determine the focal region 110A, which is a target region, the focus of which is to be adjusted, based on the coordinates obtained from the processor 150.

In the embodiment illustrated in FIG. 17B, in order to change the arrangement angle of the liquid crystal molecules in the focal region 110A among the plurality of liquid crystal molecules 110m included in the liquid crystal layer 110l, it is necessary to control a voltage to be applied to the second excitation electrode 110e-2, the third excitation electrode 110e-3, and the fourth excitation electrode 110e-4 among the plurality of first array excitation electrodes 110e-1 to 110e-5, and control the voltage to be applied to the seventh excitation electrode 110e-7, the eighth excitation electrode 110e-8, and the ninth excitation electrode 110e-9 among the plurality of second array excitation electrodes 110e-6 to 110e-10. In an embodiment of the disclosure, the controller 150C may control the plurality of driver terminals 110d to apply the voltage from the power supply VAC to the second excitation electrode 110e-2, the third excitation electrode 110e-3, and the fourth excitation electrode 110e-4, and control the voltage to be applied from the power supply VAC to the seventh excitation electrode 110e-7, the eighth excitation electrode 110e-8, and the ninth excitation electrode 110e-9. In this case, the controller 150C may control the plurality of driver terminals 110d such that no voltage is applied to the first excitation electrode 110e-1, the fifth excitation electrode 110e-5, the sixth excitation electrode 110e-6, and the tenth excitation electrode 110e-10.

The controller 150C may not only control a control voltage to be applied or not to be applied from the power supply VAC, but may also control the magnitude of the control voltage applied from the power supply VAC. The controller 150C may adjust the arrangement angle of the liquid crystal molecules by controlling the magnitude of the applied control voltage. For example, when the controller 150C applies a first magnitude of the control voltage to the second excitation electrode 110e-2 through the plurality of driver terminals 110d and applies a second magnitude, which is greater than the first magnitude, of the control voltage to the third excitation electrode 110e-3, the arrangement angle of the liquid crystal molecules in a region in the liquid crystal layer 110l in which the third excitation electrode 110e-3 is arranged may be adjusted to be greater than the arrangement angle of the liquid crystal molecules in a region in which the second excitation electrode 110e-2 is arranged.

For example, the controller 150C may modulate the phase profile of the control voltage applied to the plurality of first array excitation electrodes 110e-1 to 110e-5 and the plurality of second array excitation electrodes 110e-6 to 110e-10 through the plurality of driver terminals 110d, so as to determine the focal region 110A in the liquid crystal layer 110l in which the arrangement angle of the liquid crystal molecules 110m is to be changed and adjust the refractive power of the focal region 110A.

Figure 18A:
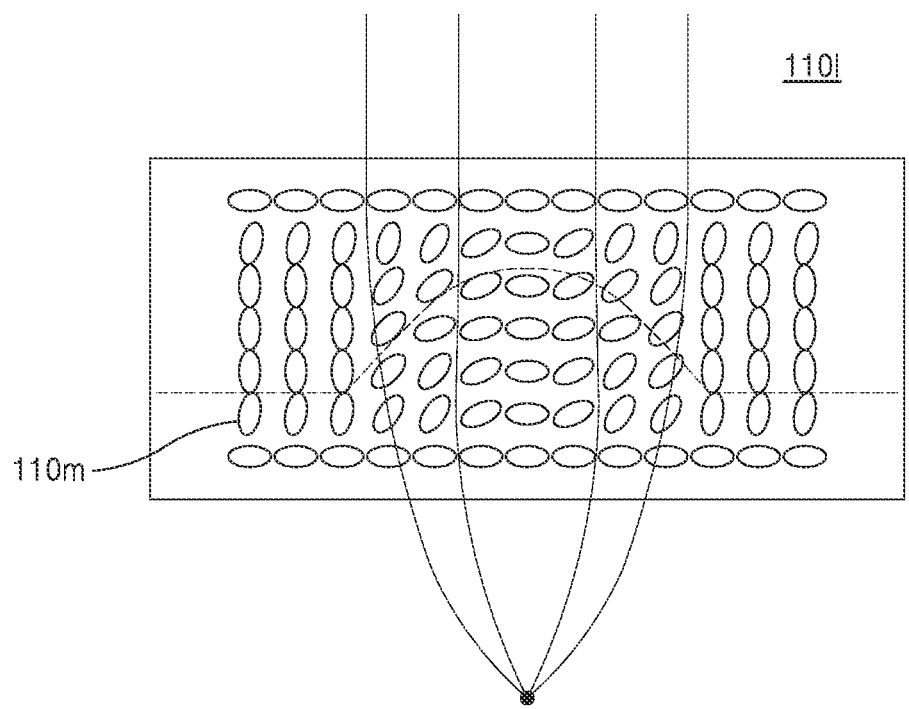
FIGS. 18A and 18B are diagrams for describing a vergence of a variable focus lens that is a component of an augmented reality device, according to an embodiment of the disclosure.
Figure 18B:
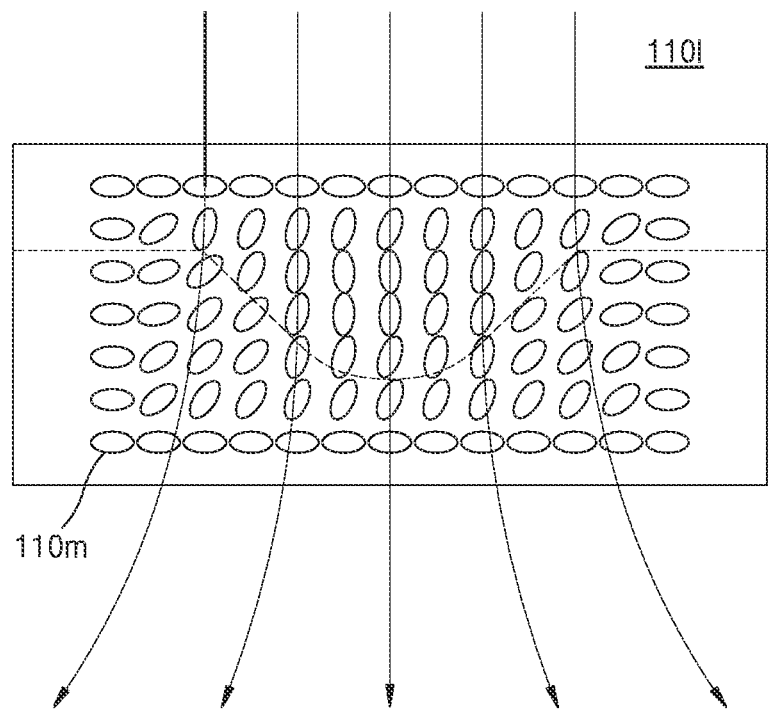

FIGS. 18A and 18B are conceptual diagrams illustrating formation of vergence of the variable focus lens 110 that is a component of the augmented reality device 100, according to an embodiment of the disclosure.

Referring to FIGS. 18A and 18B, the liquid crystal layer 110l of the variable focus lens 110 may change the arrangement angle of the liquid crystal molecules 110m at a particular position of the active region, as a control voltage modulated to have a particular phase profile is applied thereto. As the arrangement angle of the liquid crystal molecules 110m in the particular region of the liquid crystal layer 110l is changed, the refractive index for light passing through the liquid crystal molecules 110m may be changed. When the refractive index for the light is changed, the refractive power of the variable focus lens 110 is changed, thus the path of the light passing through the variable focus lens 110 is changed, and accordingly, the vergence may be changed. The vergence is an index indicating a degree to which light passing through the variable focus lens 110 converges or diverges. The vergence may be adjusted according to the refractive power of the variable focus lens 110.

In the embodiment illustrated in FIG. 18A, light passing through a region in which the arrangement angle of the liquid crystal molecules 110m in the liquid crystal layer 110l is changed creates a positive vergence, and thus the variable focus lens 110 may function as a convex lens. When a positive vergence is created, the focal length may decrease.

In the embodiment illustrated in FIG. 18B, light passing through a region in which the rotation angle of the liquid crystal molecules 110m in the liquid crystal layer 110l is changed may create a negative vergence, and thus the variable focus lens 110 may function as a concave lens. When a negative vergence is created, the focal length may increase.

Figure 19:
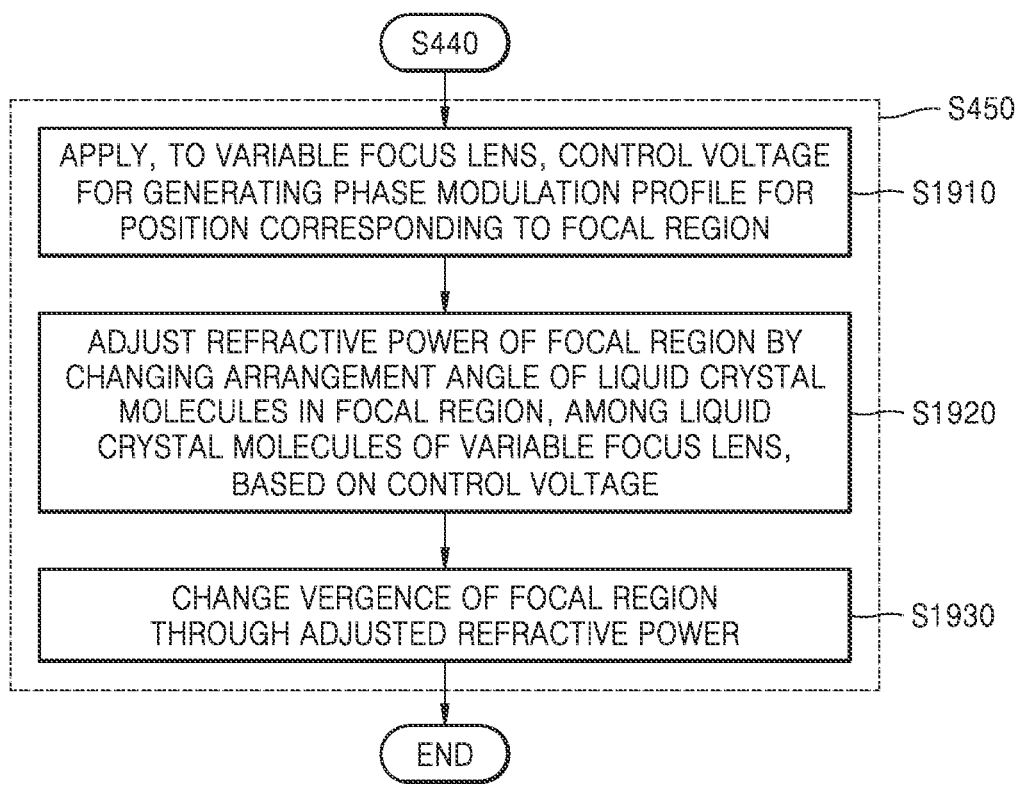
FIG. 19 is a flowchart of a method, performed by an augmented reality device, of adjusting the refractive power of a focal region of a variable focus lens, according to an embodiment of the disclosure.

FIG. 19 is a flowchart of a method, performed by the augmented reality device 100, of adjusting the refractive power of a focal region of a variable focus lens, according to an embodiment of the disclosure.

In FIG. 19, operation S1910 may be performed after operation S440 illustrated in FIG. 4 is performed.

Referring to FIG. 19, in operation S450, the augmented reality device 100 may adjust the refractive power of the focal region. Operations S1910 to S1930 of FIG. 19 are detailed operations corresponding to operation S450.

In operation S1910, the augmented reality device 100 applies, to the variable focus lens, a control voltage to generate a phase modulation profile for a position corresponding to the focal region. In an embodiment of the disclosure, the processor 150 (see FIG. 3) of the augmented reality device 100 may provide coordinate information of the focal region to the controller 150C (see FIG. 17B) of the variable focus lens, and the controller 150C may determine the position of the focal region, which is the target region, the focus of which is to be adjusted, based on the coordinates.

The controller 150C may apply a control voltage waveform having a phase modulation profile to each of the plurality of first array excitation electrodes 110e-1 to 110e-5 (see FIG. 17B) and the plurality of second array excitation electrodes 110e-6 to 110e-10 (see FIG. 17B) through the power supply VAC (see FIGS. 17A and 17B), and modulate the control voltage applied to each of the plurality of first array excitation electrodes 110e-1 to 110e-5 and the plurality of second array excitation electrodes 110e-6 to 110e-10. The processor 150 may modulate the control voltage by using the controller 150C such that, among pixels formed by the plurality of first array excitation electrodes 110e-1 to 110e-5 and the plurality of second array excitation electrodes 110e-6 to 110e-10 overlapping each other, pixels in a region corresponding to the focal region 110A (see FIG. 17B) have phase values different from those of the other pixels.

In operation S1920, the augmented reality device 100 adjusts the refractive power of the focal region by changing the arrangement angle of liquid crystal molecules in the focal region among liquid crystal molecules of the variable focus lens, based on the control voltage. The processor 150 of the augmented reality device 100 may change the arrangement angle of the liquid crystal molecules in a region corresponding to the focal region, among the liquid crystal molecules included in the liquid crystal layer, by applying a control voltage having a phase modulation profile to the variable focus lens. As the arrangement angle of the liquid crystal molecules in the region corresponding to the focal region is changed, the refractive power for light passing through the focal region may be changed. The augmented reality device 100 may adjust the refractive power of the focal region by adjusting the arrangement angle of the liquid crystal molecules in the region corresponding to the focal region.

In operation S1930, the augmented reality device 100 changes the vergence of the focal region through the adjusted refractive power. The augmented reality device 100 may adjust the path of light by adjusting the refractive power of the focal region, and thus adjust the degree of convergence or divergence of the light. In an embodiment of the disclosure, the augmented reality device 100 may adjust the focal length, which is the distance along which an image passes through the crystalline lens of an eye and is then formed on the retina, to be short or long by adjusting the refractive power of the focal region in a positive or negative direction. When the refractive power is adjusted such that the focal region has a positive vergence, the focal region may function as a convex lens. When the refractive power is adjusted such that the focal region has a negative vergence, the focal region may function as a concave lens.

As the vergence of the focal region is adjusted by the above-described method, the variable focus lens may function as a vision correction lens.

Figure 20:
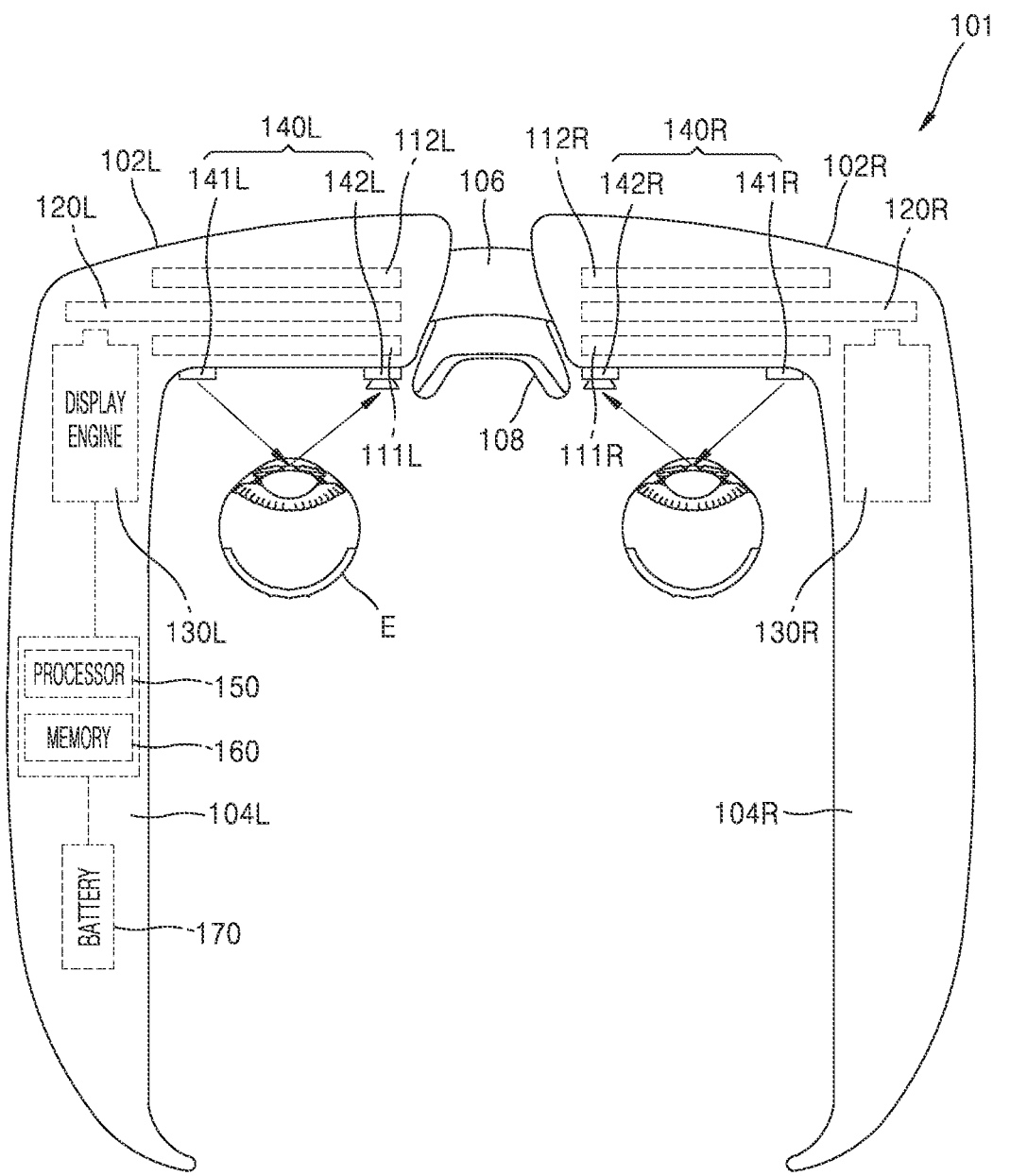
FIG. 20 is a plan view illustrating a structure of an augmented reality device according to an embodiment of the disclosure.

FIG. 20 is a plan view illustrating a structure of an augmented reality device 101 according to an embodiment of the disclosure.

Referring to FIG. 20, the augmented reality device 101 may include the frames 102, the temples 104, the nose bridge 106, the nose support 108, first variable focus lenses 111, second variable focus lenses 112, the waveguides 120, the display engines 130, the eye tracking sensors 140, the processor 150, the memory 160, and the battery 170. The augmented reality device 101 illustrated in FIG. 20 is the same as the augmented reality device 100 illustrated in FIG. 2, except that the augmented reality device 101 includes the first variable focus lenses 111 and the second variable focus lenses 112, and thus the description thereof provided above will be omitted.

Each of the first variable focus lenses 111 and the second variable focus lenses 112 may include liquid crystal molecules and may be configured as an electrically tunable liquid crystal lens configured to adjust a focus according to an electrical driving signal.

The first variable focus lenses 111 may include a first left-eye variable focus lens 111L and a first right-eye variable focus lens 111R, and the second variable focus lenses 112 may include a second left-eye variable focus lens 112L and a second right-eye variable focus lens 112R. The first left-eye variable focus lens 111L may be coupled to the left frame 102L and disposed at a position adjacent to the left eye of the user, and the second left-eye variable focus lens 112L may be disposed farther away from the eyes of the user than is the first left-eye variable focus lens 111L. In an embodiment of the disclosure, when the user wears the augmented reality device 101, the first left-eye variable focus lens 111L may be spaced apart from the left eye by a first distance, and the second left-eye variable focus lens 112L may be spaced apart from the left eye by a second distance. The second distance may be greater than the first distance.

The first right-eye variable focus lens 111R and the second right-eye variable focus lens 112R have the same material, shape, and structure as those of the first left-eye variable focus lens 111L and the second left-eye variable focus lens 112L, respectively, and thus, the description thereof provided above will be omitted.

The left-eye waveguide 120L may be disposed between the first left-eye variable focus lens 111L and the second left-eye variable focus lens 112L, and the right-eye waveguide 120R may be disposed between the first right-eye variable focus lens 111R and the second right-eye variable focus lens 112R.

The processor 150 may determine the positions of focal regions of the first variable focus lenses 111, respectively. The processor 150 may determine the position of a first focal region in the first left-eye variable focus lens 111L based on the information about the ER, the gaze point G, and the IPD. The processor 150 may determine the position of a second focal region in the second left-eye variable focus lens 112L based on the position of the first focal region and the gaze direction of the left eye. In an embodiment of the disclosure, the processor 150 may determine the position of the second focal region such that the first focal region and the second focal region are aligned along a virtual straight line representing the gaze direction of the left eye toward the gaze point G. For example, the processor 150 may obtain two-dimensional coordinates of a point at which the virtual straight line representing the gaze direction of the left eye meets the first left-eye variable focus lens 111L, and determine the position of the first focal region based on the obtained two-dimensional coordinates. Similarly, the processor 150 may obtain two-dimensional coordinates of a point at which the virtual straight line meets the second left-eye variable focus lens 112L, and determine the position of the second focal region based on the obtained two-dimensional coordinates.

The processor 150 may change the vergence of the first left-eye variable focus lens 111L by adjusting the refractive power of the first focal region of the first left-eye variable focus lens 111L. In an embodiment of the disclosure, the processor 150 may adjust the refractive power of the first focal region by changing the arrangement angle of liquid crystal molecules in a region corresponding to the position of the first focal region. The processor 150 may change the optical path of a virtual image projected to the left-eye waveguide 120L and then transmitting the left-eye crystalline lens by adjusting the refractive power of the first focal region. As the optical path of the virtual image is changed, the focal length of the virtual image formed on the retina of the left eye may be changed. As the processor 150 adjusts the refractive power of the first focal region, the vergence of the first left-eye variable focus lens 111L is changed, and accordingly, the focal length physically formed on the left-eye waveguide 120L may be adjusted to be equal to the vergence distance.

Focus distortion that causes a real-world object to appear as if it is out of focus may occur when the vergence of the first left-eye variable focus lens 111L is changed by adjusting the refractive power of the first focal region. In order to compensate for the focus distortion, the processor 150 may adjust the refractive power of the second focal region of the second left-eye variable focus lens 112L. In an embodiment of the disclosure, the processor 150 may adjust the refractive power of the second focal region to form a complementary vergence with respect to the vergence by the adjusted refractive power of the first focal region. In an embodiment of the disclosure, the processor 150 may adjust the refractive power of the second focal region to have an absolute value equal to that of the adjusted refractive power of the first focal region, in a direction opposite to the direction in which the refractive power of the first focal region is adjusted. For example, when the refractive power of the first focal region is adjusted to be −1 diopter (D), the refractive power of the second focal region may be adjusted to be +1 D.

The processor 150 may perform, on the first right-eye variable focus lens 111R and the second right-eye variable focus lens 112R, the same operation as the operation performed on the first left-eye variable focus lens 111L and the second left-eye variable focus lens 112L. Accordingly, a duplicate description regarding the first right-eye variable focus lens 111R and the second right-eye variable focus lens 112R will be omitted.

In the embodiment illustrated in FIG. 20, the augmented reality device 101 may adjust the focal length on a virtual image projected to the waveguides 120 by determining the positions of the first focal regions of the first variable focus lenses 111 and the second focal regions of the second variable focus lenses 112 such that the first focal regions and the second focal regions are aligned according to the gaze directions of the eyes of the user, respectively, and adjusting the refractive power of the second focal regions to be complementary to the refractive power of the first focal regions, respectively. For example, the augmented reality device 101 illustrated in FIG. 20 may provide not only a vision correction function but also a focus adjustment function on a virtual image.

A program executable by the augmented reality device 100 or 101 described herein may be implemented as a hardware component, a software component, and/or a combination of hardware components and software components. The program may be executed by any system capable of executing computer-readable instructions.

Software may include a computer program, code, instructions, or a combination of one or more thereof, and may configure or individually or collectively instruct a processing device to operate in a preferred manner.

The software may be implemented as a computer program that includes instructions stored in computer-readable storage media. The computer-readable storage media may include, for example, magnetic storage media (e.g., ROM, RAM, floppy disks, hard disks, etc.) and optical storage media (e.g., a compact disk ROM (CD-ROM), a digital versatile disc (DVD), etc.). The computer-readable storage media may be distributed in computer systems connected via a network and may store and execute computer-readable code in a distributed manner. The media may be computer-readable, may be stored in a memory, and may be executed by a processor.

The computer-readable storage medium may be provided in the form of a non-transitory storage medium. Here, the term 'non-transitory' simply means that the storage medium is a tangible device, and does not include a signal, but this term does not differentiate between where data is semi-permanently stored in the storage medium and where the data is temporarily stored in the storage medium. For example, the non-transitory storage medium may include a buffer in which data is temporarily stored.

In addition, a program according to the embodiments of the disclosure may be provided in a computer program product. The computer program product may be traded between a seller and a purchaser as a commodity.

The computer program product may include a software program and a computer-readable recording medium storing the software program. For example, the computer program product may include a product (e.g., a downloadable application) in the form of a software program electronically distributed through a manufacturer of the augmented reality device 100 or 101 or an electronic market (e.g., Samsung Galaxy Store). For electronic distribution, at least part of the software program may be stored in a storage medium or temporarily generated. In this case, the storage medium may be a storage medium of a server of the manufacturer of the augmented reality device 100 or 101, a server of the electronic market, or a relay server that temporarily stores the software program.

The computer program product may include a storage medium of a server or a storage medium of the augmented reality device 100 or 101, in a system consisting of the augmented reality device 100 or 101 and/or a server. Alternatively, when there is a third device (e.g., a mobile device) communicatively connected to the augmented reality device 100 or 101, the computer program product may include a storage medium of the third device. Alternatively, the computer program product may include the software program itself, which is transmitted from the augmented reality device 100 or 101 to an electronic device or a third device or transmitted from the third device to the electronic device.

In this case, one of the augmented reality device 100 or 101 and the third device may execute the computer program product to perform the method according to the embodiments of the disclosure. Alternatively, at least one of the augmented reality device 100, 101 or the third device may execute the computer program product to execute the method according to the embodiments of the disclosure in a distributed manner.

For example, the augmented reality device 100 or 101 may execute the computer program product stored in the memory 160 (see FIG. 3) to control another electronic device (e.g., a mobile device) communicatively connected to the augmented reality device 100 or 101 to perform the method according to embodiments of the disclosure.

As another example, the third device may execute the computer program product to control an electronic device communicatively connected to the third device to perform the method according to the embodiments of the disclosure.

When the third device executes the computer program product, the third device may download the computer program product from the augmented reality device 100 or 101, and execute the downloaded computer program product. Alternatively, the third device may execute the computer program product provided in a preloaded state, and perform the method according to the embodiments of the disclosure.

Although the embodiments of the disclosure have been described with the limited embodiments and the drawings, various modifications and changes may be made by those of skill in the art from the above description. For example, suitable results may be obtained even when the described techniques are performed in a different order, or when components in a described electronic device, architecture, device, or circuit are coupled or combined in a different manner, or replaced or supplemented by other components or their equivalents.

What is claimed is:

1. An augmented reality device comprising:
a variable focus lens;
an eye tracking sensor comprising an infrared (IR) light source and an IR camera; and
at least one processor configured to:
control the IR light source of the eye tracking sensor to emit IR light to the eye of the user and obtain an image by controlling the IR camera of the eye tracking sensor to photograph the IR light reflected by the eye of the user,
detect a plurality of glint feature points from the obtained image,
determine eye relief, which is a distance between the eye of the user and the variable focus lens, based on a distance between the plurality of detected glint feature points,
obtain information with respect to a gaze point at which gaze direction of a left eye of the user and gaze direction of a right eye of the user converge, and an interpupillary distance which is a distance between a pupil of the left eye and a pupil of the right eye, based on the plurality of glint feature points, and
determine a position of a focal region of the variable focus lens based on the information with respect to the eye relief, the gaze point, and the interpupillary distance.

2. The augmented reality device of claim 1
wherein the at least one processor is further configured to:
determine the eye relief based on a size of a region of a glint pattern, which is a combination of the plurality of detected glint feature points.

3. The augmented reality device of claim 2, wherein the IR light source comprises a plurality of IR light-emitting diodes (LEDs) provided on a lens frame of the augmented reality device and spaced apart from each other by a preset distance, and wherein the at least one processor is further configured to obtain the eye relief based on at least one of the size of the region of the glint pattern, a positional relationship between the plurality of IR LEDs, or coordinates of each pixel of the IR camera.

4. The augmented reality device of claim 1, wherein the at least one processor is further configured to:

obtain images by photographing an eye of the user moving by a preset rotation angle, by the eye tracking sensor;

detect a pupil feature point by analyzing the images;

measure a radius of rotation of the detected pupil feature point; and obtain the eye relief based on the measured radius of rotation.

5. The augmented reality device of claim 1, wherein the at least one processor is further configured to:

detect the pupil of the left eye from a left-eye image obtained by a first eye tracking sensor;

detect the pupil of the right eye from a right-eye image obtained by a second eye tracking sensor;

obtain three-dimensional coordinates of the pupil of the left eye and the pupil of the right eye based on a positional relationship between the first eye tracking sensor and the second eye tracking sensor, and camera attribute information; and obtain the interpupillary distance based on the three-dimensional coordinates of the pupil of the left eye and the pupil of the right eye.

6. The augmented reality device of claim 1, wherein the at least one processor is further configured to:

determine, as a first focal region, a region having a preset size around a first center focus on a first variable focus lens at which a virtual straight line representing a first gaze direction of the left eye toward the gaze point meets the first variable focus lens; and determine, as a second focal region, a region having a preset size around a second center focus on a second variable focus lens at which a virtual straight line representing a second gaze direction of the right eye toward the gaze point meets the second variable focus lens.

7. The augmented reality device of claim 1, wherein the at least one processor is further configured to:

obtain coordinates of a center focus based on the eye relief, a distance between the gaze point and the eye of the user, and the interpupillary distance; and determine, as the focal region, a region of a preset size around the center focus.

8. The augmented reality device of claim 1, wherein the at least one processor is further configured to adjust refractive power of the focal region by applying a control voltage to the variable focus lens to generate a phase modulation profile for a position corresponding to the focal region.

9. An operating method of an augmented reality device, the operating method comprising:

emitting infrared (IR) light, by using an IR light source of an eye tracking sensor, to an eye of a user;

obtaining, by an IR camera of the eye tracking sensor, an image by photographing the IR light reflected by the eye of the user;

detecting a plurality of glint feature points from the image obtained by the IR camera;

determining eye relief, which is a distance between the eye of the user and a variable focus lens of the augmented reality device, based on a distance between the plurality of detected glint feature points;

obtaining information with respect to a gaze point at which gaze direction of a left eye of the user and gaze direction of a right eye of the user converge, and an interpupillary distance which is a distance between a pupil of the left eye and a pupil of the right eye of the user, based on the plurality of glint feature points; and determining a position of a focal region of the variable focus lens based on the information about the eye relief, the gaze point, and the interpupillary distance.

10. The operating method of claim 9
wherein the obtaining of the information about the eye relief comprises determining the eye relief based on a size of a region of a glint pattern, which is a combination of the plurality of detected glint feature point.

11. The operating method of claim 10, wherein the IR light source comprises a plurality of IR light-emitting diodes (LEDs) provided on a lens frame of the augmented reality device to be spaced apart from each other by a preset distance, and wherein the determining of the eye relief comprises obtaining the eye relief based on at least one of the size of the region of the glint pattern, a positional relationship between the plurality of IR LEDs, or coordinates of each pixel of the IR camera.

12. The operating method of claim 9, wherein the detecting of the plurality of glint feature points comprises obtaining images by photographing an eye of the user moving by a preset rotation angle, by the eye tracking sensor, and detecting a pupil feature point by analyzing the images, and wherein the obtaining of the information with respect to eye relief comprises measuring a radius of rotation of the detected pupil feature point, and obtaining the eye relief based on the measured radius of rotation.

13. The operating method of claim 9, wherein the determining of the position of the focal region of the variable focus lens comprises:

determining, as a first focal region, a region having a preset size around a first center focus on a first variable focus lens at which a virtual straight line representing a first gaze direction of the left eye toward the gaze point meets the first variable focus lens; and determining, as a second focal region, a region having a preset size around a second center focus on a second variable focus lens at which a virtual straight line representing a second gaze direction of the right eye toward the gaze point meets the second variable focus lens.

14. The operating method of claim 9, wherein the determining of the position of the focal region of the variable focus lens comprises obtaining coordinates of a center focus based on the eye relief, a distance between the gaze point and the eye of the user, and the interpupillary distance, and determining, as the focal region, a region of a preset size around the center focus.

15. A computer program product comprising a computer-readable storage medium, the computer-readable storage medium comprising instructions readable by an augmented reality device to perform:

emitting infrared (IR) light, by using an IR light source of an eye tracking sensor, to an eye of a user;

obtaining, by an IR camera of the eye tracking sensor, an image by photographing the IR light reflected by the eye of the user;

detecting a plurality of glint feature points from the image obtained by the IR camera;

determining eye relief, which is a distance between the eye of the user and a variable focus lens of the augmented reality device, based on a distance between the plurality of detected glint feature points;

obtaining information with respect to a gaze point at which gaze direction of a left eye of the user and gaze direction of a right eye of the user converge, and an interpupillary distance which is a distance between a pupil of the left eye and a pupil of the right eye of the user, based on the plurality of glint feature points; and determining a position of a focal region of the variable focus lens based on the information about the eye relief, the gaze point, and the interpupillary distance.

* * * * *